(12) United States Patent
Akasaka et al.

(10) Patent No.: US 6,292,288 B1
(45) Date of Patent: *Sep. 18, 2001

(54) RAMAN AMPLIFIER, OPTICAL REPEATER, AND RAMAN AMPLIFICATION METHOD

(75) Inventors: Youichi Akasaka, San Jose, CA (US); Yoshihiro Emori, Ichihara; Shu Namiki, Chiba, both of (JP)

(73) Assignee: The Furukawa Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/527,748

(22) Filed: Mar. 17, 2000

Related U.S. Application Data

(63) Continuation-in-part of application No. PCT/JP99/03944, filed on Jul. 23, 1999.

(30) Foreign Application Priority Data

| Jul. 23, 1998 | (JP) | 10-208450 |
| Jul. 27, 1998 | (JP) | 10-210822 |
| Feb. 12, 1999 | (JP) | 11-034769 |
| Feb. 12, 1999 | (JP) | 11-034833 |

(51) Int. Cl.[7] .................................................. H01S 3/00
(52) U.S. Cl. .......................... 359/334; 359/345; 359/124; 359/160; 372/3; 372/6; 372/71
(58) Field of Search ................................ 359/334, 345, 359/341, 124, 134, 160; 372/3, 6, 71

(56) References Cited

U.S. PATENT DOCUMENTS 4,616,898 10/1986 Hicks, Jr. .

(List continued on next page.)

FOREIGN PATENT DOCUMENTS 2-12986   1/1990 (JP) .

(List continued on next page.)

OTHER PUBLICATIONS

Elagawa et al, Electronics Letters, vol. 22, #5, pp. 196–197, Feb. 26, 1987.*

(List continued on next page.)

*Primary Examiner*—Nelson Moskowitz
(74) *Attorney, Agent, or Firm*—Oblon, Spivak, McClelland, Maier & Neustadt, P.C.

(57) ABSTRACT

A Raman amplifier according to the present invention comprises a plurality of pumping means using semiconductor lasers of Fabry-Perot, DFB, or DBR type or MOPAs, and pumping lights outputted from the pumping means have different central wavelengths, and interval between the adjacent central wavelength is greater than 6 nm and smaller than 35 nm. An optical repeater according to the present invention comprises the above-mentioned Raman amplifier and adapted to compensate loss in an optical fiber transmission line by the Raman amplifier. In a Raman amplification method according to the present invention, the shorter the central wavelength of the pumping light the higher light power of said pumping light. In the Raman amplifier according to the present invention, when a certain pumping wavelength is defined as a first channel, and second to n-th channels are defined to be arranged with an interval of about 1 THz toward a longer wavelength side, the pumping lights having wavelengths corresponding to the first to n-th channels are multiplexed, and an pumping light having a wavelength spaced apart from the n-th channel by 2 THz or more toward the longer wavelength side is combined with the multiplexed light, thereby forming the pumping light source. The pumping lights having wavelengths corresponding to the channels other than (n-1)-th and (n-2)-th channels may be multiplexed, thereby forming the pumping light source. The pumping lights having wavelengths corresponding to the channels other than (n-2)-th and (n-3)-th channels may be multiplexed, thereby forming the pumping light source.

54 Claims, 66 Drawing Sheets

U.S. PATENT DOCUMENTS

| | | |
|---|---|---|
| 4,699,452 | 10/1987 | Mollenauer et al. . |
| 4,805,977 * | 2/1989 | Tamura et al. ............. 359/334 |
| 4,881,790 | 11/1989 | Mollenauer . |
| 5,883,736 | 3/1999 | Oshima et al. ............. 359/341 |
| 5,887,093 | 3/1999 | Hansen et al. . |

FOREIGN PATENT DOCUMENTS

| | | |
|---|---|---|
| 7-99787 | 4/1995 | (JP) . |
| 10-73852 | 3/1998 | (JP) . |
| 98/42088 * | 9/1998 | (WO) . |

OTHER PUBLICATIONS

Agrawal, G.P., Nonlinear Fiber Optics, 2nd Edition, Academic Press, pp. 329–334, 1995.*

K. I. Suzuki et al., *Bidirectional 10–channel 2.5 Gbit/s WDM transmission over 250 km using (1531–1607nm) gain–band bidirectional erbium–doped fibre amplifiers*, Electronics Letters, Aug. 1997.

Simultaneous Amplification of Wavelength–Division–Multiplexed Signals by a Highly Efficient Fibre Raman Amplifier Pumped by High–Power Semiconductor Lasers, Electronics Letters, Feb. 26, 1987, vol. 23, No. 5, pp. 196–197.

A 92nm Bandwidth Raman, Amplifier, by Karsten Rottwitt and Howard D. Kidorf, Tyco Submarine Systems, Ltd., PD6–1–PD6—4.

Ultra–wideband hybrid amplifier comprising distributed Raman amplifier and erbium–doped fibre amplifier, Electronics Letters, Jun. 25, 1998, vol. 34, No. 13, pp. 1342–1345.

Masuda et al, ECOC '97, Sep. 25, 1997, Conf. Pub. No. 448, pp 73–76.*

Aida, et al, IEE Proceedings, vol. 137, pt. J, No. 4, pp. 225–229, Aug. 1990.*

Lewis et al, Electronics Letters, vol. 35, #20, pp. 1761–1762. Abstract only herewith, Sep. 30, 1999.*

* cited by examiner

| REPEATER SPECIFICATION | ① | ② | ③ |
|---|---|---|---|
| REPEATER INPUT $P_{in}$ [dBm/ch] | $-20\pm3$ | $-15\pm2$ | $-15\pm1$ |
| REPEATER OUTPUT $P_{out}$ [dBm/ch] | 10 | 10 | 5 |
| DCF LOSS $L_d$ [dB] | $10\pm2$ | $8\pm1.5$ | $6\pm1$ |

FIG. 17A

| EDFA DESIGN EXAMPLE | ① | ② | ③ |
|---|---|---|---|
| AMPLIFIER 1 GAIN $G_1$ [dB] | $20\pm3$ | $15\pm2$ | $15\pm1$ |
| AMPLIFIER 2 GAIN $G_2$ [dB] | $20\pm2$ | $18\pm1.5$ | $11\pm1$ |
| REPEATER GAIN $G_r$ [dB] | $30\pm3$ | $25\pm2$ | $20\pm1$ |

FIG. 17B

| SPECIFICATION | ① | ② | ③ |
|---|---|---|---|
| REPEATER INPUT | −20±3 | −15±2 | −15±1 |
| REPEATER OUTPUT | +10 | +10 | +5 |
| DCF LOSS | 10±2 | 8±1.5 | 6.5±1 |

FIG. 20A

| | ① | ② | ③ |
|---|---|---|---|
| AMPLIFIER 1 | 13 | 13 | 13 |
| AMPLIFIER 2 | 10 | 10 | 10 |
| RAMAN GAIN | 17±5 | 10±3.5 | 3±2 |
| REPEATER GAIN | 30±3 | 25±2 | 20±1 |

FIG. 20B

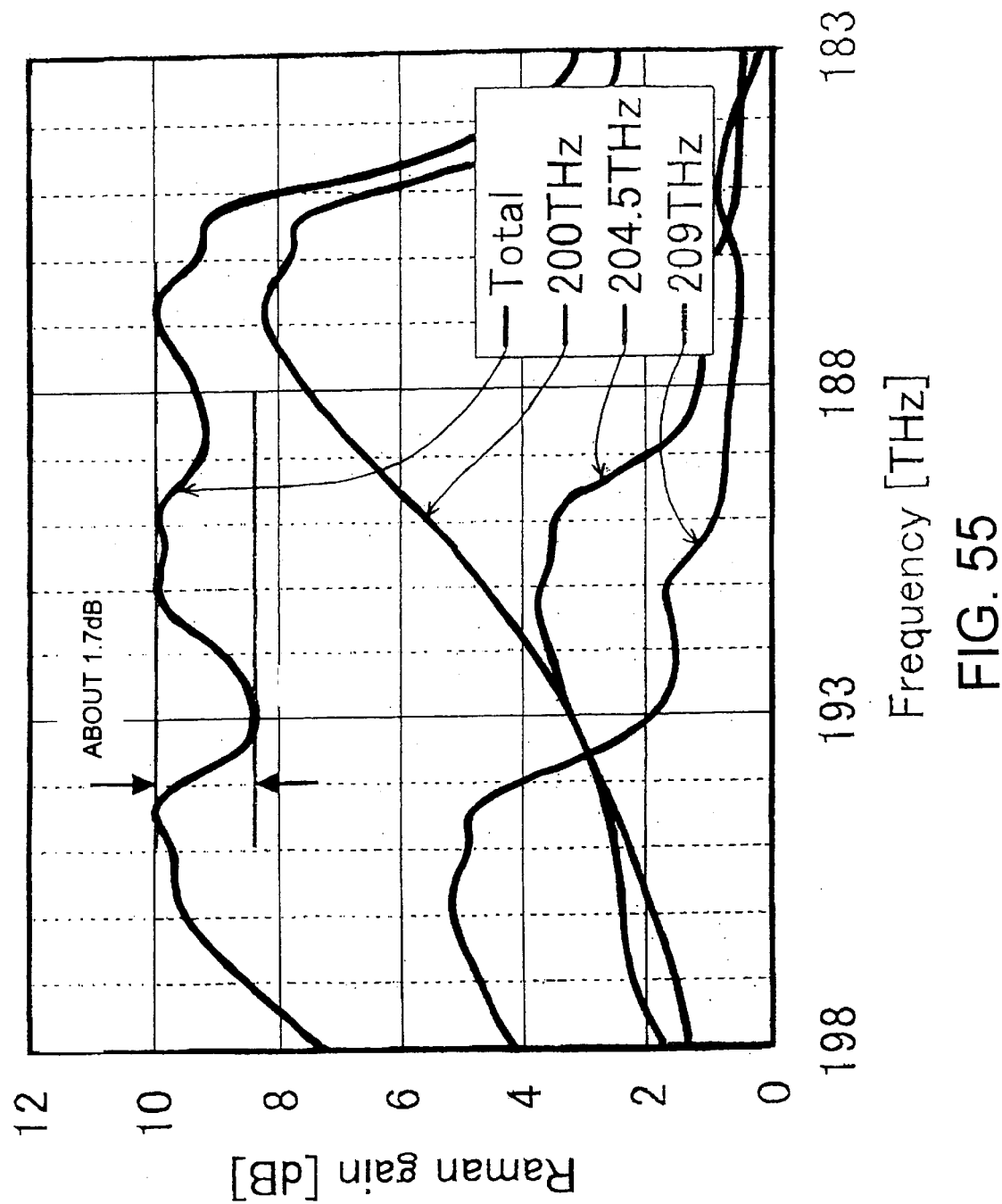

RAMAN AMPLIFIER, OPTICAL REPEATER, AND RAMAN AMPLIFICATION METHOD this application is a C-I-P of PCT/JP99/03944 filed Jul. 23, 1999.

BACKGROUND OF THE INVENTION

1. Field of the Invention

The present invention relates to a Raman amplifier capable of being used for amplification of optical signal in various optical communication systems, and optical repeater and Raman amplification method using such a Raman amplifier, and more particularly, it relates to Raman amplifier, optical repeater and Raman amplification method suitable Cr for amplification of wavelength division multiplexing signals.

2. Related Background Art

Almost all of optical amplifiers used with present optical fiber communication systems are rare earth doped fiber amplifiers. Particularly, erbium doped optical fiber amplifier (referred to as "EDFA" hereinafter) using Er (erbium) doped fibers have been used frequently. However, a practical gain wavelength band of the EDFA has a range from about 1530 nm to 1610 nm (refer to "Electron. Lett," vol.33, no.23, pp.1967–1968). Further, the EDFA includes gain having wavelength dependency, and, thus, when it is used with wavelength division multiplexing signals, difference in gain Is generated in dependence upon a wavelength of optical signal. FIG. 23 shows an example of gain wavelength dependency of the EDFA. Particularly, in wavelength bands smaller than 1540 nm and greater than 1560 nm, change in gain regarding the wavelength is great. Accordingly, in order to obtain given gain (in almost cases, gain deviation is within 1 dB) in the entire band including such wavelength, a gain flattening filter is used.

The gain flattening filter is a filter designed so that loss is increased in a wavelength having great gain, and the loss profile has a shape substantially the same as that of the gain profile. However, As shown in FIG. 24, in the EDFA, when magnitude of average gain is changed, since the gain profile is also changed as shown by curves a, b and c, in this case, the optimum loss profile of the gain flattening filter is also changed. Accordingly, when the flattening is realized by a gain flattening filter having fixed loss profile, if the gain of the EDFA is changed, the flatness will be worsened.

On the other hand, among optical amplifiers, there is an amplifier referred to as a Raman amplifier utilizing Raman scattering of an optical fiber (refer to "Nonlinear Fiber Optics, Academic Press). The Raman amplifier has peak gain in frequency smaller than frequency of pumping light by about 13 THz. In the following description, it is assumed that pumping light having 1400 nm band is used, and the frequency smaller by about 13 THz will be expressed as wavelength longer by about 100 nm. FIG. 25 shows wavelength dependency of gain when pumping light having central wavelength of 1450 nm is used. In this case, peak of gain is 1550 nm and a band width within gain deviation of 1 dB is about 20 nm. Since the Raman amplifier can amplify any wavelength so long as an pumping light source can be prepared, application of the Raman amplifier to a wavelength band which could not be amplified by the EDFA has mainly be investigated. On the other hand, the Raman amplifier has not been used in the gain band of the EDFA, since the Raman amplifier requires greater pump power in order to obtain the same gain as that of the EDFA. When the pumping light having great power is input to a fiber to increase the gain, stimulated Brillouin scattering may be generated. Increase amplification noise caused by the stimulated Brillouin scattering is one of the problems which makes it difficult to use the Raman amplifier, the Japanese Patent Laid-open No. 2- 12986 (1990) discloses an example of a technique for suppressing the stimulated Brillouin scattering in the Raman amplifier.

Further, the Raman amplifier has polarization dependency of gain and amplifies only a component (among polarized wave components) coincided with the polarized wave of the pumping light. Accordingly, it is required for reducing unstability of gain due to polarization dependency, and, to this end, it is considered that a polarization maintaining fiber is used as a fiber for amplifying or an pumping light source having random polarization condition.

Furthermore, enlargement of the gain band is required in the Raman amplifier. To this end, Japanese Patent Publication No. 7-99787 (1995) teaches in FIG. 4 that the pumping light is multiplexed with appropriate wavelength interval. However, this patent does not disclose concrete values of the wavelength interval. According to a document (K. Rottwitt, OFC98, PD-6), a Raman amplifier using a plurality of pumping lights having different wavelengths was reported; however, attempt in the viewpoint of the fact that the gain deviation is reduced below 1 dB was not considered.

On the other hand, there is an optical repeater for simultaneously compensating for transmission loss and chromatic dispersion in an optical fiber transmission line, which optical repealer is constituted by combination of an Er doped fiber amplifier (EDFA) and a dispersion compensating fiber (DCF). FIG. 46 shows a conventional example in which a dispersion compensating fiber A is located between two Er doped fiber amplifiers B and C. The first Er doped fiber amplifier B serves to amplify optical signal having low level to a relatively high level and has excellent noise property. The second Er doped fiber amplifier C serves to amplify the optical signal attenuated In the dispersion compensating fiber A to the high level again and has a high output level.

By the way, designing the optical repeater, it is required that a repeater input level, a repeater output level and a dispersion compensating amount (loss in the dispersion compensating fiber A) be set properly, and, there is limitation that the input level of the dispersion compensating fiber A has an upper limit, because, when the input power to the dispersion compensating fiber A is increased, influence of non-linear effect in the dispersion compensating fiber A is also increased, thereby deteriorating the transmission wave form considerably. The upper limit value of the input power to the dispersion compensating fiber A is determined by self phase modulation (SPM) in one wave transmission and by cross phase modulation (XPM) in WDM transmission. Thus, regarding the optical repeater, an optical repeater having excellent gain flatness and noise property must be designed in consideration of the several variable factors.

FIG. 47 shows a signal level diagram in the repeater. Gain G1 [dB] of the first Er doped fiber amplifier B is set to a difference between an input level Pin [dB] of the repeater and an input upper limit value Pd [dB] to the dispersion compensating fiber K Gain G2 [dB] of the second Er doped fiber amplifier C is set to (Gr+Ld−G1) [dB] from loss Ld [dB] in the dispersion compensating fiber A, gain Gr [dB] of the repeater and the gain G1 [dB] of the first Er doped fiber amplifier B. Since these design parameters are varied for each system, the values G1 [dB] and G2 [dB] are varied for each system, and, accordingly, the Er doped fiber amplifiers B, C must be re-designed for each system. The noise property in such a system is deeply associated with the loss Ld [dB] in the dispersion compensating fiber A, and it is known that the greater the loss the more the noise property is worsened. Further, at present, a gap from the designed value in loss in the transmission line and the loss in the dispersion compensating fiber A are offset by changing the gains of Er doped fiber amplifiers B. C. In this method, the gain of Er doped fiber amplifier B and C are off the designed value, thus the gain flatness is worsened. A variable attenuator may be used to offset the gap from the designed value of loss. In this method, although the gain flatness is not changed, an additional insertion loss worsens the noise property.

In the optical fiber communication system, although the Er doped optical fiber amplifiers have widely been used, the Er doped optical fiber amplifier also arises several problems. Further, the Raman amplifier also has problems that, since output of ordinary semiconductor laser is about 100 to 200 mW, gain obtained is relatively small, and that the gain is sensitive to change in power or wavelength of the pumping light. So that, when a semiconductor laser of Fabry-Perot type having relatively high output is used, noise due to gain fluctuation caused by its mode hopping becomes noticeable, and that, when the magnitude of the gain is adjusted, although drive current of the pumping laser must be changed, If the drive current is changed, since the fluctuation in the central wavelength is about 15 nm at the maximum, the wavelength dependency of gain will be greatly changed. Further, such shifting of the central wavelength is not preferable because such shifting causes change in joining loss of a WDM coupler for multiplexing the pumping light. In addition, the optical repeater also has a problem that the Er doped optical fiber amplifiers B, C must be re-designed for each system. Further, the deterioration of the noise property due to insertion of the dispersion compensating fiber is hard to be eliminated in the present systems.

In a Raman amplification method for amplifying optical signal by using a stimulated Raman scattering phenomenon, a communication optical fiber is used as an optical fiber acting as an amplifying medium, and, in a distributed amplifying system, a wavelength of pumping light and a wavelength of the optical signal are arranged in 1400nm–1600nm band having low loss and low wavelength dependency within a wide band of the communication optical fiber. In this case, regarding the loss of wavelength dependency of the optical fiber as the amplifying medium, a difference between maximum and minimum values is below about 0.2 dB/km in the above band, even in consideration of loss caused by hydroxyl ion (OH) having peak at 1380 nm. Further, even if each pumping powers in a multi-wavelength pumping system are not differentiated according to the wavelength dependence of the loss, the gain of the signals amplified by the pumping lights are substantially the same, there is no problem in practical use.

On the other hand, in a Raman amplifier operating as a discrete amplifier such as EDFA (rare earth doped fiber amplifier) it is necessary to pay attention to the package of the amplifier fiber, for a length of the fiber is about 10 km to about several tens of kilometers in order to obtain the required gain. Thus, it is convenient that the length of the fiber is minimized as less as possible. Although the length of the fiber can be shortened by using an optical fiber having great non-linearity, in the optical fiber having great non-linearity, it is difficult to reduce the transmission loss caused by (OH) generally having a band of 1380 nm, and Rayleigh scattering coefficient becomes great considerably in comparison with the communication fiber, with the result that the difference between the maximum and minimum values of fiber loss within the above-mentioned wavelength range becomes very great such as 1.5 to 10 dB/km. This means that, when the optical fiber having length or 3 km is used, the loss difference due to the wavelength of the pumping light becomes 4.5 dB to 30 dB. Thus, the wavelength division multiplexing signals cannot be uniformly amplified by using the pumping lights having the same intensities.

As one of means for multiplexing the number of pumping lights, there is a wavelength combiner of Mach-Zehnder interferometer type. Since the Mach-Zehnder interferometer has periodical response property regarding frequency, the wavelength of the pumping light must be selected among wavelengths having equal intervals in frequency. Accordingly, the wavelength combiner of Mach-Zehnder interferometer type has limitation in degrees of freedom of wavelength setting, but has an advantage that, when a device of waveguide type or fiber fusion type, if the number of wavelength division multiplexing is increased, insertion loss is not changed substantially.

SUMMARY OF THE INVENTION

An object of the present invention is to provide a Raman amplification method capable of uniformly amplifying wavelength division multiplexing signals and suitable to be incorporated as a unit.

Another object of the present invention is to provide a Raman amplifier which can obtain required gain and can reduce wavelength dependency of gain to the extent that usage of a gain flattening filter is not required and which can be used in a band of EDFA.

A further object of the present invention is to apply the Raman amplifier to an optical repeater constituted by an Er doped fiber amplifier (EDFA) and a dispersion compensating fiber (DCF) thereby to provide an optical repeater in which the EDFA is not required to be re-designed for each system and which can compensate dispersion in transmission line loss and/or DCF loss without deteriorating property of the optical repeater.

Further, by Raman-amplifying the DCF, the deterioration of noise property due to insertion of the DCF which could not avoided in the conventional techniques is reduced.

An example of a Raman amplifier according to the present Invention is shown in FIGS. 1, 2 and 3. When a small-sized semiconductor laser 3 of Fabry-Perot type having relatively high output is used in a pumping means 1, relatively high gain can be obtained, and, since the semiconductor laser 3 of Fabry-Perot type has a wide line width of an oscillating wavelength, occurrence of stimulated Brillouin scattering due to the pumping light can be eliminated substantially. On the other hand, when a semiconductor laser of DFB type or DBR type, or a Mater Oscillator Power Amplifier (MOPA) is used in the pumping means 1, since a fluctuation range of the oscillating wavelength is relatively small, a gain configuration is not changed by a driving condition. Further, occurrence of stimulated Brillouin scattering can be suppressed by effecting modulation.

Further, by selecting the interval between the central wavelengths of the pumping light to a value greater than 6 nm and smaller than 35 nm, the wavelength dependency of gain can be reduced to the extent that the gain flattening filter is not required. The central wavelength le in this case is a value defined regarding the single pumping light and is represented by the following equation when it is assumed that a wavelength of an i-th longitudinal mode of laser oscillating is li and light power included in that mode is Pi:

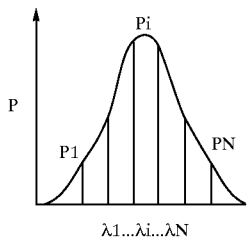

The reasons why the interval between the central wavelengths of the pumping light is selected to a value greater than 6 nm is that the oscillating band width of the semiconductor laser 3 of Fabry-Perot type connected to an external resonator 5 having narrow reflection band width is about 3 nm as shown in FIG. 12, and that a WDM coupler 11 (FIGS. 1, 2 and 3) for combining the pumping lights is permitted to have certain play or margin in wavelength interval between the pumping lights in order to improve wave combining efficiency. The WDM coupler 11 is designed so that lights having different wavelengths are received by different ports and the incident lights are joined at a single output port substantially without occurring of loss of lights. However, regarding light having intermediate wavelength between the designed wavelengths, the loss is increased even whichever port is used. For example, in a certain WDM coupler 11, a width of a wavelength band which increases the loss is 3 nm. Accordingly, in order that the band of the semiconductor laser 3 is not included within said band, as shown in FIG. 12, a value 6 nm obtained by adding 3 nm to the band width of the semiconductor laser 3 is proper for low limit of the interval between the central wavelengths of the pumping light. On the other hand, as shown in FIG. 13A, if the interval between the central wavelengths of the semiconductor laser 3 is greater than 35 nm, as shown In FIG. 13B, a gain valley is created at an intermediate portion of the Raman gain band obtained by the pumping lights having adjacent wavelengths, thereby worsening the gain flatness. The reason is that, regarding the Raman gain obtained by the single pumping light, at a position spaced apart from the gain peak wavelength by 15 nm to 20 nm, the gain is reduced to half. Accordingly, by selecting the interval of the central wavelengths of the pumping light to the value greater than 6 nm and smaller than 35 nm, the wavelength dependency of gain can be reduced to the extent that the gain flattening filter is not required.

According to a second aspect of the present invention, since a Raman amplifier has a control means 4 for monitoring input light or output light with respect to the Raman amplifier and for controlling pump powers of the pumping means 1 on the basis of a monitored result to maintain output light power of the Raman amplifier to a predetermined value, given output can be obtained regardless of fluctuation of input signal power to the Raman amplifier and/or dispersion in loss of a Raman amplifier fiber.

According to a third aspect of the present invention, since a Raman amplifier has a controlling means 4 for flattening Raman gain, the gain can be flattened. Particularly, as shown in FIG. 16, by monitoring lights having wavelengths obtained by adding about 100 nm to the wavelengths of the pumping lights, respectively, and by controlling the powers of the pumping lights to order or align the monitored light powers, the gain can be flattened. Further, since a wavelength stabilizing fiber grating (external resonator 5) which will be described later can suppress the shift in the central wavelength due to change in drive current of a Fabry-Perot type semiconductor laser, it can also be used as a means for permitting control of the gain.

According to a fourth aspect of the present invention, since a Raman amplifier has a control means 4 for monitoring input signal power and output signal power and for controlling pumping light power to make a ratio between the input signal power and the output signal power constant thereby to maintain gain of the Raman amplifier to a predetermined value, given output can be obtained regardless of fluctuation of the input signal power to the Raman amplifier and/or dispersion in loss of a Raman amplifier fiber.

According to a fifth aspect of the present invention, in a Raman amplifier, since an optical fiber having non-linear index n2 of refraction of 3.5E-20 [m2/W] or more is used as an optical fiber 2, adequate amplifying effect can be obtained, from the result of investigation.

According to a sixth aspect of the present invention, in a Raman amplifier, since the optical fiber 2 exists as a part of a transmission fiber for propagating the optical signal, the amplifier can be Incorporated into the transmission optical fiber as it is.

According to a seventh aspect of the present invention, a Raman amplifier utilizes a part of a dispersion managed transmission line and can constitute an amplifier as it is as a amplifying medium.

According to an eighth aspect of the present invention, in a Raman amplifier, since the optical fiber 2 exists as an amplifier fiber provided independently from a transmission fiber for propagating the optical signal and inserted into the transmission fiber, an optical fiber suitable for Raman amplification can easily be used for the optical fiber 2 and the chromatic dispersion compensating fiber can easily be utilized, and a discrete amplifier can be constituted.

In an optical repeater according to the present invention, since loss of an optical fiber transmission line 8 is compensated by using the Raman amplifier, an optical repeater having the function of the Raman amplifier can be provided.

Among optical repeaters of the present invention, in a repeater in which rare earth doped fiber amplifier(s) 10 is (are) provided at preceding or following stage or at both stages of the Raman amplifier, since the loss of the optical fiber transmission line 8 is compensated by the Raman amplifier 9 and the rare earth doped fiber amplifier(s) 10, desired amplifying property suitable for various transmission systems can be obtained.

Among optical repeaters of the present invention, in accordance with an arrangement in which the Raman amplifier 9 and the rare earth doped fiber amplifier 10 are combined, a repeater adapted to various systems can be obtained. This fact will be explained hereinbelow as an example that DCF is used as the amplifier fiber of the Raman amplifier 9. FIG. 17 shows design parameters of a conventional optical repeater, and the gains G1, G2 are varied for each system Further, it is not inevitable that input of the repeater and loss of the DCF are fluctuated by scattering in repeater spacing and scattering in the DCF. Such fluctuation is directly associated with the fluctuation of the gain of the EDFA, which fluctuation of the gain leads to deterioration of flatness. FIG. 18 schematically shows a relationship between the flatness and the gain of the EDFA. Since the flatness is optimized by limiting the used band and the average gain, if the average gain is deviated from the optimum point, the wavelength dependency of gain is changed to worsen the flatness. In order to avoid the deterioration of the flatness, the gain of the EDFA must be kept constant. Conventionally, a variable attenuator has been used as a means for compensating the fluctuation in input level and loss of the DCF. FIG. 19A shows an example that an attenuating amount of the variable attenuator is adjusted in accordance with the fluctuation of the input level to control the input level to the DCF to be kept constant and FIG. 19B shows an example that an attenuating amount is adjusted in accordance with the fluctuation in loss of the DCF to control intermediate loss to be kept constant. In both examples, the gains of two amplifiers are constant. However, in these methods, since useless loss is added by the variable attenuator, there is an disadvantage in the viewpoint of noise property. In the present invention, by compensating the change in design parameters of the repeater by the Raman amplification of the DCF, the gain of the EDFA is kept constant, requirement that the EDFA be re-designed for each system is eliminated, and the scattering In repeater spacing and scattering in the DCF can be compensated without sacrificing the flatness and the noise property. FIG. 20 shows design values of the EDFA when the Raman amplification of the DCF is applied to the specification of the repeater of FIG. 17. By selecting the Raman gain of the DCF appropriately, the properties of the EDFA required for three specifications can be made common. Further, as shown in FIGS. 21A and 21B, the fluctuation in input level and in loss of the DCF can be compensated by changing the Raman gain without changing the gain of the EDFA. In any cases, the Raman gain is adjusted so that the output level of the DCF becomes constant, while keeping the gain of the EDFA constant. Further, by compensating the loss of the DCF itself by the Raman amplification, the deterioration of the noise property due to insertion of the DCF which could not avoided in the conventional techniques can be reduced. FIG. 37 shows measured values of a deteriorating amount of the noise figure when the DCF is Inserted and of a deteriorating amount of the noise figure when the Raman amplifier using the same DCF is inserted.

In the optical repeater according to the present Invention, when a Raman amplifier using an pumping light source in which wavelengths are not combined is provided, although an operating wavelength range is narrower, a construction can be simplified and the same property as the aforementioned optical repeaters can be obtained, except for the band width, in comparison with an optical repeater having a Raman amplifier pumped by a plurality of wavelengths. FIGS. 38 and 39 show measured examples of the optical repeater using the Raman amplifier pumped by the pumping light source in which wavelengths are not combined and of the optical repeater using the Raman amplifier pumped by the plurality of wavelengths.

In the Raman amplifier according to the present invention, when a difference between maximum and minimum values of the central wavelength of the pumping light is within 100 nm, overlapping between the pumping light and the optical signal can be prevented to prevent wave form distortion of the optical signal. If the wavelength of the pumping light is similar to the wavelength of the optical signal, since the wave form of the optical signal may be deteriorated, the wavelength of the pumping light and the wavelength of the optical signal must be selected so that they are not over-lapped. However, in a case where the pumping light has band of 1.4 $\mu$m, when the difference between the maximum and minimum values of the central wavelength of the pumping light is smaller than 100 nm, as shown in FIG. 14, since the difference between the central wavelength of the gain caused by one pumping light and the wavelength of such pumping light is about 100 nm, the overlapping between the wavelength of the pumping light and the wavelength of the optical signal can be prevented.

In the Raman amplifier according to the present invention, when the pumping lights having adjacent wavelengths are propagated through the optical fiber 2 toward two different directions so that the optical signal pumped bi-directionally, the wavelength property required in the WDM coupler 11 shown in FIG. 1 and FIGS. 2 and 3 can be softened. The reason is that, as shown in FIG. 15, in all of pumping lights from both directions, although the central wavelengths become $\lambda_1, \lambda_2, \lambda_3, \lambda_4$ and the interval is greater than 6 nm and smaller than 35 nm, when considering the pumping lights from only one direction, the central wavelengths become $\lambda_1$ and $\lambda_3$ or $\lambda_2$ and $\lambda_4$ and the wavelength interval increased to twice, with the result that the property required in the WDM coupler 11 can have margin or play.

In the Raman amplifier according to the present invention, when the wavelength stabilizing external resonator 5 such as fiber grating is provided at the output side of the semiconductor laser 3 of Fabry-Perot type, noise due to fluctuation of caused by mode hopping of the semiconductor laser 3 of Fabry-Perot type can be suppressed. In consideration of one pumping light source, it makes the bandwidth narrower to connect the wavelength stabilizing external resonator 5 to the semiconductor laser 3. Since it also results the smaller wavelength interval in case of combining pumping light sources by the WDM coupler 11 (FIGS. 1, 2 and 3), pumping light having higher output and wider band can be generated.

In the Raman amplifier according to the present invention, when the pumping light of the semiconductor laser 3 is used to be polarization-combined for each wavelength, not only polarization dependency of gain can be eliminated but also the pump power launched into the optical fiber 2 can be increased. In the Raman amplification, only the components matched with the polarized of the pumping light can be given the gain. When the pumping light is linear-polarized and the amplifier fiber is not a polarization maintaining fiber, the gain is changed due to fluctuation of relative state of polarization of the signal and the pumping light. Therefore, the polarization dependence of gain can be eliminated by combining two linear-polarized pumping lights so that the polarization planes are perpendicular to each other. Further, it increases the pumping light power launched into the fiber.

In the Raman amplifier according to the present Invention, in the case where a wavelength combiner of planar lightwave circuit based on a Mach-Zehnder interferometer is used as a moans for wave-combining MOPA or a semiconductor laser of Fabry-Perot type, DFB type or DBR type having a plurality of wavelengths, even when the number of the wavelengths to be combined is large, the wave-combination can be achieved with very low loss, and pumping light having high output can be obtained.

In the Raman amplifier according to the present invention, as shown in FIG. 6, when a polarization plane rotating means 7 for rotating the polarization plane by 90 degrees is provided so that the optical fiber 2 simultaneously includes the plurality of pumping lights generated by the pumping means 1 and the pumping lights having a orthogonal state of polarization to the pumping lights generated by the pumping means 1, in principle, given gain can always be obtained regardless of the state of polarization of the optical signal, with the result that the band of the Raman gain can be widened.

In the optical repeater according to the present invention, when the Raman amplification is utilized by coupling residual pumping light of the Raman amplifier to the optical fiber transmission line 8, a part of loss of the optical fiber transmission line 8 can be compensated.

In the optical repeater according to the present invention, when the residual pumping light of the Raman amplifier is utilized as pumping light for the rare earth doped fiber amplifier 10, the number of the semiconductor lasers to be used can be reduced.

In the optical repeater according to the present invention, when a dispersion compensating fiber Is used as the optical fiber 2 of the Raman amplifier 9, the chromatic dispersion of the optical fiber transmission line 8 can be compensated by the Raman amplifier 9, and a part or all of the losses in the optical fiber transmission line 8 and the amplifier fiber 2 can be compensated.

According to a twenty-ninth aspect of the present invention, in a Raman amplification method by stimulated Raman scattering in an optical fiber through which two or more pumping lights having different central wavelengths and said optical signals are propagated, the pumping power launched into said optical fiber increases as the central wavelengths of said pumping lights is shorter.

According to a thirtieth aspect of the present invention, in a Raman amplification method by stimulated Raman scattering in an optical fiber through which two or more pumping lights having different central wavelengths and said optical signals are propagated, total pumping power on the shorter wavelength side with respect to the center between the shortest and longest central wavelengths among said two or more pumping lights is greater than on the longer side.

According to a thirty-first aspect of the present invention, in a Raman amplification method by stimulated Raman scattering in an optical fiber through which three or mare pumping lights having different central wavelengths and said optical signals are propagated, the number of the pumping light sources on the shorter wavelength side with respect to the center between the shortest and longest central wavelengths among said three or more pumping lights is greater than on the longer side, and the total pumping power on the shorter wavelength side is greater than on the longer side.

To achieve the above object, according to thirty-second to thirty-fourth aspects of the present invention, when the shortest pumping wavelength is defined as a first channel and, from the first channel, at respective intervals of about 1 THz toward the longer wavelength, second to n-th channels are defined, pumping lights having wavelengths corresponding to the first to n-th channels are multiplexed and pumping light having a wavelength spaced apart from the n-th channel by 2 THz or more toward the longer wavelength is combined with the multiplexed light, and light obtained in this way is used as the pumping light of the Raman amplifier. When the shortest pumping wavelength is defined as the first channel and, from the first channel, at respective intervals of about 1 THz toward the longer wavelength, the second to n-th channels are defined, light obtained by combining all of the wavelengths corresponding to the channels other than (n-1)-th and (n-2)-th channels is used as the pumping light of the Raman amplifier. Alternatively, light obtained by combining all of the wavelengths corresponding to the channels other than (n-2)-th and (n-3)-th channels is used as the pumping light of the Raman amplifier.

BRIEF DESCRIPTION OF THE DRAWINGS

FIGS. 17A and 17B are illustrations of properties associated with designing of the optical repeater;

FIGS. 20A and 20B are illustrations of properties associated with designing of the optical repeater utilizing a Raman amplification in DCF;

FIG. 55 is a view showing Raman gain profile when the interval between pumping light is selected to 4.5 THz and three wavelengths are used;

BEST MODE FOR CARRYING OUT THE INVENTION (First Embodiment of Raman Amplifier)

Figure 1:
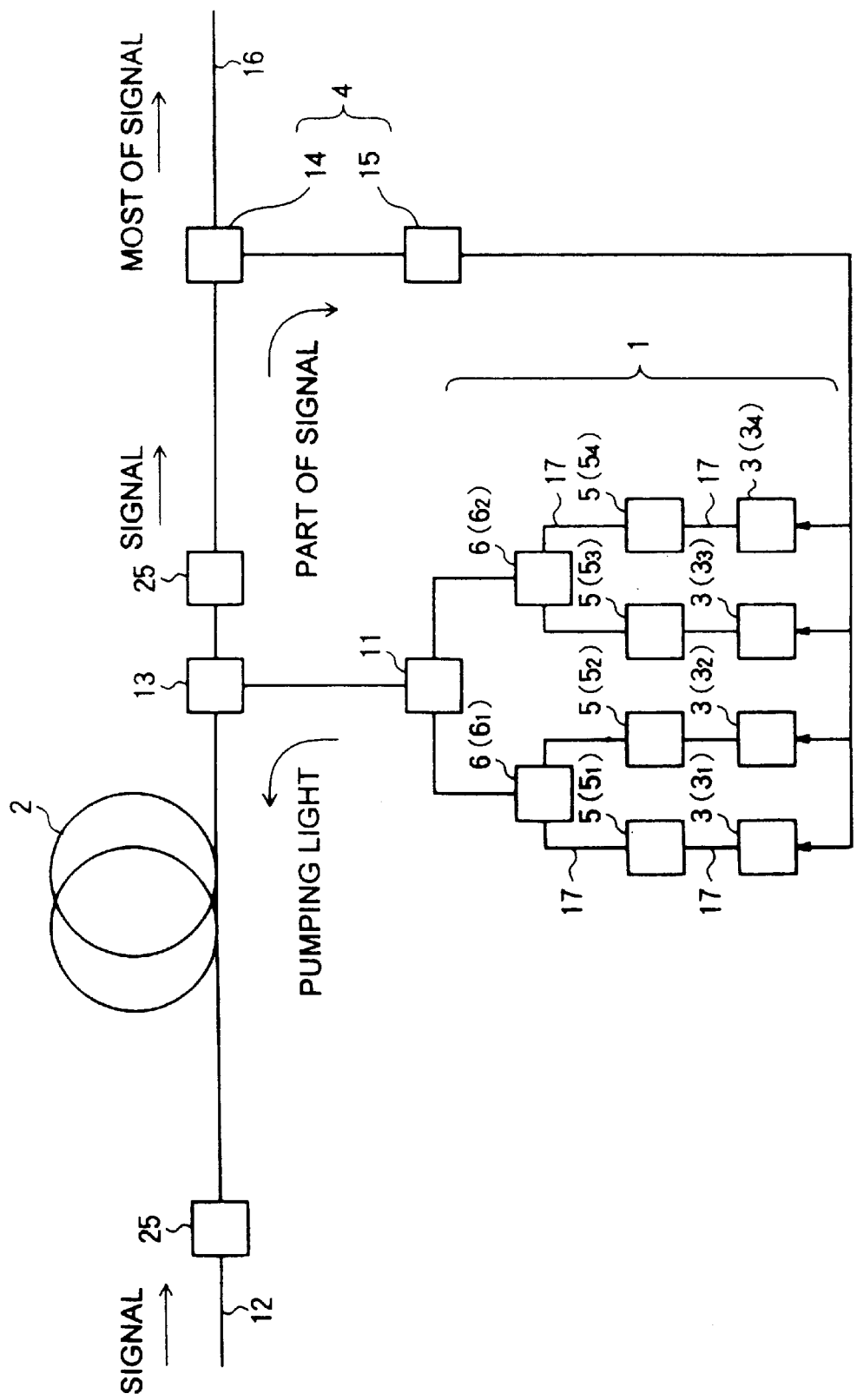
FIG. 1 is a diagram showing a first embodiment of a Raman amplifier according to the present invention.

FIG. 1 shows a first embodiment of a Raman amplifier according to the present invention. The Raman amplifier comprises a signal input fiber 12, an amplifier fiber (optical fiber) 2, a WDM coupler 13, a pumping means 1, a tap coupler for monitoring 14, a monitor signal detecting and LD control signal generating circuit 15, a signal output fiber 16, and a polarization independent isolator 25. The tap coupler for monitoring 14 and the monitor signal detecting and LD control signal generating circuit 15 constitute a controlling means 4.

The pumping means 1 includes semiconductor lasers 3 ($3_1$, $3_2$, $3_3$, $3_4$) of Fabry-Perot type, wavelength stabilizing fiber ratings (external resonators) 5 ($5_1$, $5_2$, $5_3$, $5_4$), polarization coupler (polarization beam combiner) 6 ($6_1$, $6_1$), and a WDM coupler 11. Oscillating wavelengths of the semiconductor lasers $3_1$, $3_2$ and permeation wavelengths of the fiber gratings $5_1$, $5_2$ are the same wavelength $\lambda_1$, and central wavelengths of the semiconductor lasers $3_3$, $3_4$ and permeation wavelengths of the fiber gratings $5_3$, $5_4$ are the same wavelength $\lambda_2$, and the oscillating wavelengths of the semiconductor lasers $3_1$, $3_2$, $3_3$, $3_4$ can be subjected to the action of the wavelength stabilizing fiber gratings $5_1$, $5_2$, $5_3$, $5_4$ so that the central wavelengths are stabilized to $\lambda_1$, $\lambda_2$. Further, a wavelength interval between the wavelength $\lambda_1$ and the wavelength $\lambda_2$ is selected to be greater than 6 nm and smaller than 35 nm.

Pumping lights generated by the semiconductor lasers $3_1$, $3_2$, $3_3$, $3_4$ are polarization-combined by the polarization coupler 6 for each wavelength $\lambda_1$, $\lambda_2$, and output lights from the polarization coupler 6 are combined by the WDM coupler 11 to obtain output light of the pumping means 1. Polarization maintaining fibers 17 are connected between the semiconductor lasers 3 and the polarization coupler 6 to obtain two pumping lights having different polarization planes. The output light of the pumping means 1 is coupled to the amplifier fiber 2 via the WDM coupler 13; on the other hand, an optical signal (wavelength division multiplexing signal) is incident on the amplifier fiber 2 from the optical signal input fiber 12 and then is combined with the pumping light of the pumping means 1 in the amplifier fiber 2 to be Raman-amplified, and the Raman-amplified light is passed through the WDM coupler 13 and is sent to the monitor light branching coupler 14, where a part of the light is branched as a monitor signal, and the other is outputted to the optical signal output fiber 16. The monitor signal is monitored in the monitor signal detecting and LD control signal generating circuit 15, and the circuit 15 generate a signal for controlling drive currents for the semiconductor lasers 3 so that gain deviation in the signal wavelength band becomes small.

Figure 48:
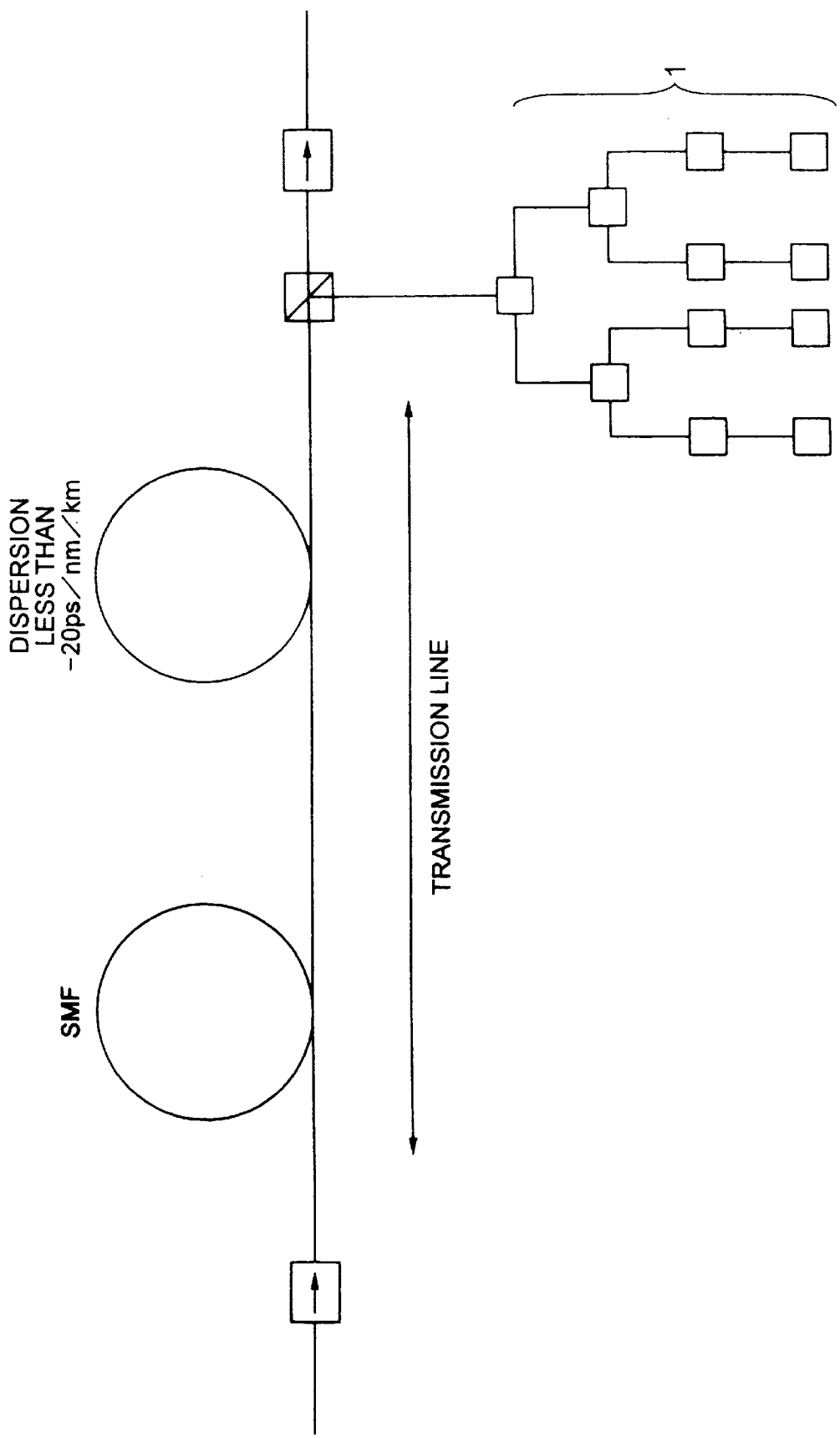
FIG. 48 is a diagram showing a case where SMF and a fiber having dispersion smaller than −20/ps/nm/km are used as the amplifier fiber.
Figure 49:
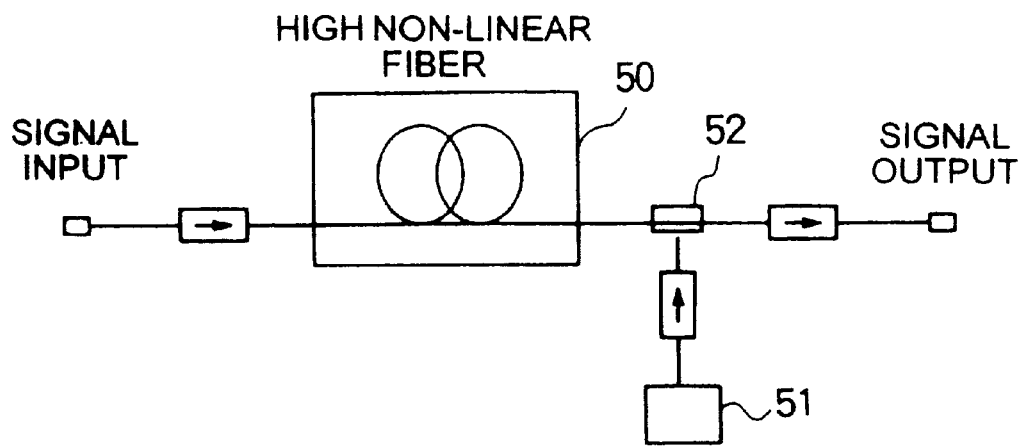
FIG. 49 is an illustration of an example of an arrangement for carrying out a Raman amplification method according to the present invention.

The amplifier fiber 2 may be a special fiber suitable for Raman amplification (for example, a fiber having non-linear index of refraction n2 of 3.5 E-20 [m2/W] or more) or may be an extension of the signal input fiber 12 by which the optical signal is received. Further, as shown in FIG. 48, RDF (reverse dispersion fiber) having dispersion of less than −20 ps/nm per 1 km may be connected to SMF so that the amplifier fiber can also act as a transmission line. (Generally, since RDF has dispersion of less than −20 ps/nm, RDF having a length substantially the same as or greater, by twice, than a length of SMF may be used.) In such a case, preferably, it is designed so that the Raman amplifying pumping light is propagated from the RDF toward the SMF. In the Raman amplifier, the amplifier fiber 2 may be connected to and inserted into a transmission fiber (not shown) to which the optical signal is transmitted, and the amplifier fiber 2, pumping means 1, WDM coupler 13, monitor light branching coupler 14, and monitor signal detecting and LD control signal generating circuit 15 may be incorporated to constitute a concentrated Raman amplifier.

Figure 22:
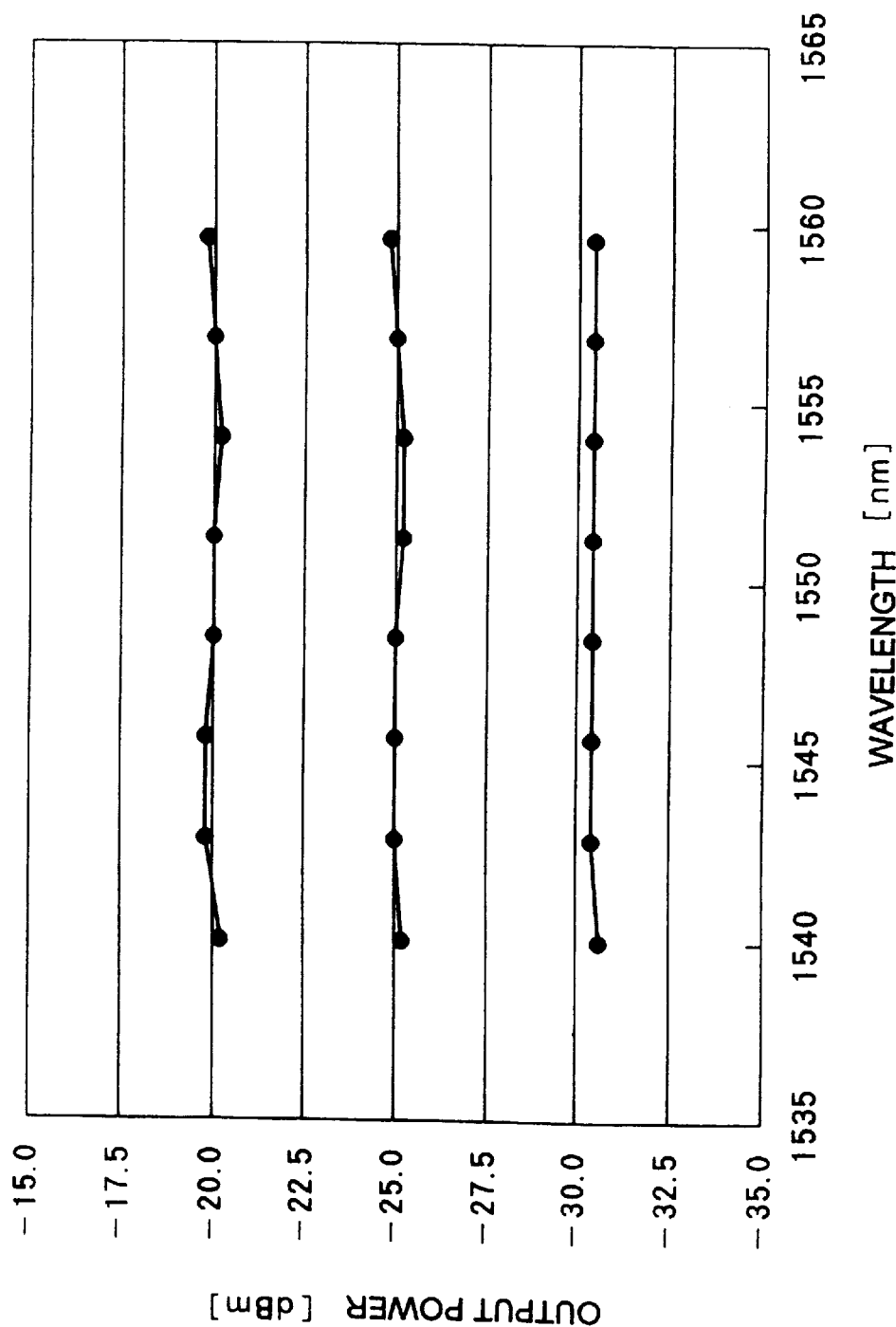
FIG. 22 is an illustration of different examples of output spectrum in the Raman amplifier.
Figure 23:
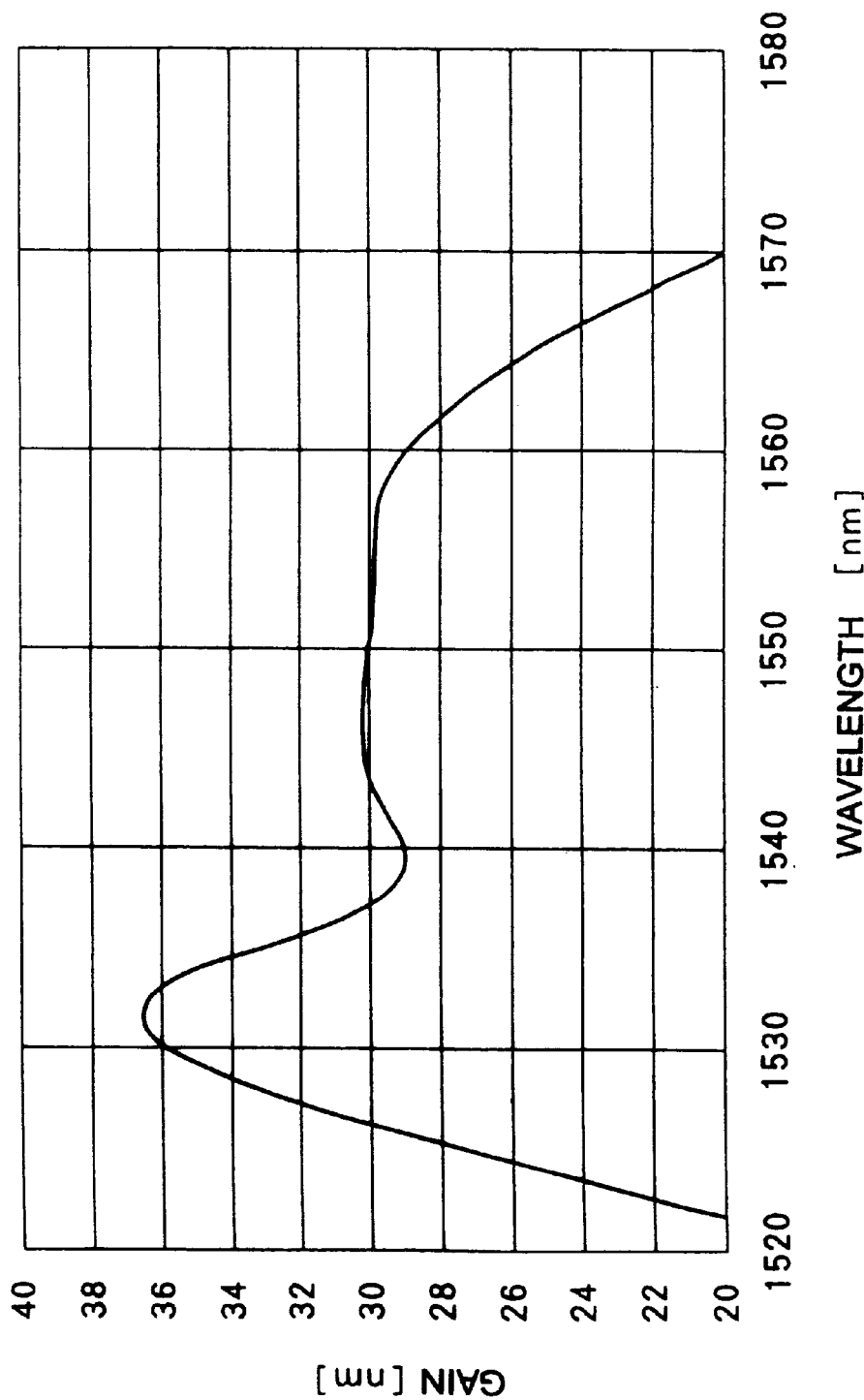
FIG. 23 is an illustration of wavelength dependency of gain due to EDFA.
Figure 24:
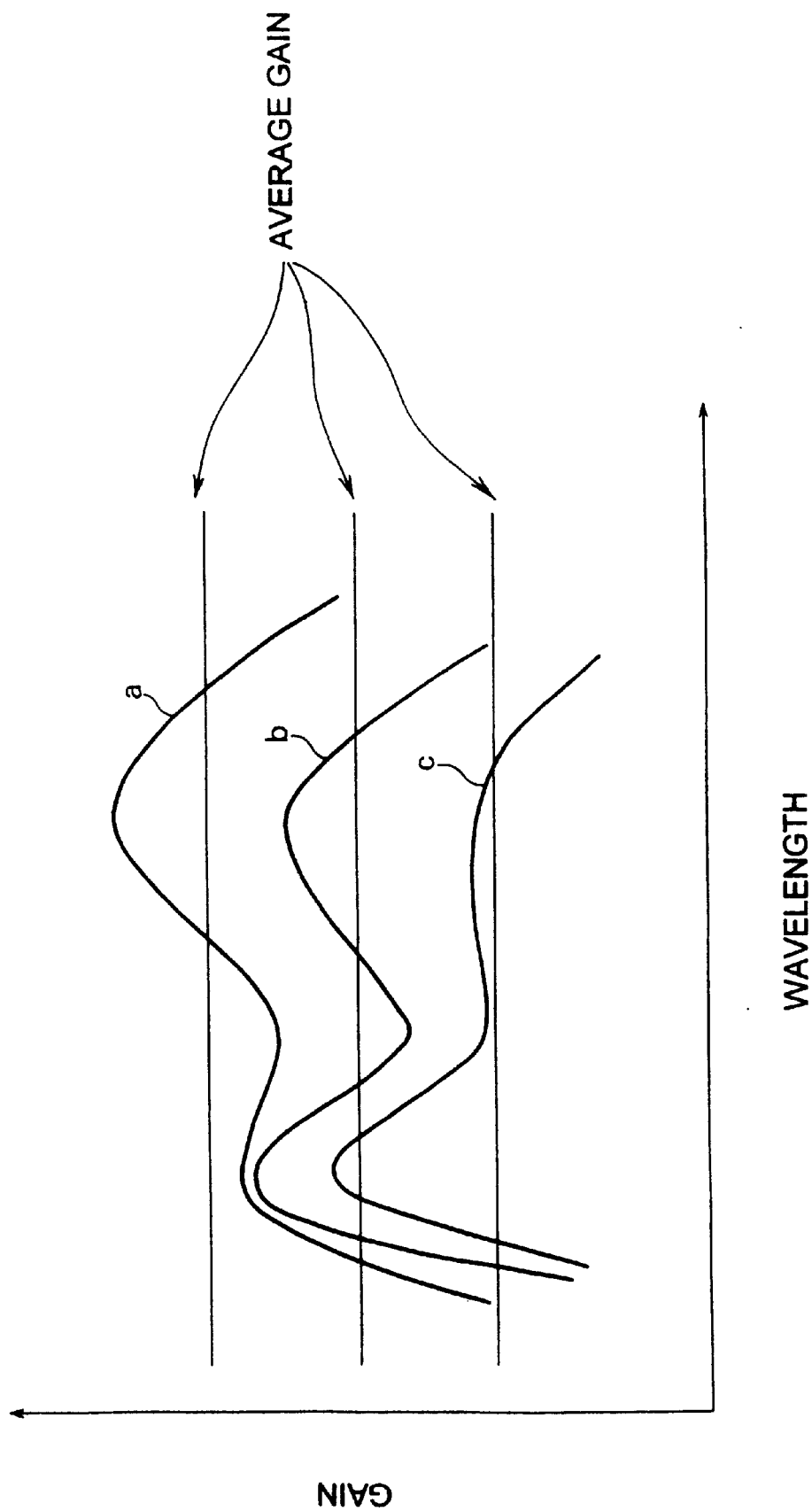
FIG. 24 is an illustration of fluctuation in gain due to EDFA.
Figure 25:
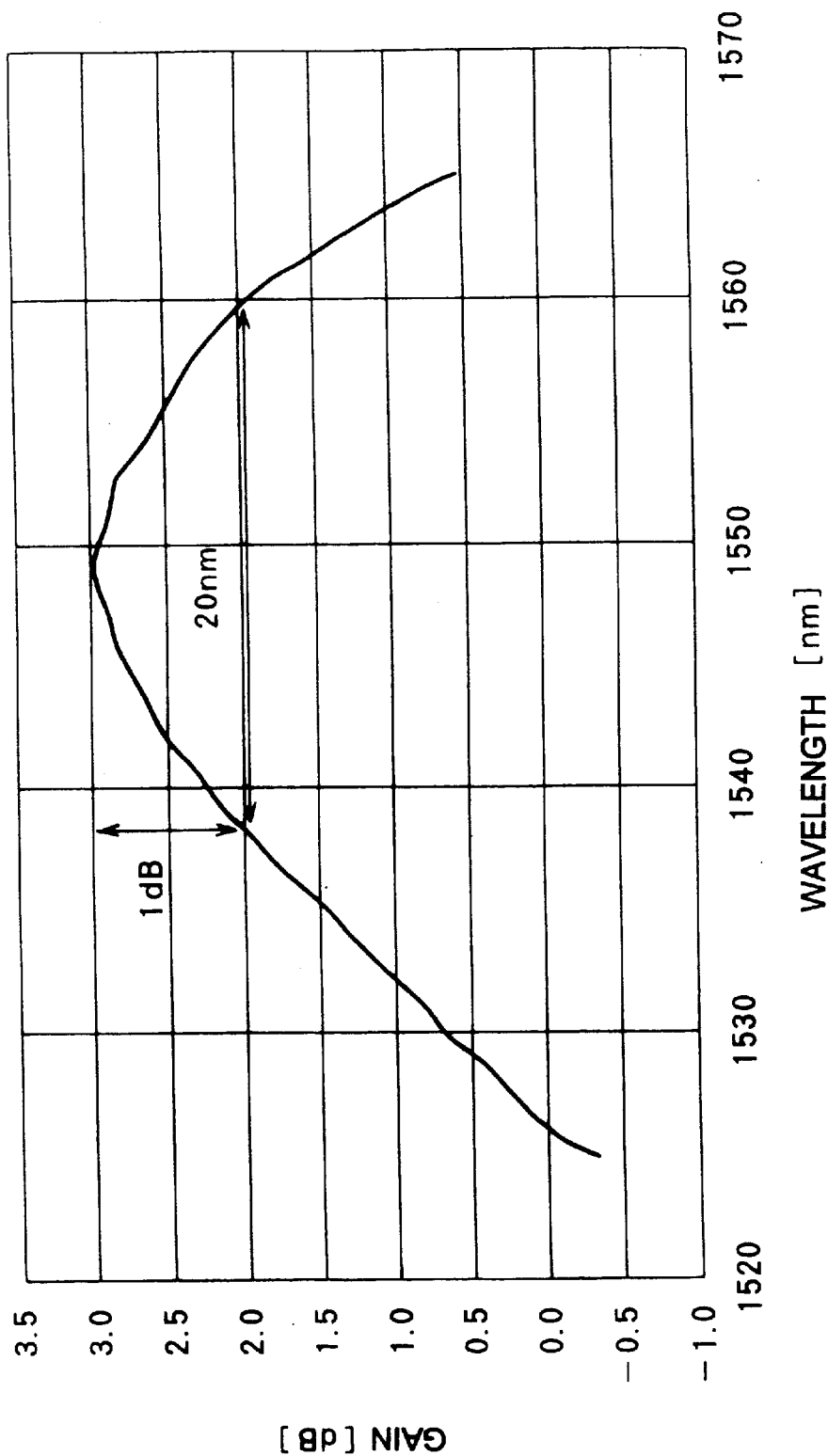
FIG. 25 is an illustration of wavelength dependency of gain due to Raman amplification.

FIG. 22 shows the output spectrum of the Raman amplifier of FIG. 1. In this experiment, the wavelength of 1435 nm and 1465 nm were used as the pumping wavelengths $\lambda_1$ and $\lambda_2$ in FIG. 1. The power of the input signals is −20 dBm/ch, and the wavelengths are arranged at an even space between 1540 nm and 1560 nm. The amplifier fiber 2 was a dispersion compensating fiber having a length of about 6 km, and powers of the pumping lights were adjusted to compensate the loss of the dispersion compensating fiber while keeping deviation between channels within 0.5 dB.

(Second Embodiment of Raman Amplifier)

Figure 2:
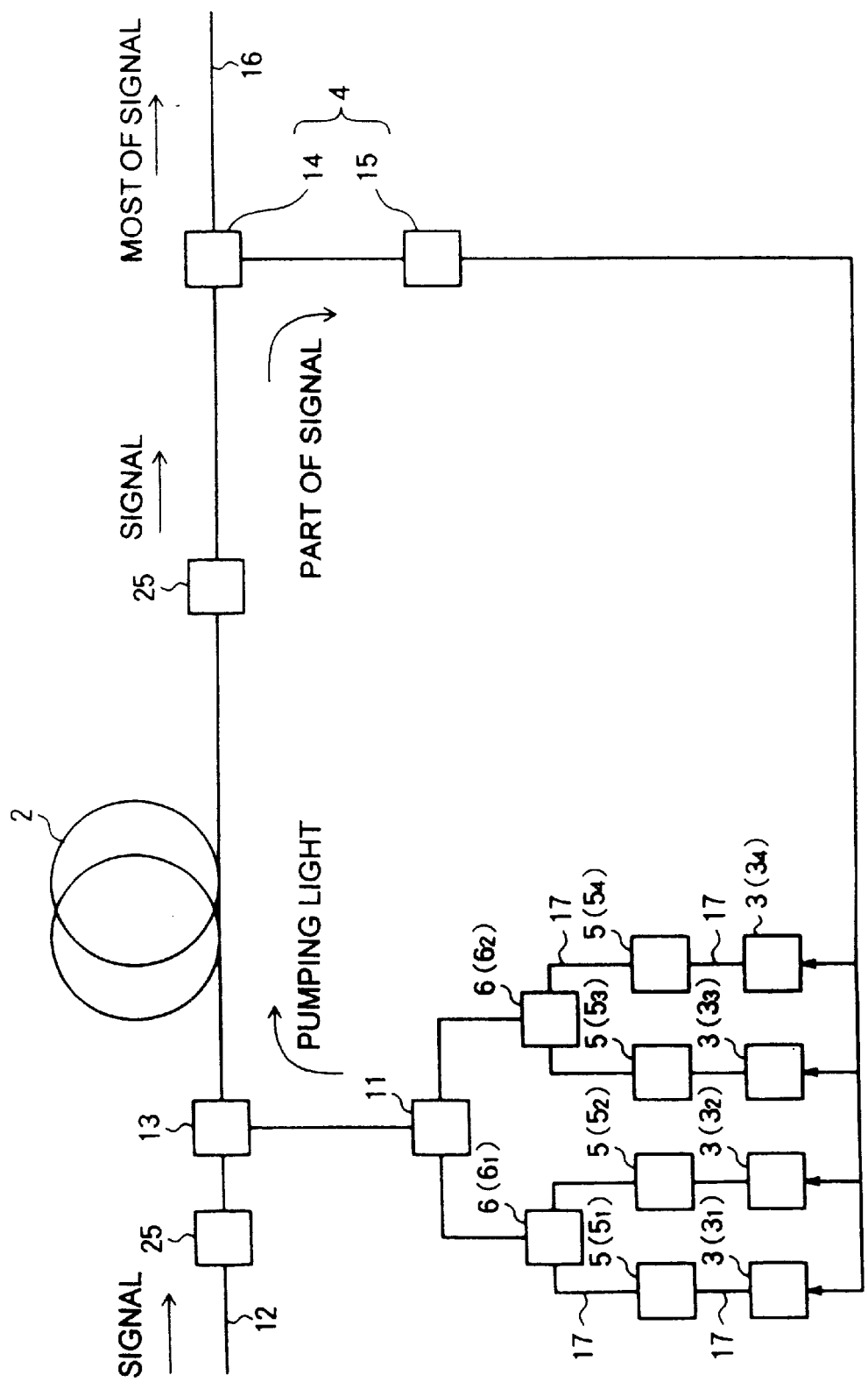
FIG. 2 is a diagram showing a second embodiment of a Raman amplifier according to the present invention.

FIG. 2 shows a second embodiment of a Raman amplifier according to the present invention, in which the pumping light from the pumping means 1 is propagated toward the same direction of the optical signal in the amplifier fiber 2. More specifically, the WDM coupler 13 is provided at a input end of the amplifier fiber 2, and the pumping light from the pumping means 1 is transmitted, through the WDM coupler 13, from the input end to output end of the amplifier fiber 2. In this arrangement, since amplification is effected before attenuation of signal, the noise property of the optical signal is superior to that in the first embodiment. Further, it was found that the gain is smaller in comparison with the first embodiment.

(Third Embodiment of Raman Amplifier)

Figure 3:
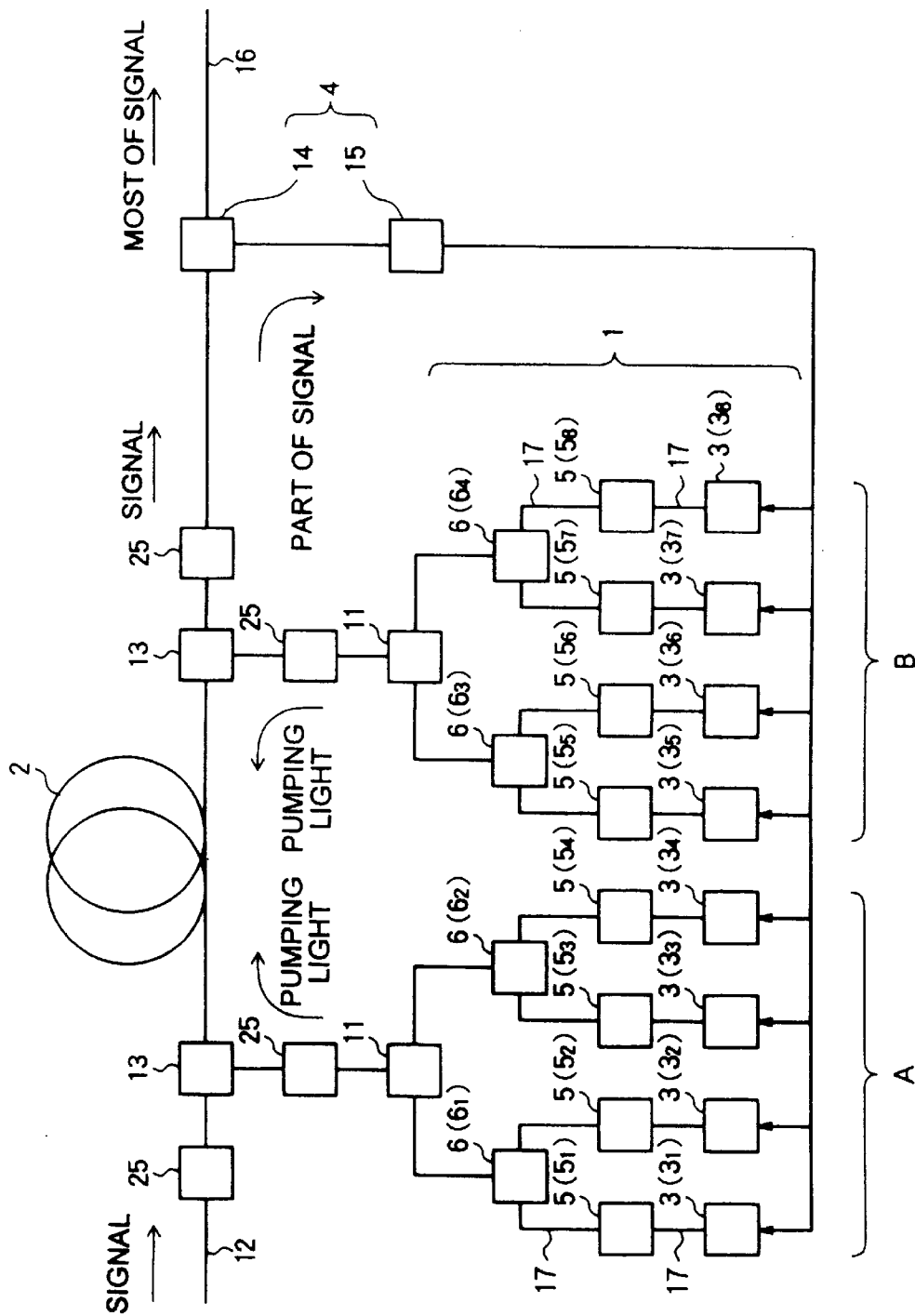
FIG. 3 is a diagram showing a third embodiment of a Raman amplifier according to the present invention.

FIG. 3 shows a third embodiment of a Raman amplifier according to the present invention, in which pumping lights from an pumping means 1 are propagated in two directions through the amplifier fiber 2. More specifically, WDM couplers 13 are provided at input and output ends of the amplifier fiber 2, respectively, and the pumping lights from two groups of the pumping means 1 are coupled to the amplifier fiber 2 through the respective WDM couplers 13 so that the pumping light launched into the input side WDM coupler 13 is propagated toward the output end of the amplifier fiber 2 and the pumping light launched into the output side WDM coupler 13 is propagated toward the input end of the amplifier fiber 2.

Central wavelengths of semiconductor lasers $3_1$, $3_2$ included in the first group A of the pumping means 1 and central wavelengths of semiconductor lasers $3_5$, $3_6$ included in the second group B are the same, and central wavelengths of semiconductor lasers $3_3$, $3_4$ included in the first group A and central wavelengths of semiconductor lasers $3_7$, $3_8$ included in the second gro up B are the same. Further, fiber gratings $5_1$ to $5_8$ are matched with the central warvelngth of the semiconductor lasers 3 to which the fiber gratings are connected, respectively.

(Fourth Embodiment of Raman Amplifier)

In the embodiment shown in FIG. 3, when it is assumed that the central wavelengths of the semiconductor lasers $3_1$, $3_2$ included in the first group A are $\lambda_1$, central wavelengths of the semiconductor lasers $3_3$, $3_4$ included in the first group A are $\lambda_3$, central wavelengths of the semiconductor lasers $3_5$, $3_6$ included in the second group B are $\lambda_2$, and central wavelengths of the semiconductor lasers $3_7$, $3_8$ included in the second group B are $\lambda_4$, the wavelengths $\lambda_1$, $\lambda_2$, $\lambda_3$, $\lambda_4$ may be adjacent wavelengths. Also in this case, the interval between the central wavelengths is greater than 6 nm and smaller than 35, and the difference between the maximum central wavelength $\lambda_4$ and the minimum central wavelength $\lambda_1$ is smaller than 100 nm. With this arrangement, the wavelength interval of the pumping lights combined in the same group can have play or margin and performance required for the WDM couplers 13 can be loosened.

(Fifth Embodiment of Raman Amplifier)

Figure 40:
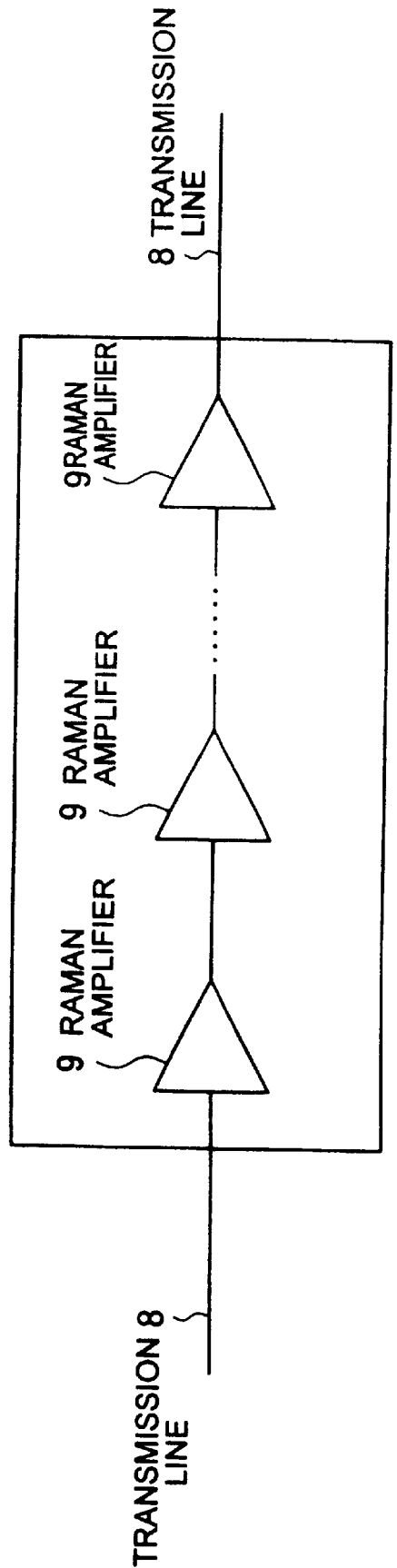
FIG. 40 is a diagram of an optical repeater in which a plurality of Raman amplifiers are connected in a multi-stage fashion.
Figure 41:
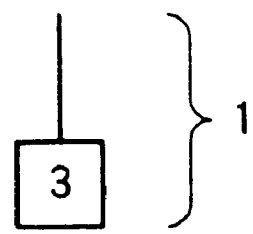
FIG. 41 is a diagram showing an example of a pumping means having a single pumping light source.
Figure 42:
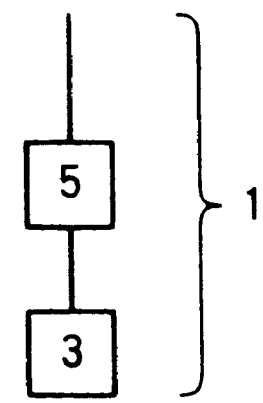
FIG. 42 is a diagram showing another example of a pumping means having a single pumping light source.
Figure 43:
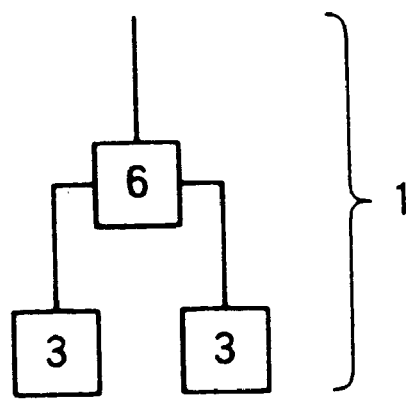
FIG. 43 is a diagram showing an example of a pumping means having two pumping light sources.
Figure 44:
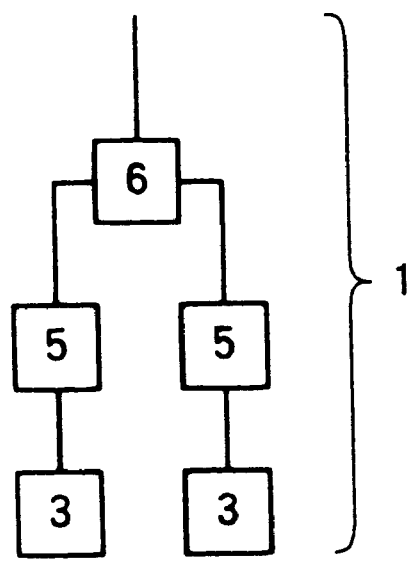
FIG. 44 is a diagram showing another example of a pumping means having two pumping light sources.
Figure 45:
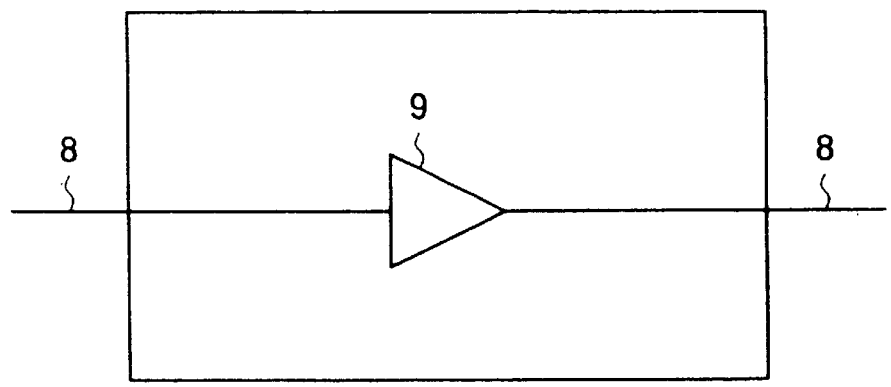
FIG. 45 is a diagram of a Raman amplifier in which a dispersion compensating fiber is used as an amplifier fiber.
Figure 46:
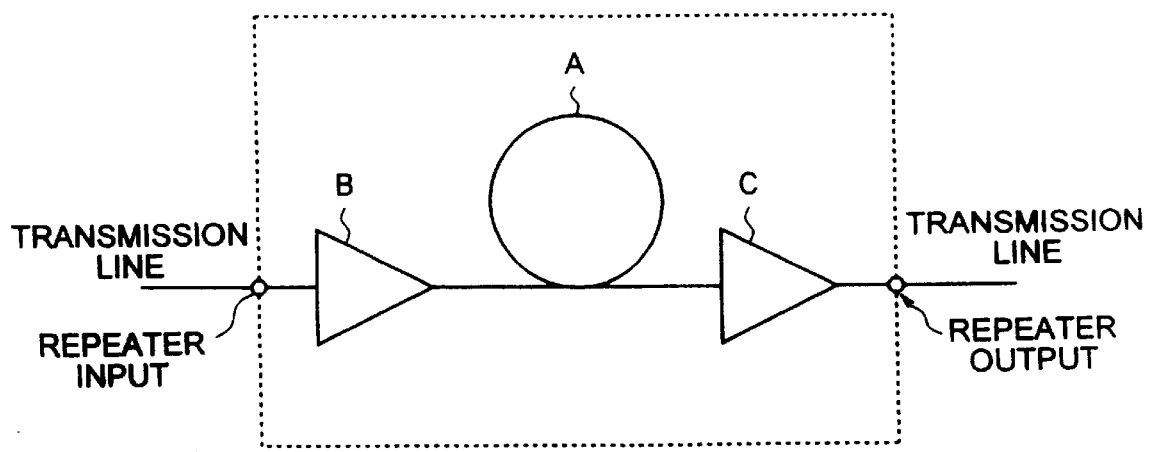
FIG. 46 is a diagram showing an example of a conventional optical repeater.
Figure 47:
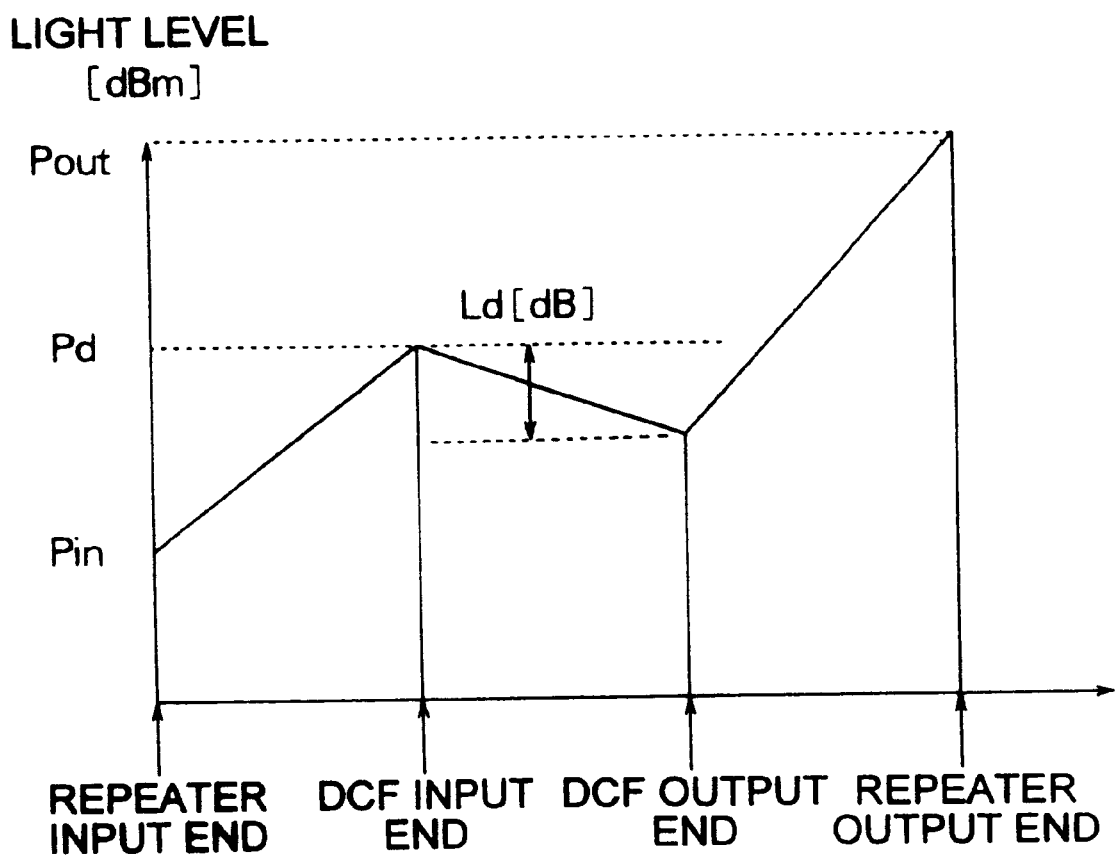
FIG. 47 is an illustration of signal level diagram in the optical repeater of FIG. 46.

FIG. 40 shows a fifth embodiment of a Raman amplifier according to the present invention. In this embodiment, appropriate Raman amplifiers are selected among the Raman amplifiers 9 described in the above-mentioned embodiments and the selected Raman amplifiers are connected together in a multi-stage fashion. By properly selecting the Raman amplifiers 9 having different characteristics in accordance with the desired amplifying property and noise property, a property which could not be achieved by a single. Raman amplifier can be obtained.

Figure 4:
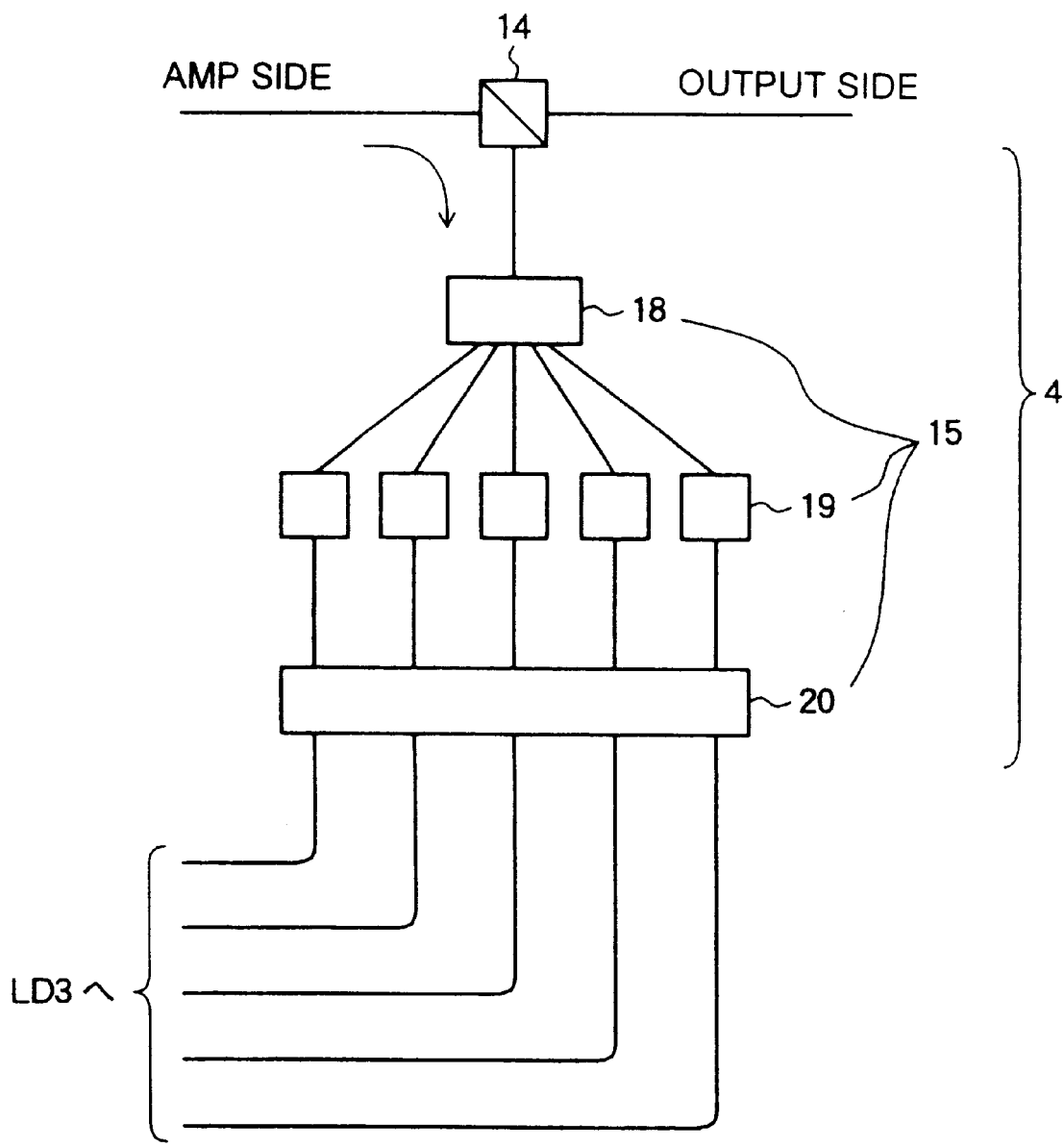
FIG. 4 is a diagram showing a first example of a controlling means in the Raman amplifier according to the present invention.
Figure 5:
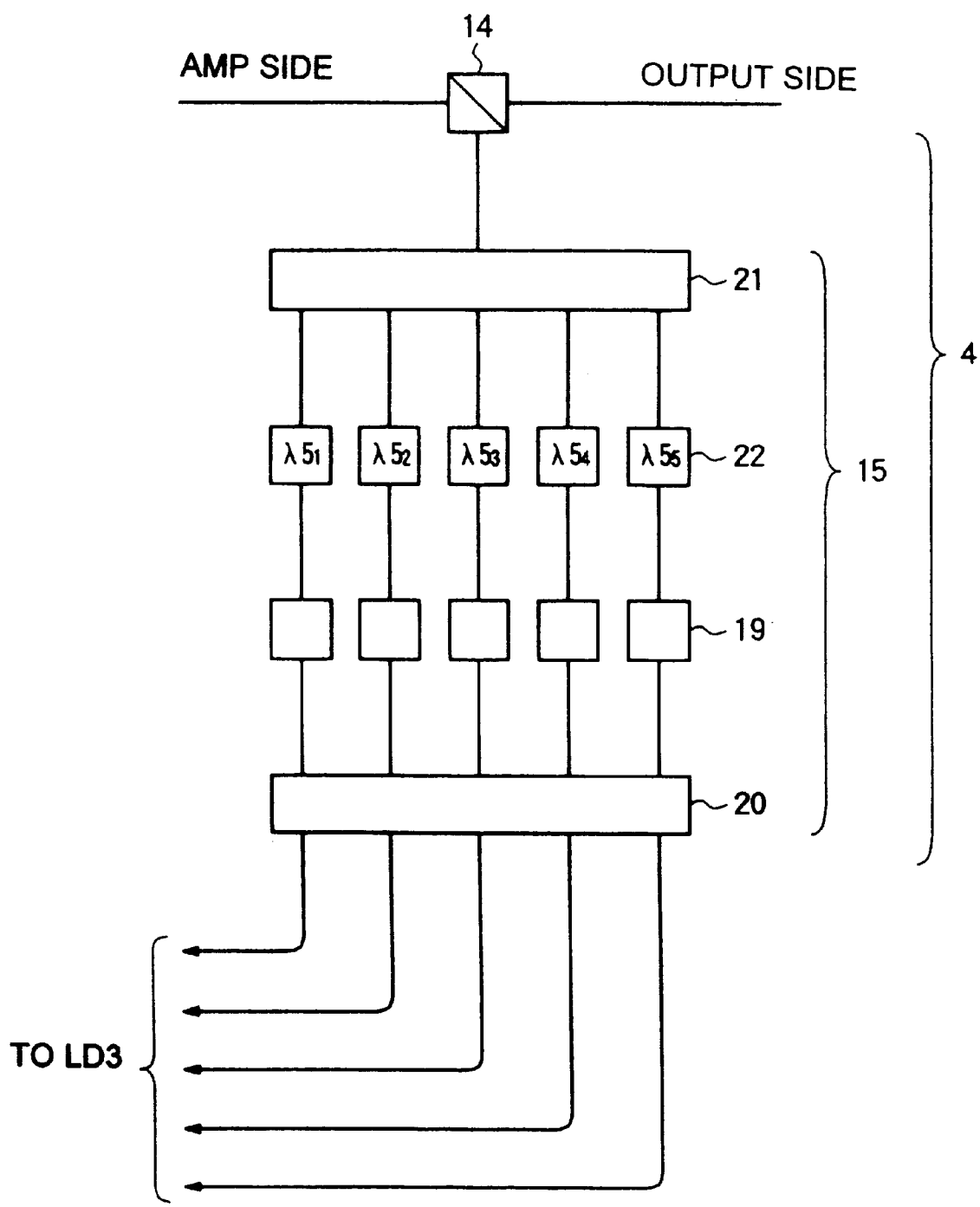
FIG. 5 is a diagram showing a second example of a controlling means in the Raman amplifier according to the present invention.

In the above-mentioned embodiments, the output light power controlling means 4 may be designed as shown in FIG. 4 or FIG. 5. In an arrangement shown in FIG. 4, a monitor signal detecting and LD control signal generating circuit 15 comprising a wavelength demultiplexer 18, optical/electrical converting means 19 such as photo-diodes and an LD control circuit 20 is connected to a monitor light branching coupler 14 as shown in FIG. 1, 2, or 3. The wavelength demultiplexer 18 serves to demultiplex the output light branched by the monitor light branching coupler 14 into a plurality of wavelength lights. In this case, lights near the maximum amplification wavelengths (each of which is a wavelength obtained by adding 100 nm to the pumping light wavelength) of the respective pumping lights are demultiplexd (more specifically, when the pumping wavelengths are 1430 nm and 1460 nm, wavelength lights near 1530 nm and 1560 nm are demultiplexd). Each of the optical/electrical converting means 19 serves to convert the received wavelength light into an electrical signal, so that output voltage is varied with magnitude of the light receiving level. The LD control circuit 20 serves to change the drive currents for the semiconductor lasers 3 in accordance with the output voltages from the optical/electrical converting means 19, and, by calculating and processing the output voltage from the optical/electrical converting means 19, the semiconductor lasers 3 are controlled so that light powers of -ok the wavelength lights are ordered or aligned. That is to say, the output light power controlling means 4 acts to eliminate the wavelength dependency of the Raman gain thereby to flatten the gain.

Figure 26:
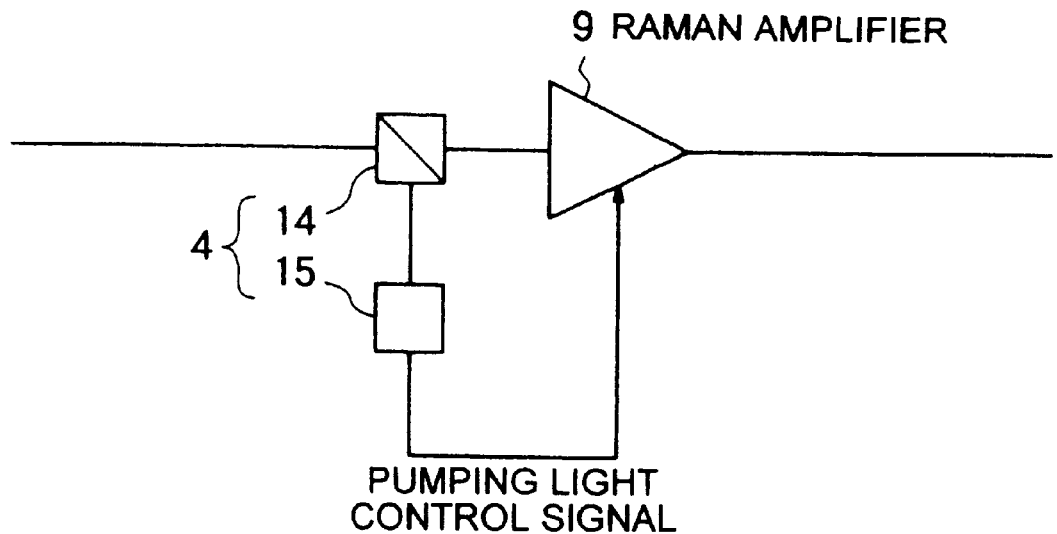
FIG. 26 is a diagram showing a control method for controlling output light power by monitoring input light.
Figure 27:
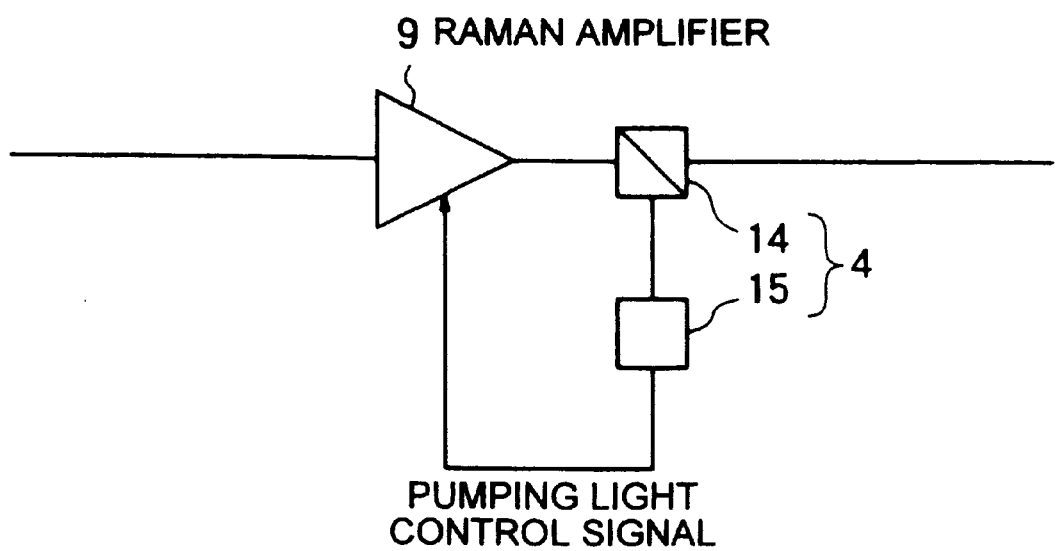
FIG. 27 is a diagram showing a control method for controlling output light power by monitoring output light.
Figure 28:
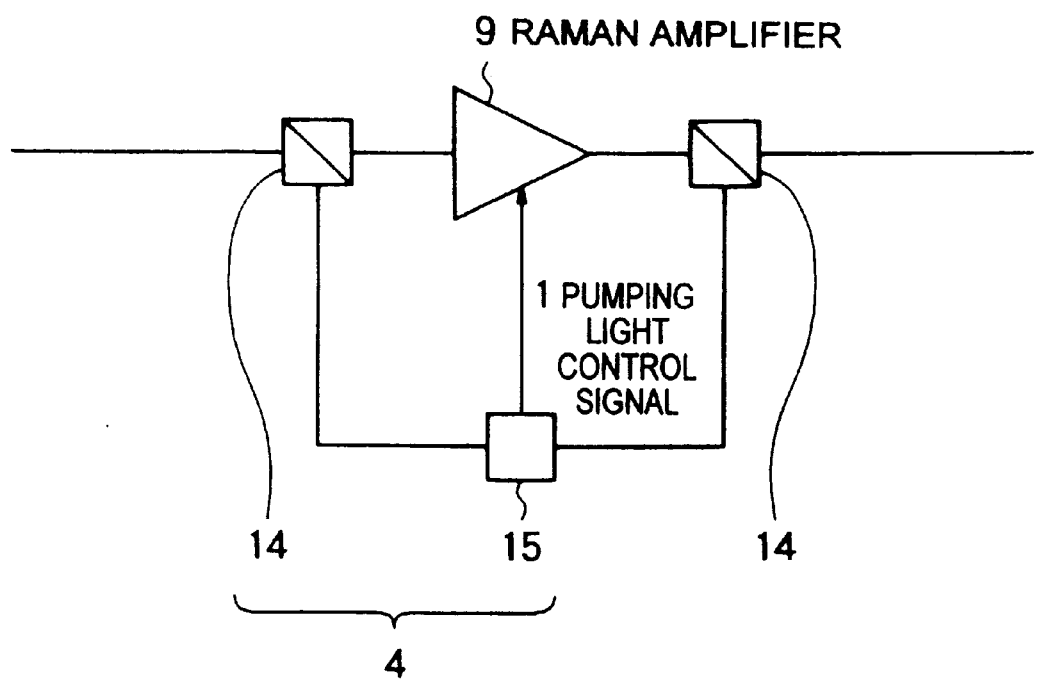
FIG. 28 is a diagram showing a control method for controlling output light power by monitoring input light and output light.
Figure 29:
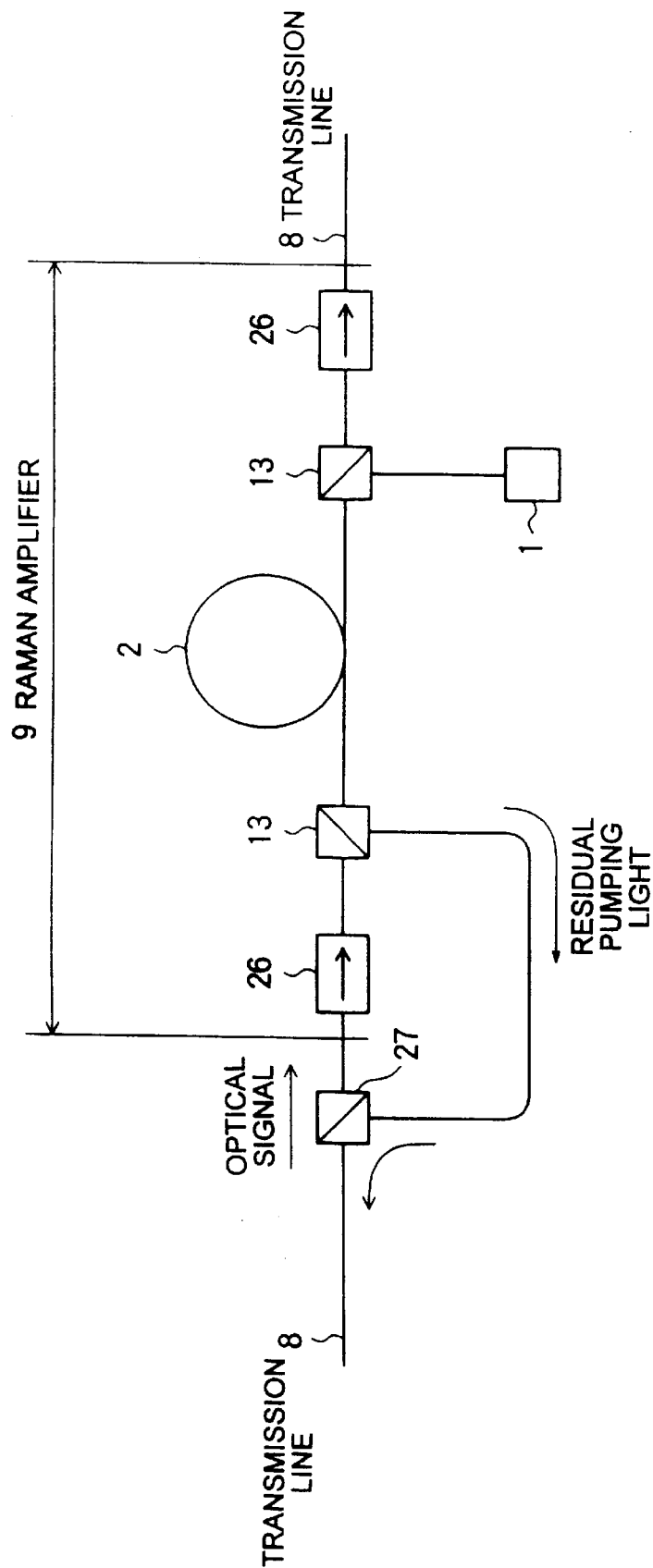
FIG. 29 is a diagram showing a first example of a method for obtaining Raman gain by coupling residual pumping light of the Raman amplifier to an optical fiber transmission line.
Figure 30:
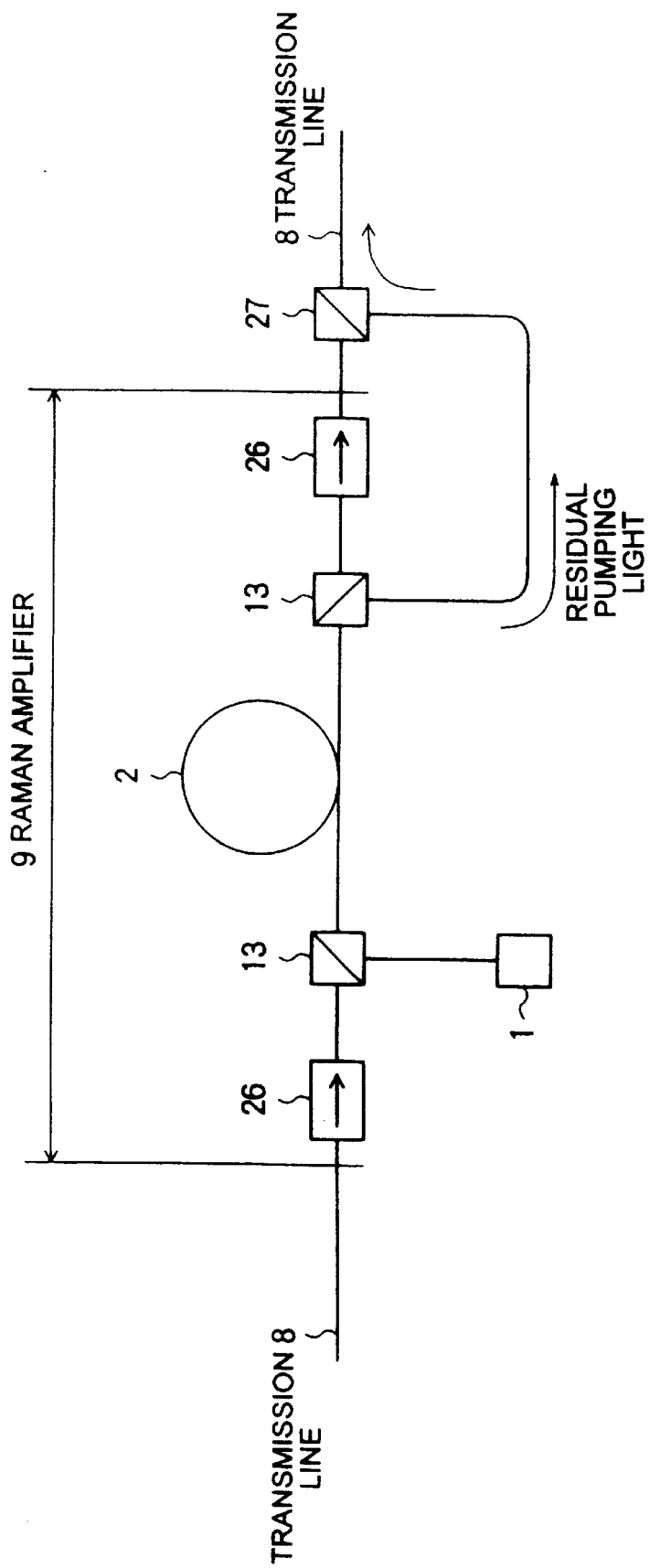
FIG. 30 is a diagram showing a second example of a method for obtaining Raman gain by coupling residual pumping light of the Raman amplifier to an optical fiber transmission line.
Figure 31:
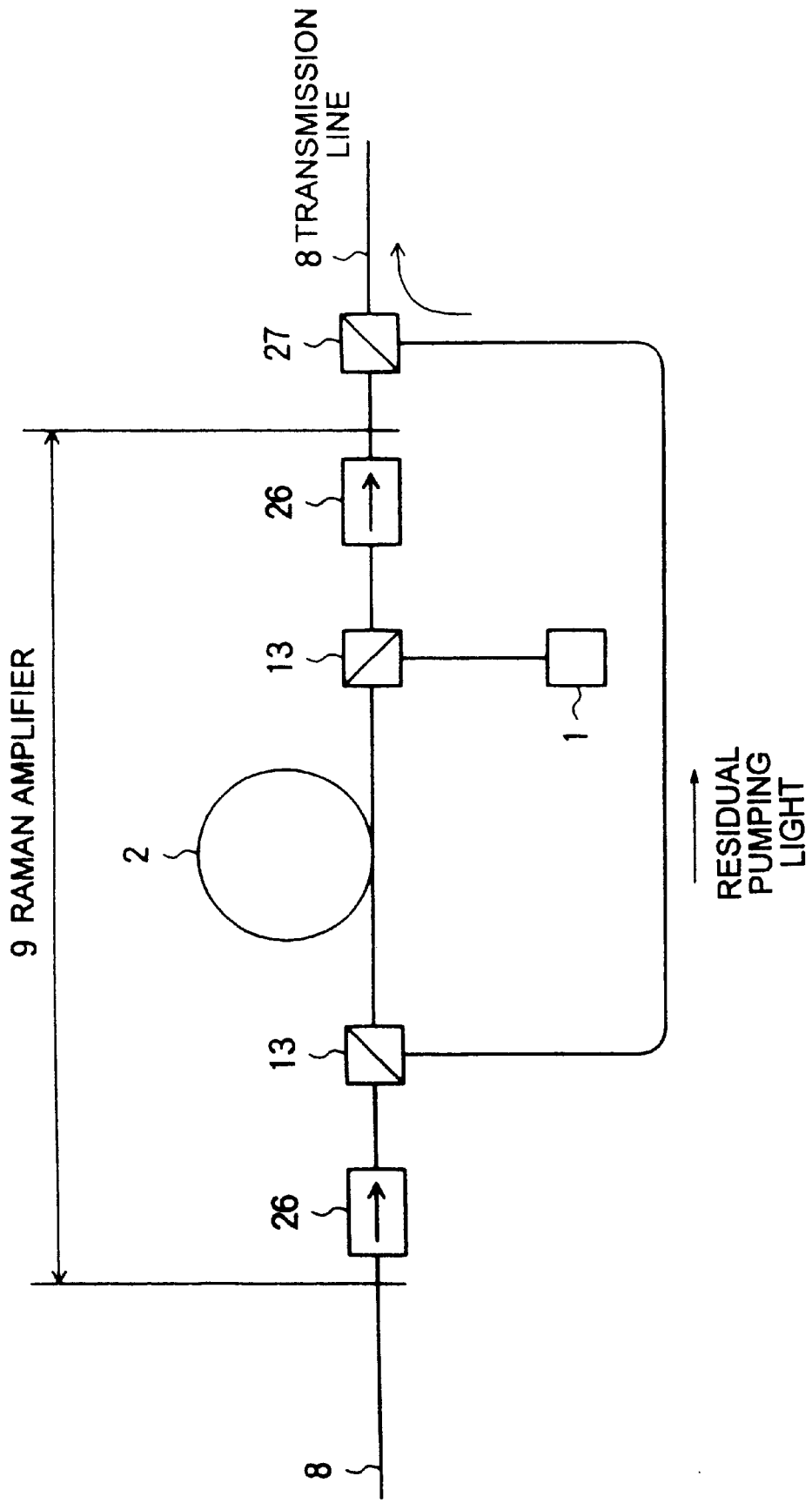
FIG. 31 is a diagram showing a third example of a method for obtaining Raman gain by coupling residual pumping light of the Raman amplifier to an optical fiber transmission line.
Figure 32:
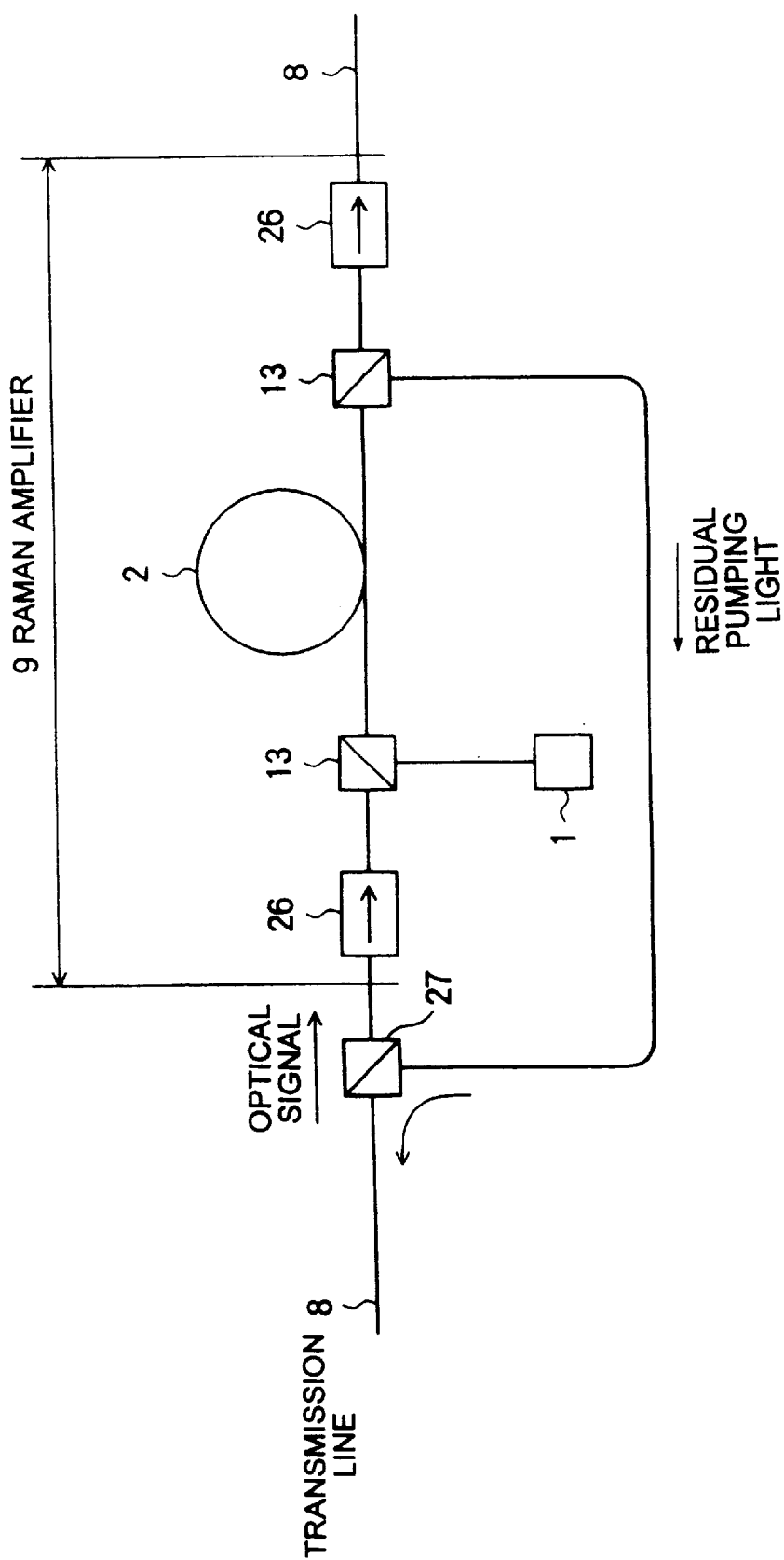
FIG. 32 is a diagram showing a fourth example of a method for obtaining Raman gain by coupling residual pumping light of the Raman amplifier to an optical fiber transmission line.
Figure 33:
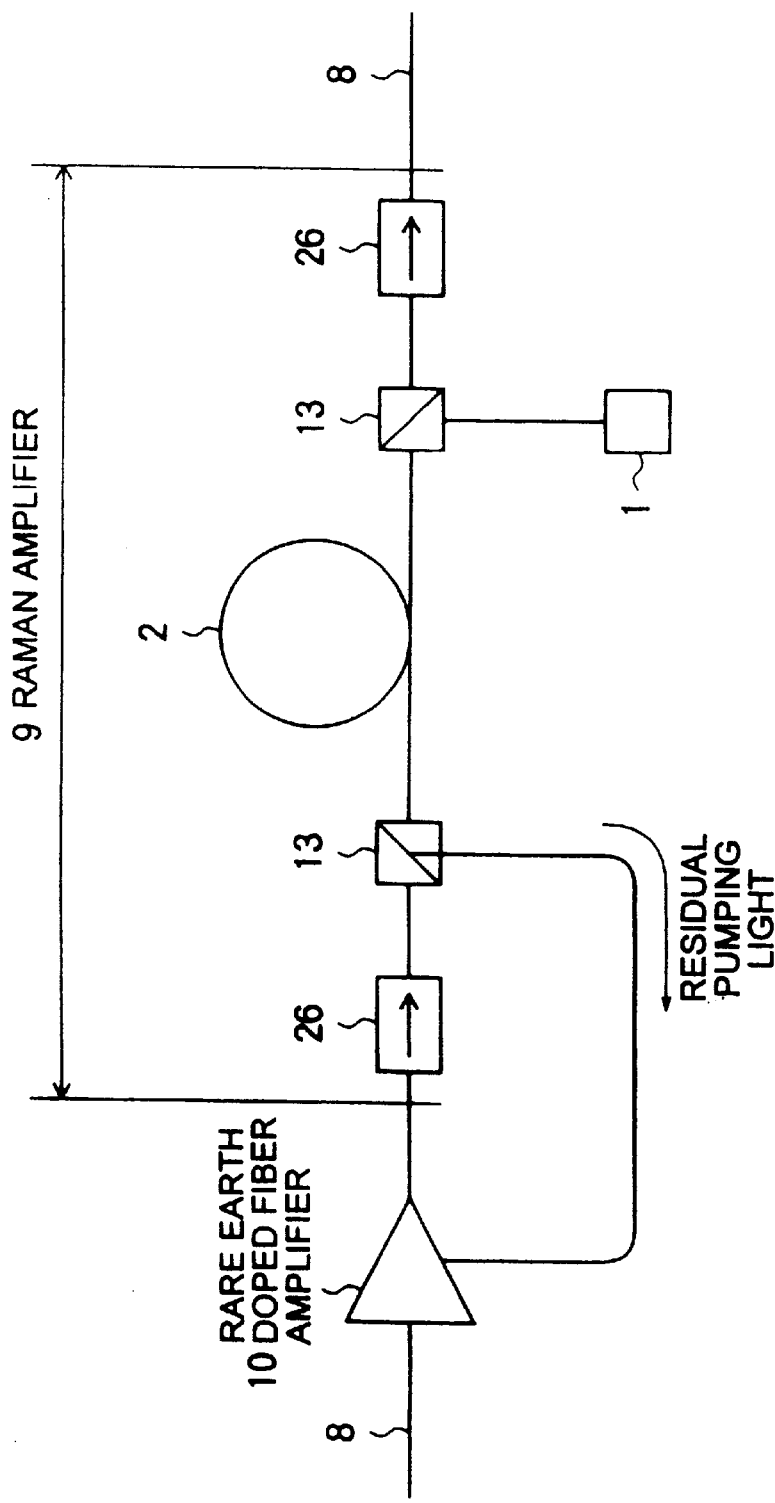
FIG. 33 is a diagram showing a first example of a method for utilizing the residual pumping light of the Raman amplifier as pumping light of EDFA.
Figure 34:
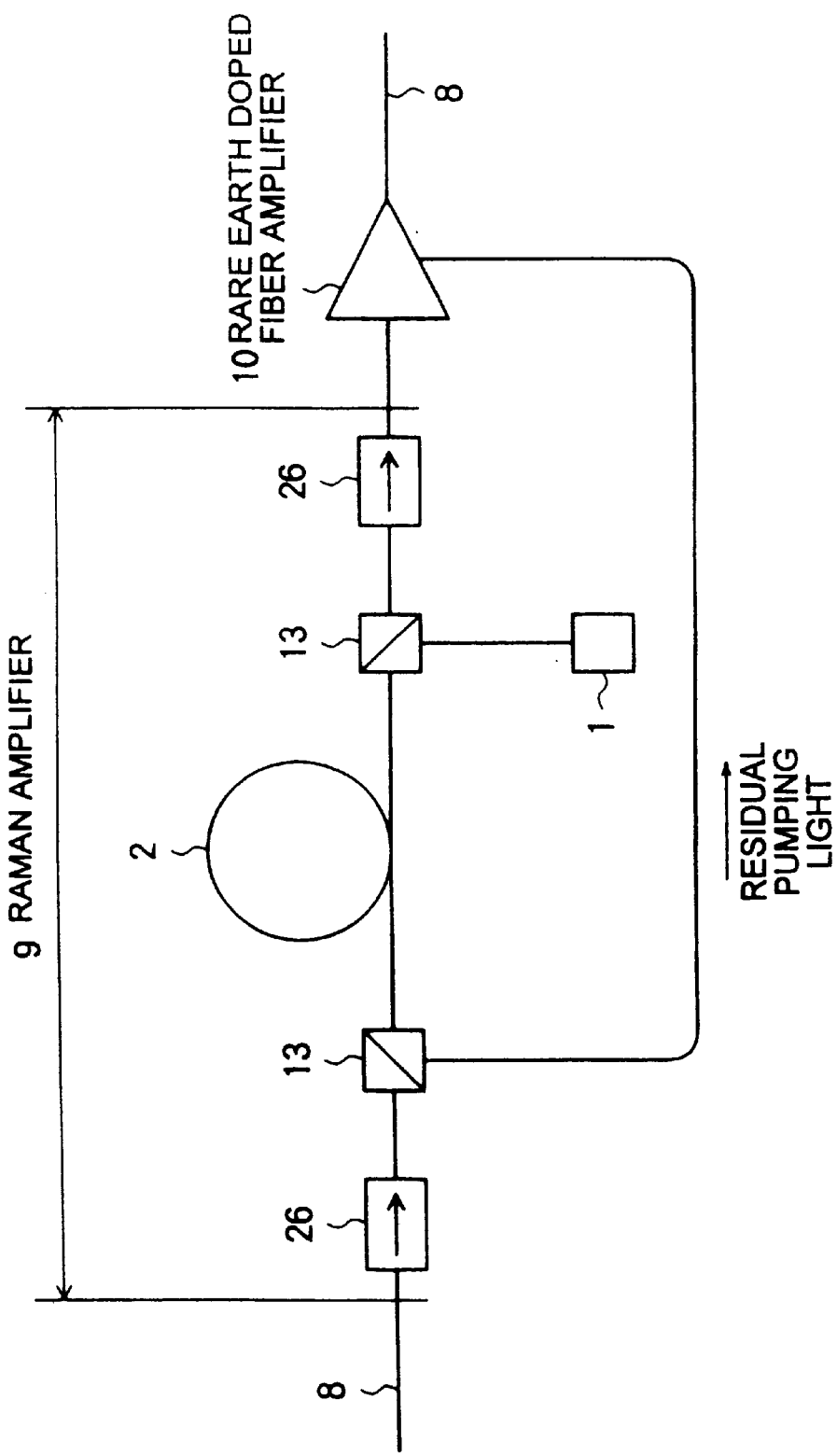
FIG. 34 is a diagram showing a second example of a method for utilizing the residual pumping light of the Raman amplifier as pumping light of EDFA.
Figure 35:
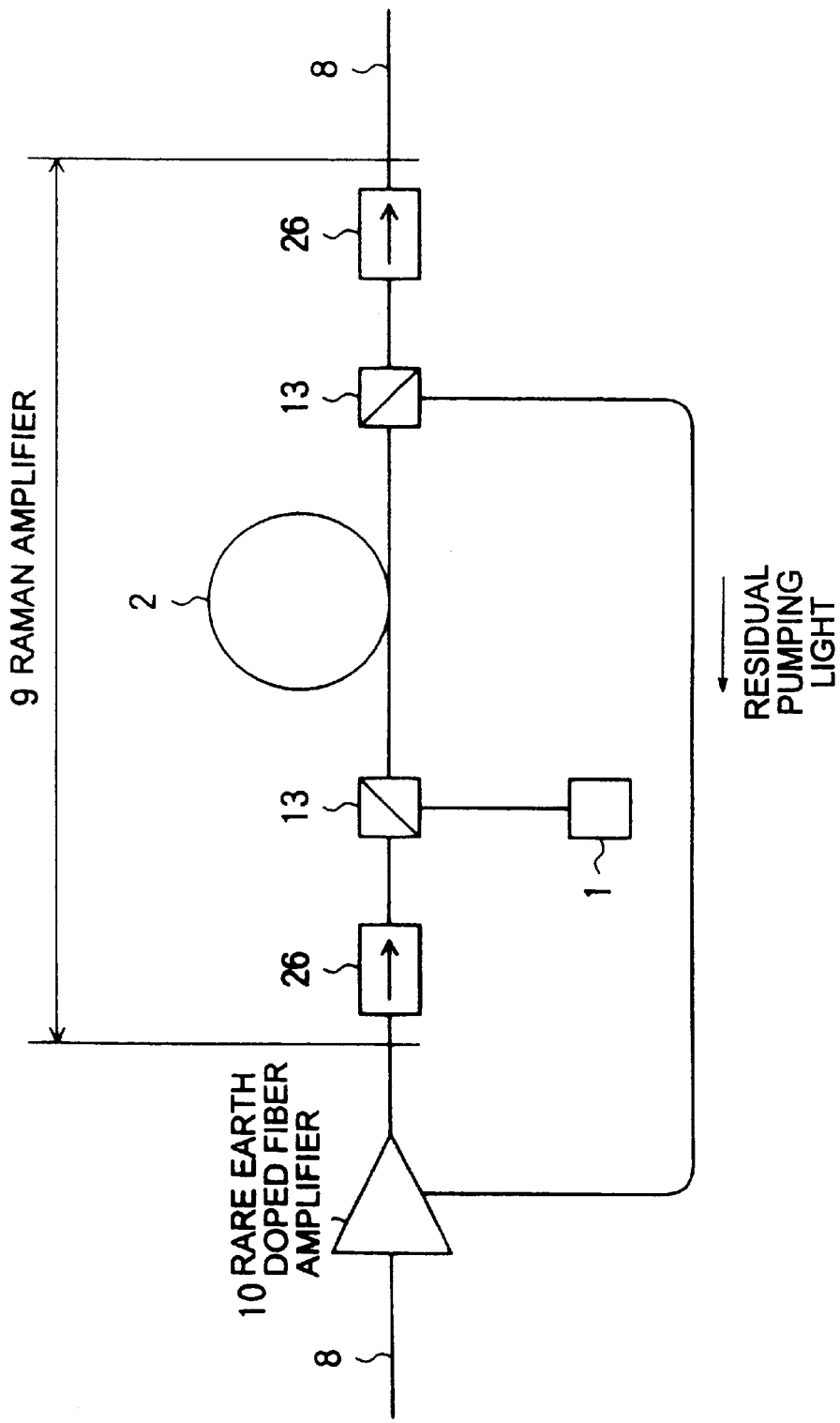
FIG. 35 is a diagram showing a third example of a method for utilizing the residual pumping light of the Raman amplifier as pumping light of EDFA.
Figure 36:
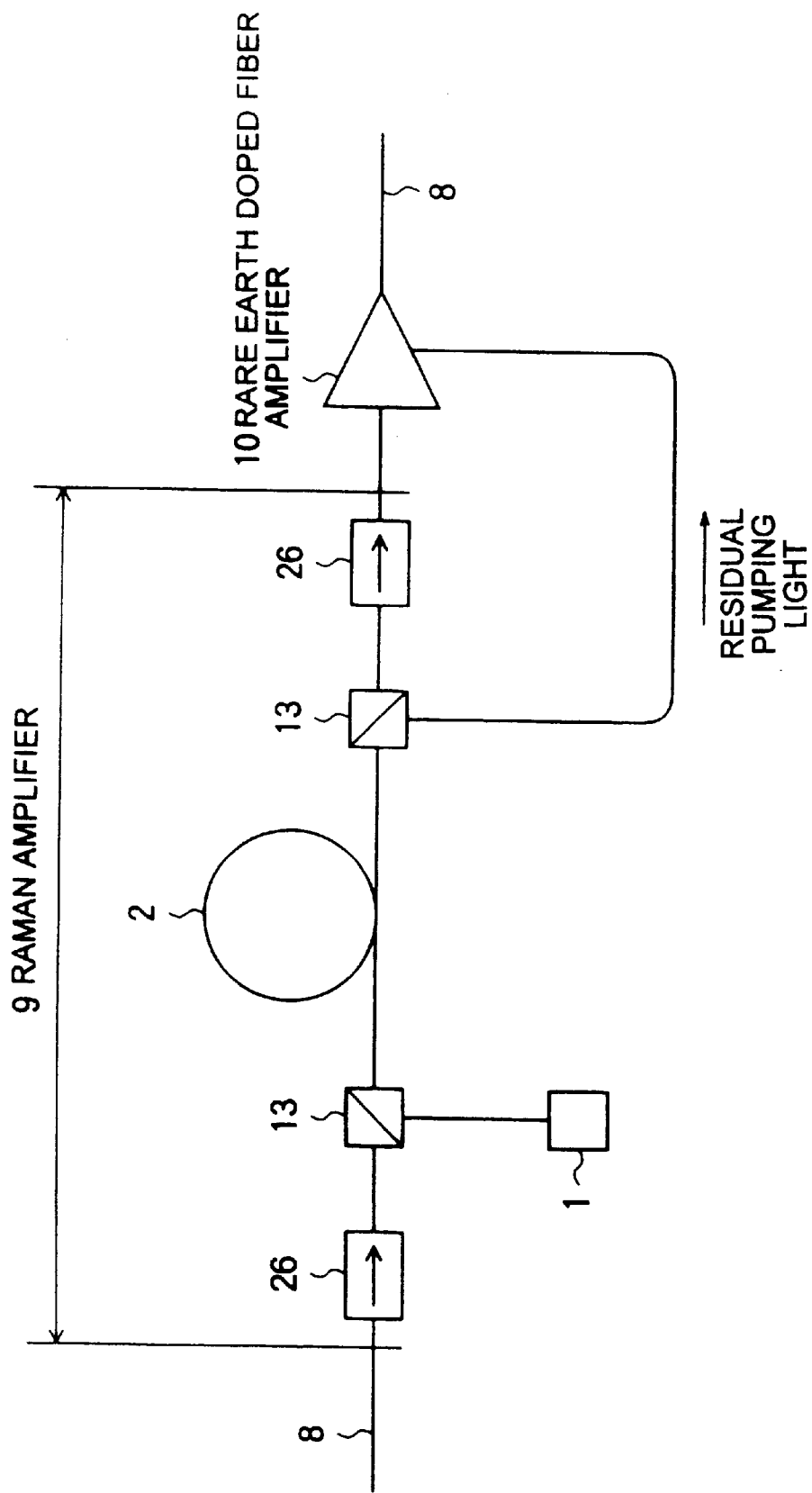
FIG. 36 is a diagram showing a fourth example of a method for utilizing the residual pumping light of the Raman amplifier as pumping light of EDFA.
Figure 37:
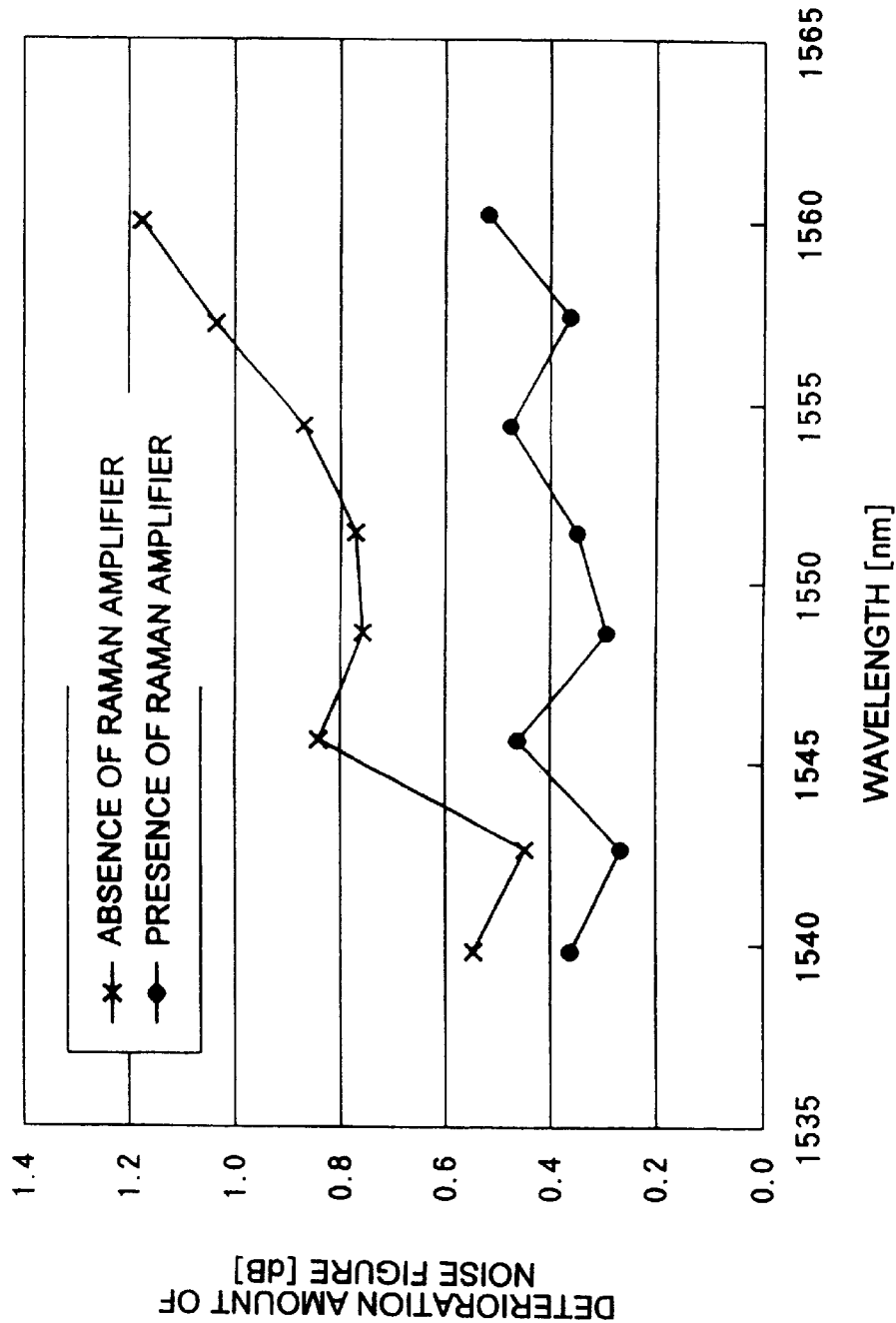
FIG. 37 is an illustration of deterioration of noise figure due to insertion of a dispersion compensating fiber.
Figure 38:
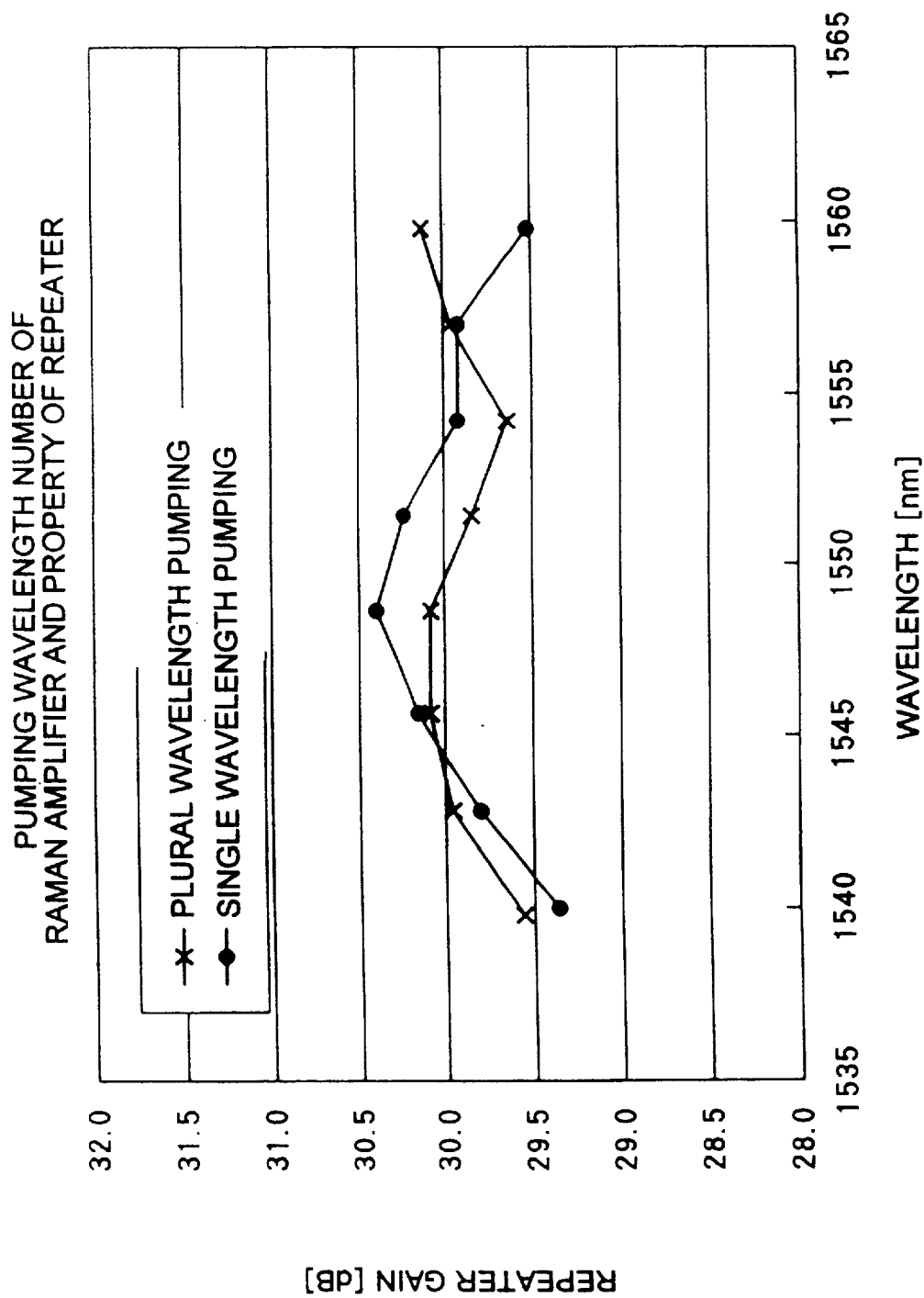
FIG. 38 is an illustration of the number of pumping wavelengths of the Raman amplifier and property of the repeater.
Figure 39:
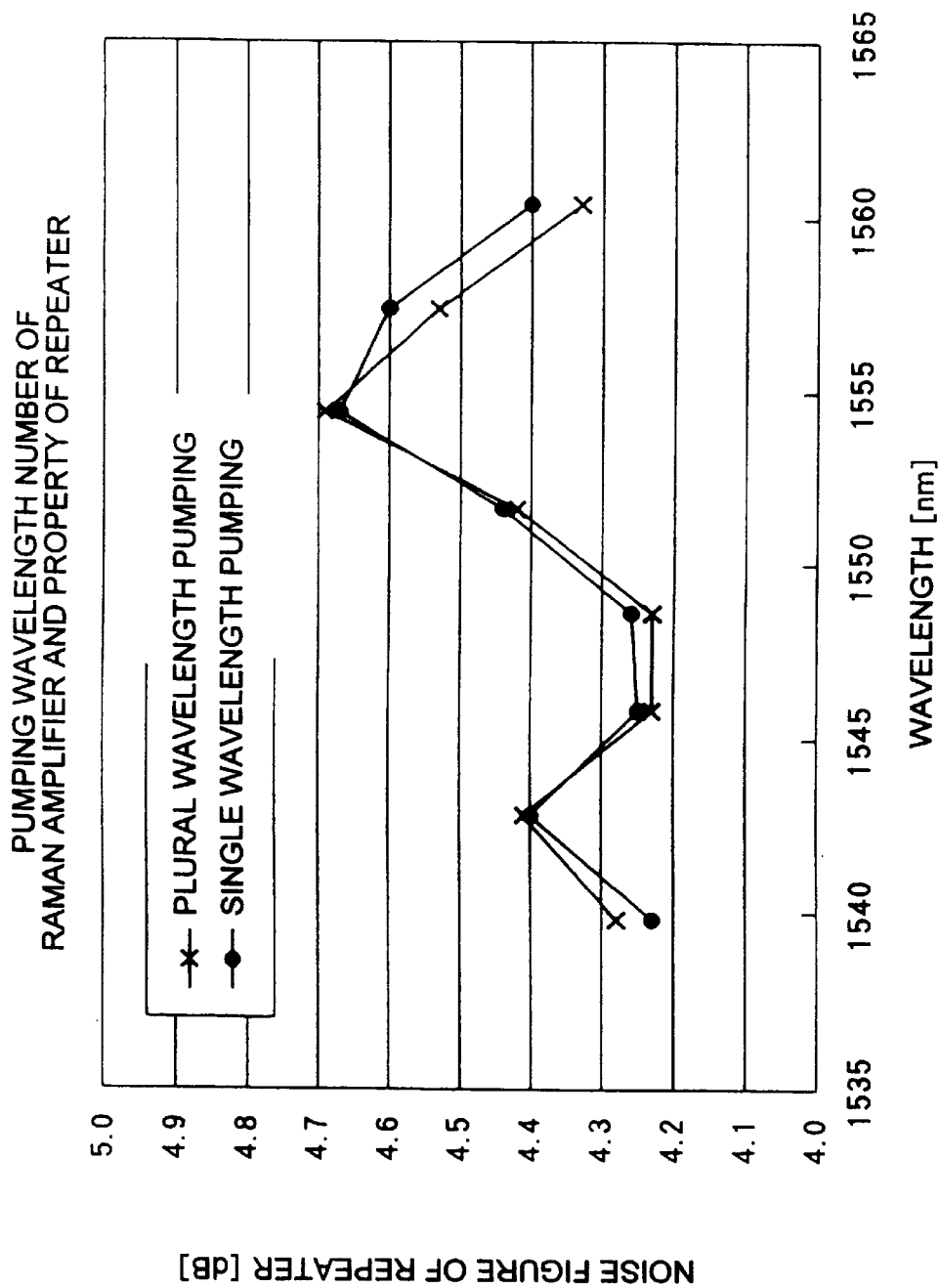
FIG. 39 is an illustration of the number of pumping wavelengths of the Raman amplifier and property of the repeater.

In an arrangement shown in FIG. 5, a monitor signal detecting and LD control signal generating circuit 15 comprising a power splitter 21, band pass filters 22, optical/electrical converting means 19 such as photo-diodes and an LD control circuit 20 is connected to a monitor light branching coupler 14. The power splitter 21 serves to branch the output light branched by the monitor light branching coupler 14 into lights having the same number as the pumping lights. The band pass filters 22 have different permeable central wavelengths, and, in this case, permit to pass lights near the maximum amplification wavelengths (each of which is a wavelength obtained by adding 100 nm to the pumping light wavelength) of the respective pumping lights (more specifically, when the pumping wavelengths are 1430 nm and 1460 nm, pass of wavelength lights near 1530 nm and 1560 nm are permitted). Each of the optical/electrical converting means 19 serves to convert the received wavelength light into an electrical signal, so that output voltage is varied with magnitude of the light receiving level. The LD control circuit 20 serves to change the drive currents for the semiconductor lasers 3 in accordance with the output voltages from the optical/electrical converting means 19, and, by calculating and processing the output voltage from the optical/electrical converting means 19, the semiconductor lasers 3 are controlled so that light powers of the wavelength lights are ordered or aligned. That is to say, the output light power controlling means 4 acts to eliminate the wavelength dependency of the Raman gain thereby to flatten the gain. Although FIGS. 4 and 5 show arrangements for controlling the pumping means 1 by monitoring the output light as shown in FIG. 27, as shown in FIG. 26, an arrangement for controlling the pumping means 1 by monitoring the input light can be utilized, or, as shown in FIG. 28, an arrangement for controlling the pumping means 1 by monitoring both the input light and the output light can be utilized.

Figure 6A:
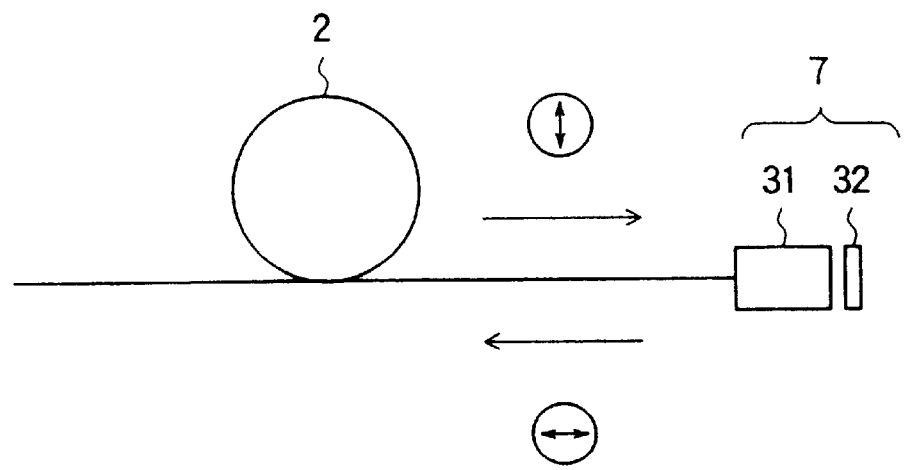
FIGS. 6A and 6B are diagrams showing different examples of a polarization plane rotating means in the Raman amplifier according to the present invention.
Figure 6B:
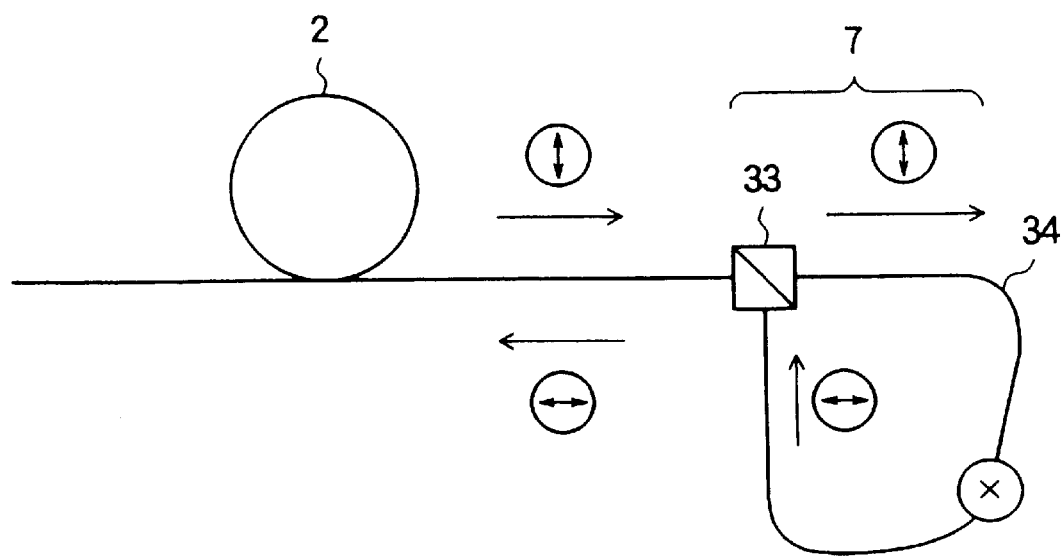

In the Raman amplifiers having the above-mentioned constructions, in place of the fact the pumping lights are combined by the polarization wave composing coupler 6, as shown in FIGS. 6A and 6B, a polarization plane rotating means 7 for rotating polarization plane of the pumping light by 90 degrees may be provided, so that the plural pumping lights generated by the pumping means 1 and pumping lights having polarization planes perpendicular to those of the former pumping lights are simultaneously pumped in the amplifier fiber 2. FIG. 6A shows an arrangement in which a Faraday rotator 3, and a total reflecting mirror 3, are provided at an end of the amplifier fiber 2 so that the polarization plane of the pumping light propagated to the amplifier fiber 2 is rotated by 90 degrees to be returned to the amplifier fiber 2 again. In FIG. 6, a means for picking up the optical signal propagated to and Raman-amplified in the amplifier fiber 2 from the fiber 2 is not shown. FIG. 6B shows an arrangement in which a PBS 33 and a polarization maintaining fiber 34 are provided at an end of the amplifier fiber 2 so that the polarization plane of the pumping light outputted from the end of the amplifier fiber 2 is rotated by 90 degrees by the polarization maintaining fiber 34 connected to twist its main axis by 90 degrees, to be inputted to the end of the amplifier fiber 2 again through the PBS 33.

(First Embodiment of Optical Repeater)

Figure 7:
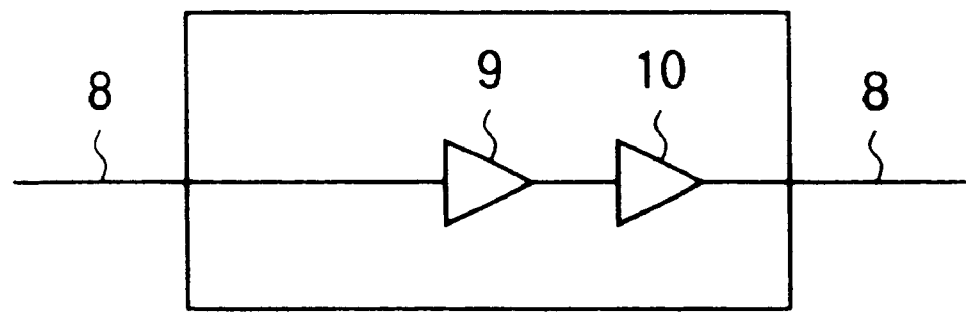
FIG. 7 is a diagram showing a first embodiment of an optical repeater according to the present invention.

FIG. 7 shows a first embodiment of an optical repeater constructed by using the Raman amplifier according to the present invention. In this example, the optical repeater is inserted into an optical fiber transmission line 8 to compensate loss in the optical fiber transmission line 8. In this optical repeater, a rare earth doped fiber amplifier (referred to as "BDFA" hereinafter) 10 is connected to a roar stage of the Raman amplifier 9 as shown in FIG. 1, 2 or 3 so that the optical signal transmitted to the optical fiber transmission line 8 is inputted to the Raman amplifier 9 to be amplified and then is inputted to the EDFA 10 to be further amplified and then is outputted to the optical fiber transmission line 8. The gain of the repeater may be adjusted by the Raman amplifier 9 or by the EDFA 10 or by both amplifiers so long as the loss of the optical fiber transmission line 8 can be compensated in total. Further, by properly combining a difference between the wavelength dependency of gain of the EDFA 10 and the wavelength dependency of the Raman amplifier 9, the wavelength dependency of gain of the EDFA 10 can be reduced by the wavelength dependency of the Raman amplifier 9.

(Second Embodiment of Optical Repeater)

Figure 8:
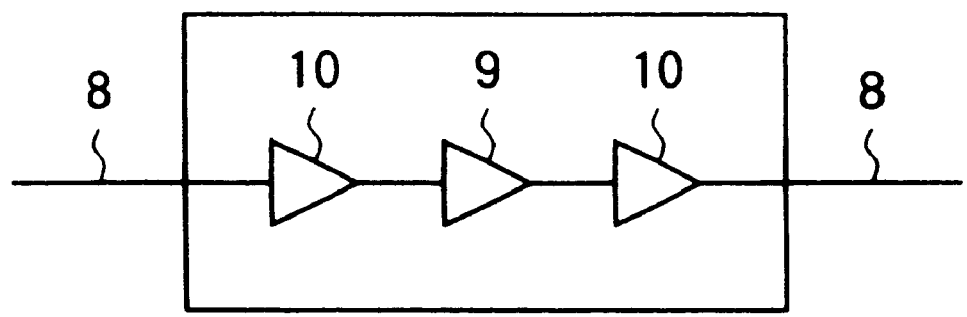
FIG. 8 is a diagram showing a second embodiment of an optical repeater according to the present invention.

FIG. 8 shows a second embodiment of an optical repeater constructed by using the Raman amplifier according to the present invention. According to this embodiment, in the optical repeater shown in FIG. 7, an additional EDFA 10 is also provided at a front stage of the Raman amplifier 9. Incidentally, the EDFA 10 may be provided only at the front stage of the Raman amplifier 9.

(Third Embodiment of Optical Repeater)

Figure 9:
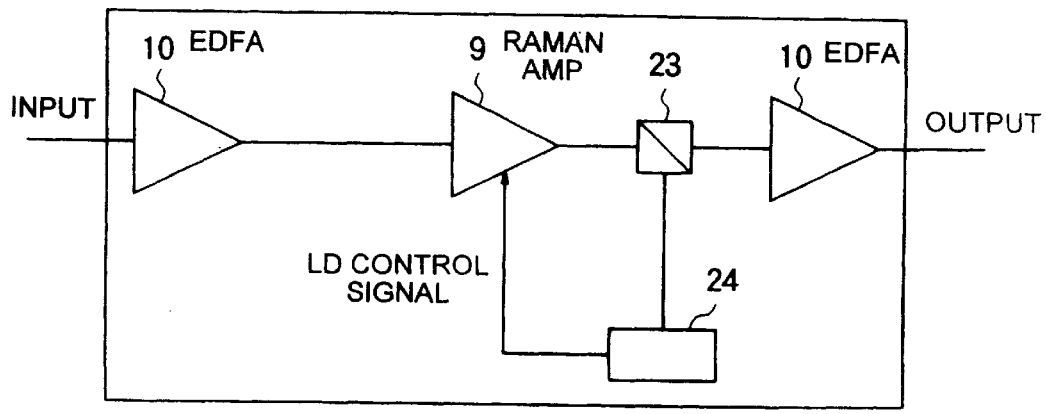
FIG. 9 is a diagram showing a third embodiment of an optical repeater according to the present invention.

FIG. 9 shows a third embodiment of an optical repeater constructed by using the Raman amplifier according to the present invention. According to this embodiment, there is provided a Raman amplifier 9 in which a dispersion compensating fiber (DCF) is used as the amplifier fiber 2 between two EDFAs 10. Between the Raman amplifier 9 and the EDFA 10 at the rear stage thereof, there are provided a branching coupler 23 for branching the output light from the Raman amplifier 9, and a monitor signal detecting and LD control signal generating circuit 24 for monitoring the branched light and for controlling the gain of the Raman amplifier 9. The monitor signal detecting and LD control signal generating circuit 24 is a control circuit capable of keeping the output power of the Raman amplifier 9 to a predetermined value. Incidentally, when the Raman amplifier 9 itself has the controlling means 4 as shown in FIG. 4 or FIG. 5, the power of the output light is controlled to become the predetermined value, and, at the same time, the power of the pumping light is controlled so that level deviation between plural output signals become small.

In the optical repeater shown in FIG. 9, the output light level of the Raman amplifier 9, i.e., input level to the second EDFA 10 is always kept constant without being influenced by the loss of the DCF and the output level of the first EDNA 10. This ensures that, when the output of the repeater is defined, the gain of the second EDPA 10 is kept constant. In this way, deterioration of gain flatness of the second EDFA 10 due to fluctuation in loss of the DCF is avoided. Further, when the first EDFA 10 is controlled so that the gain becomes constant, the fluctuation of input to the repeater is compensated by the varying of gain of the Raman amplifier 9. Namely, the adjustment is effected only on the basis of the gain of the Raman amplifier 9, with the result that the deterioration of gain flatness due to fluctuation in gain of the EDFA 10 can be avoided completely.

(Fourth Embodiment of Optical Repeater)

Figure 10:
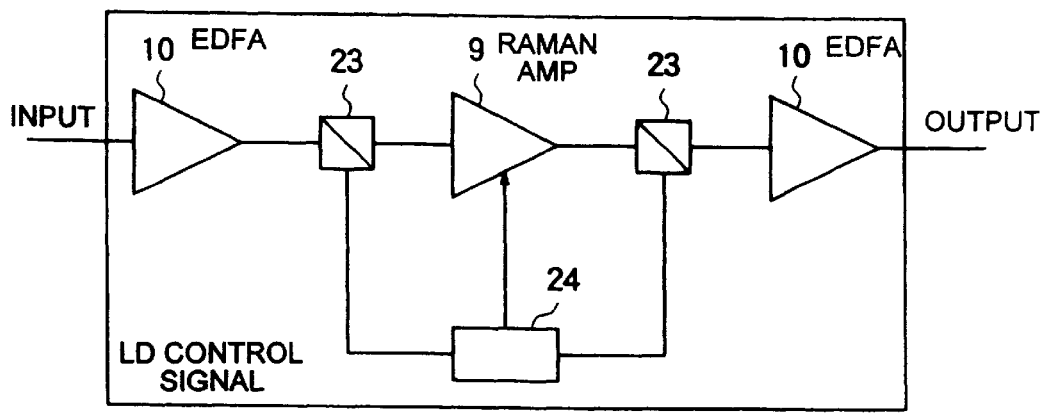
FIG. 10 is a diagram showing a fourth embodiment of an optical repeater according to the present invention.

FIG. 10 shows an example that, in the embodiment shown in FIG. 9, a control means for adjusting the gain of the Raman amplifier 9 by monitoring the light level is also provided between the first EDFA 10 and the Raman amplifier 9. By using such control means, the pumping light can be controlled to keep the difference between the input and output levels of the Raman amplifier 9 constant, with the result that only the dispersion of the loss of the DCF can be compensated.

(Fifth Embodiment of Optical Repeater)

Figure 11:
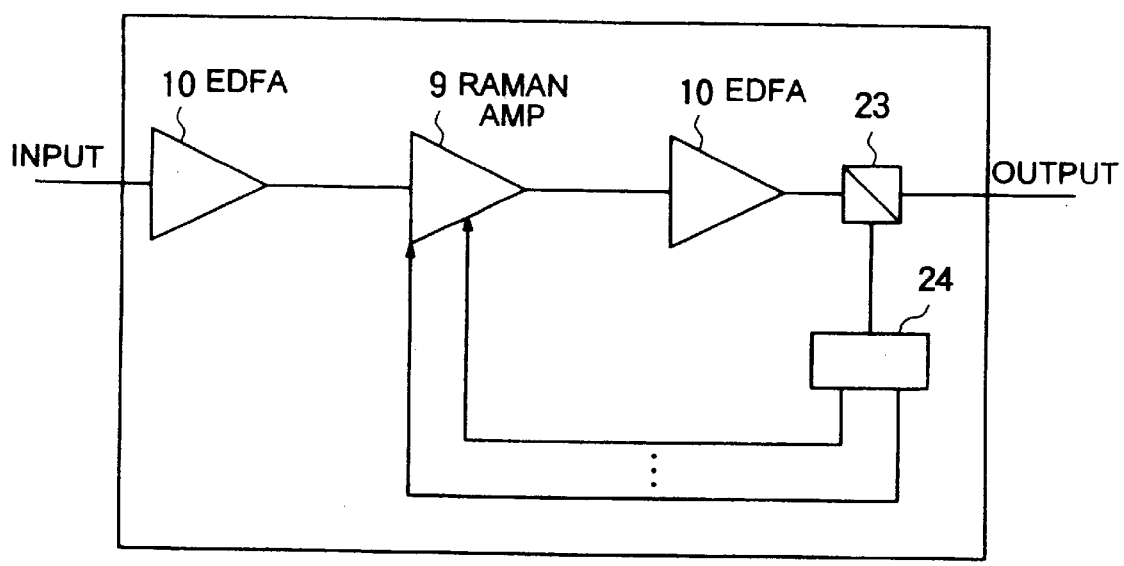
FIG. 11 is a diagram showing a fifth embodiment of an optical repeater according to the present invention.
Figure 12:
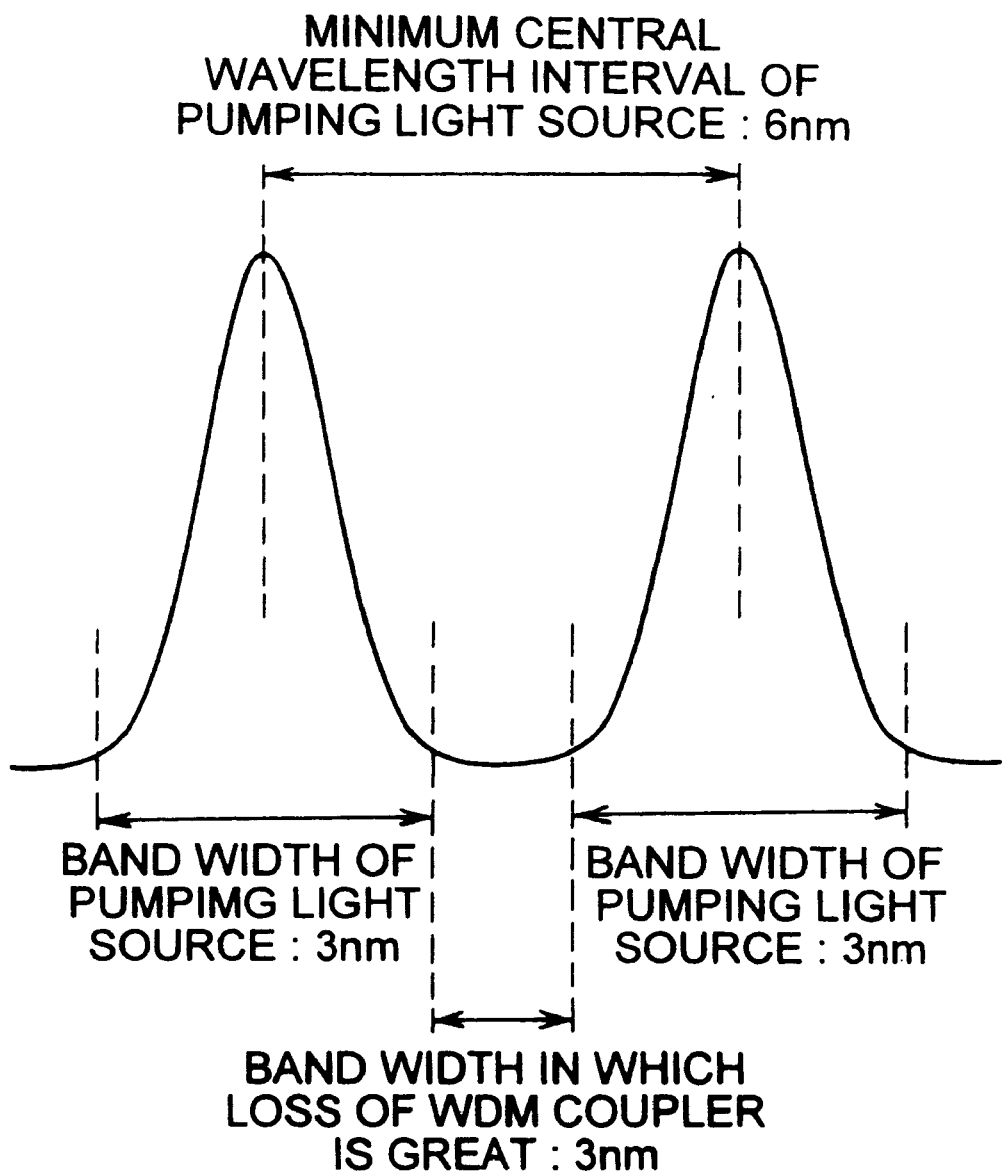
FIG. 12 is an illustration of why a wavelength interval of pumping light is selected to be greater than 6 nm.
Figure 13:
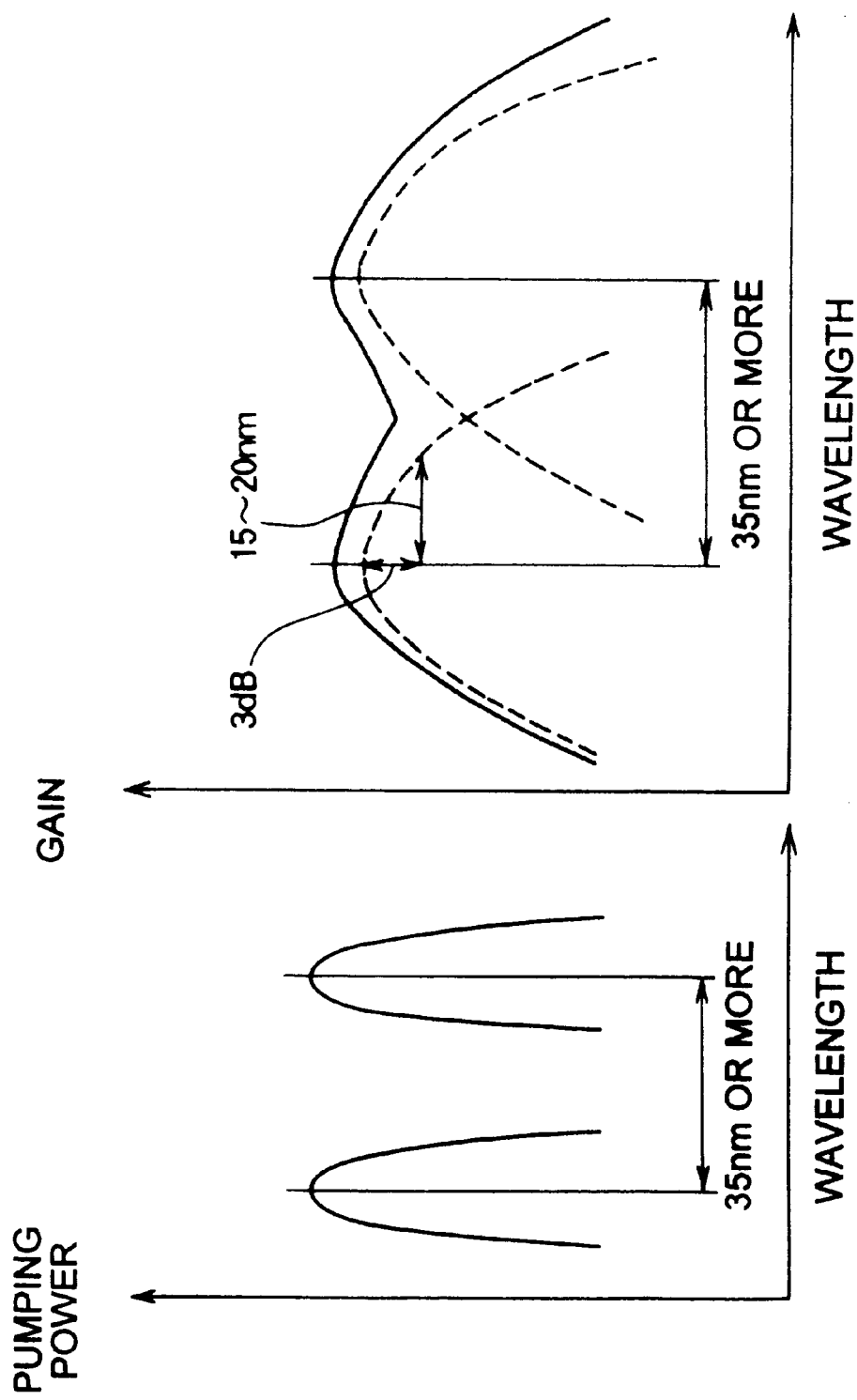
FIGS. 13A and 13B are illustrations of why a wavelength interval of pumping light is selected to be smaller than 35 nm.
Figure 14:
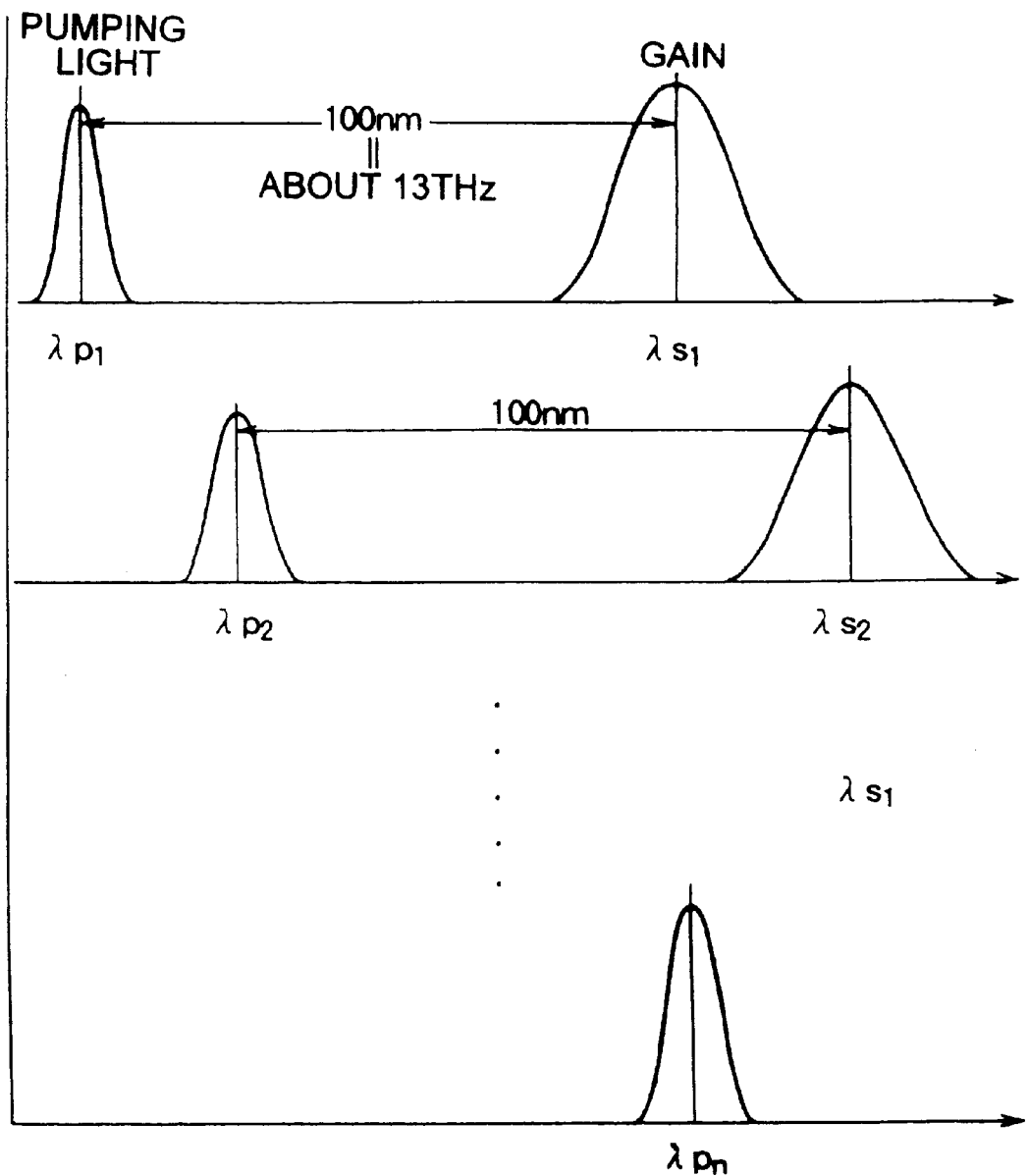
FIG. 14 is an illustration of why a difference between a longest wavelength and a shortest wavelength is selected to be smaller than 100 nm.
Figure 15:
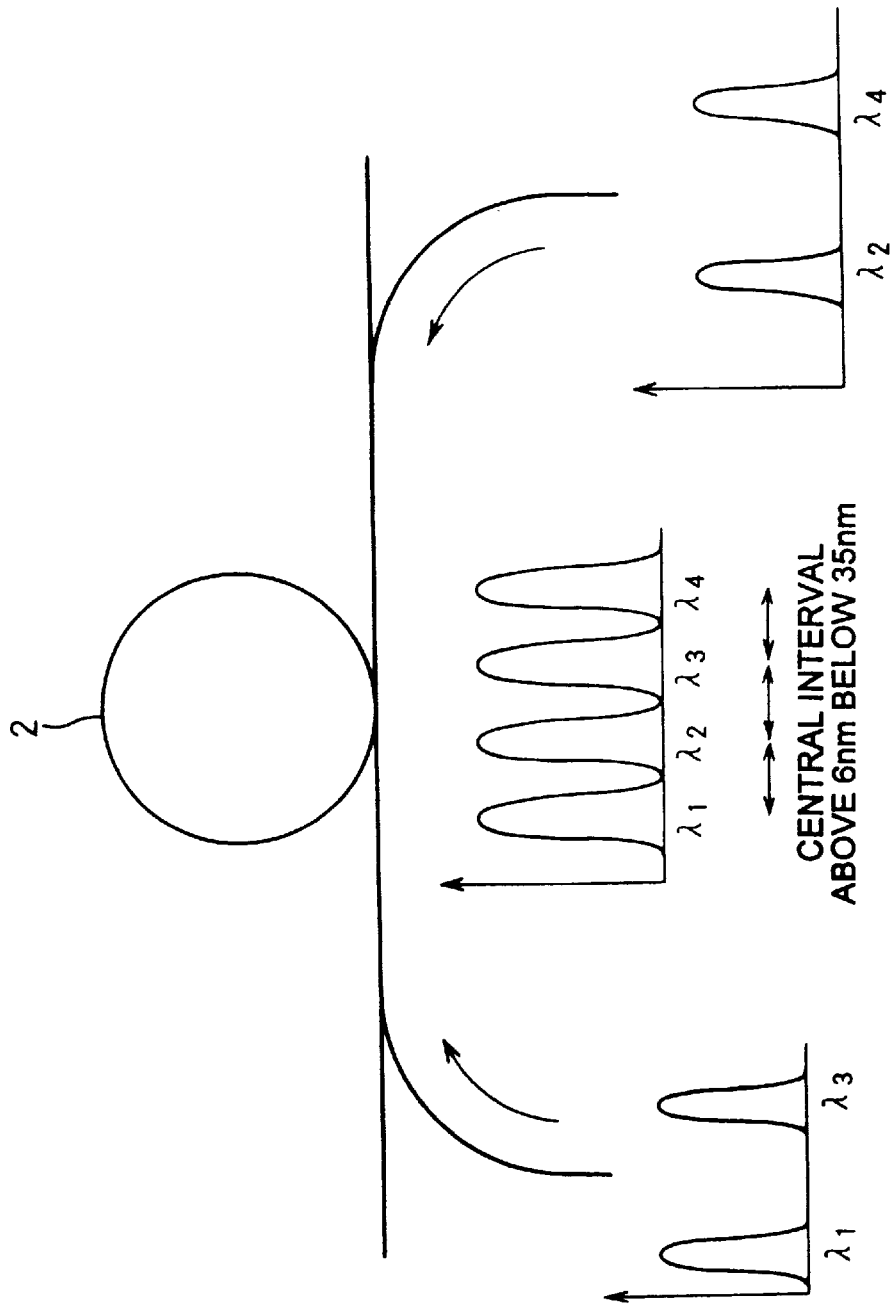
FIG. 15 is an illustration of an example of wavelength arrangement of pumping lights in bi-directional pumping.
Figure 16:
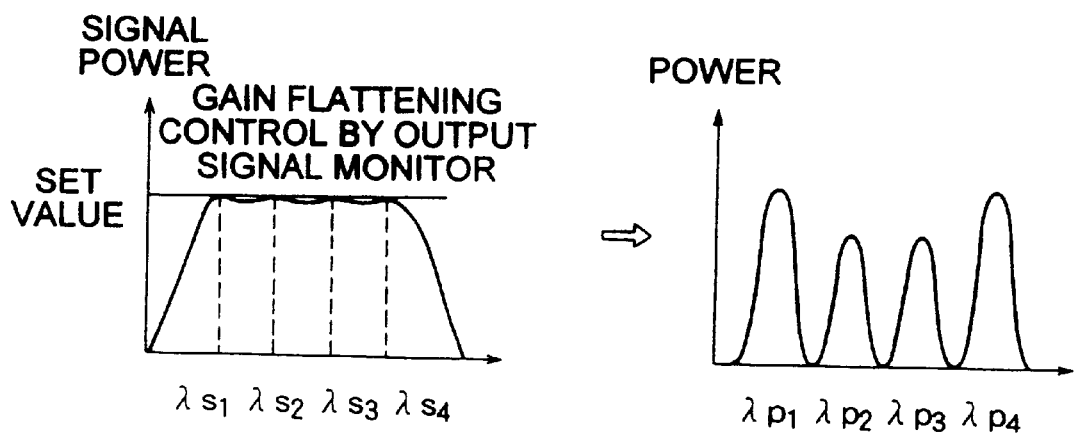
FIG. 16 is an illustration of how a condition that a gain over a specified band is flattened by controlling pumping light power.
Figure 18:
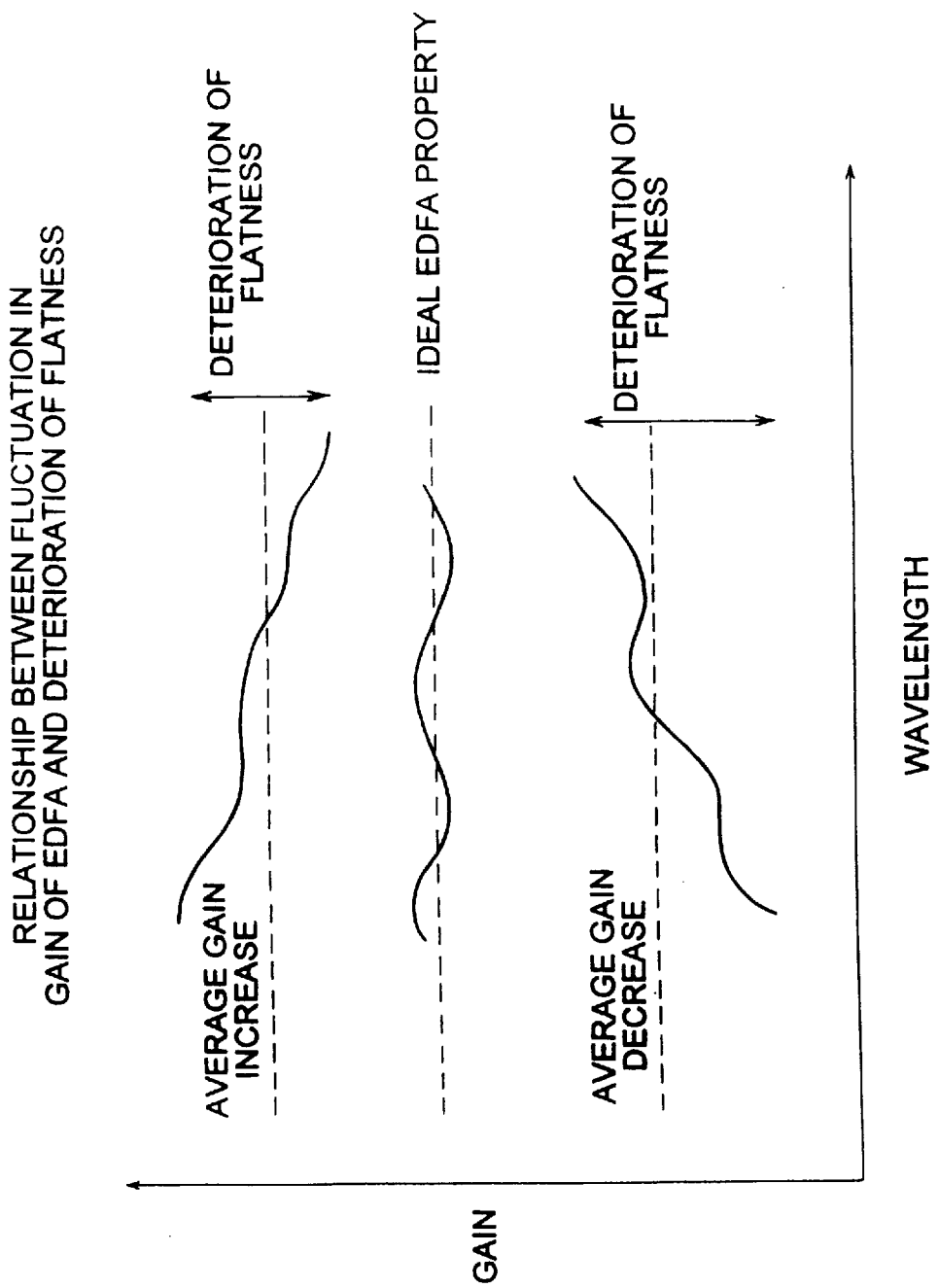
FIG. 18 is an illustration of a relationship between fluctuation in gain of EDFA and deterioration of flatness.
Figure 19A:
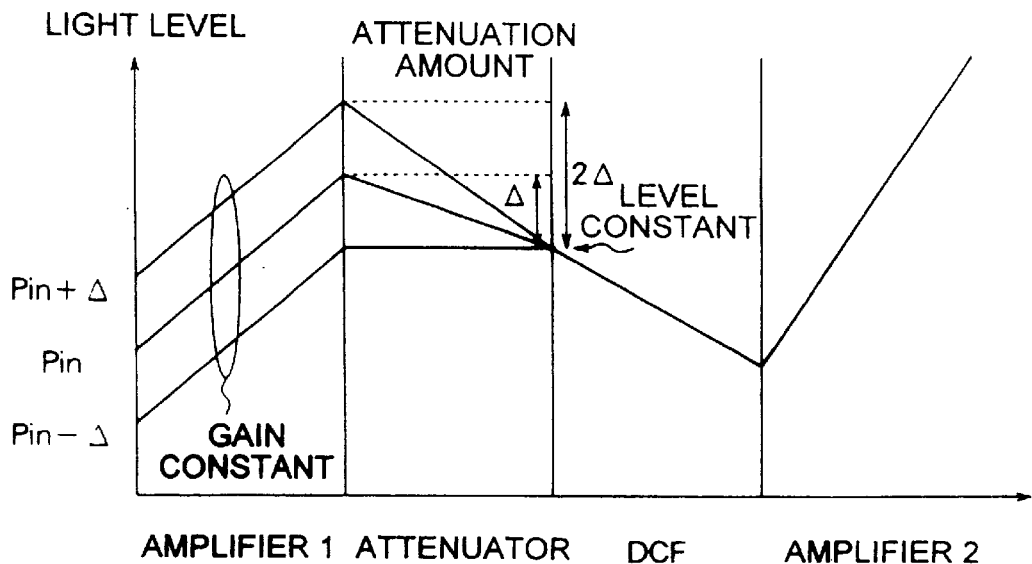
FIG. 19A is an illustration of how a condition that fluctuation in input level due to a variable attenuator is compensated.
Figure 19B:
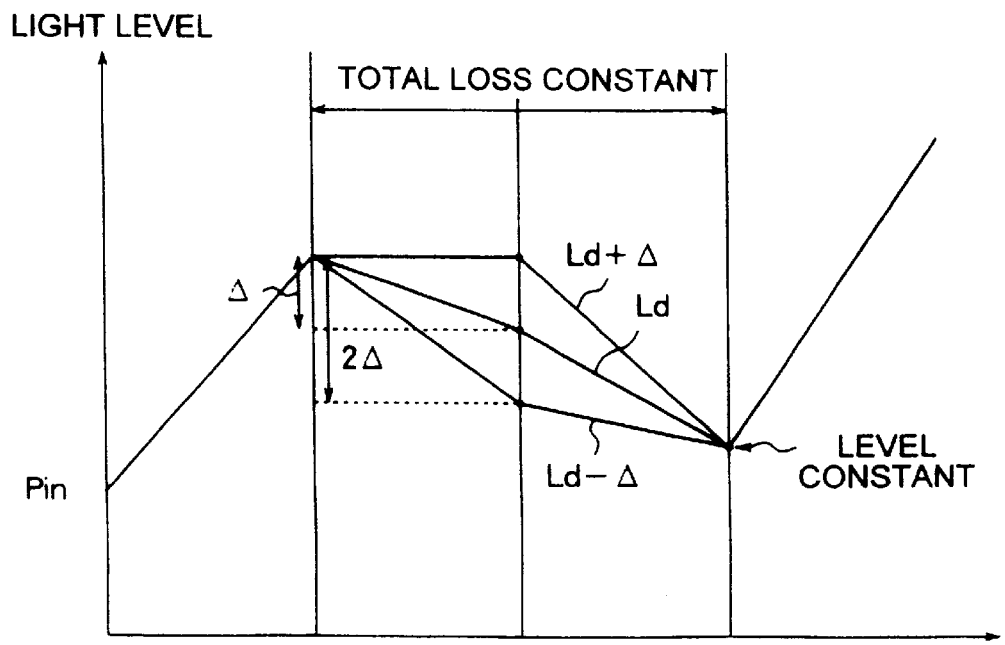
FIG. 19B is an explanatory view showing a condition that fluctuation in loss of DCF due to a variable attenuator is compensated.
Figure 21A:
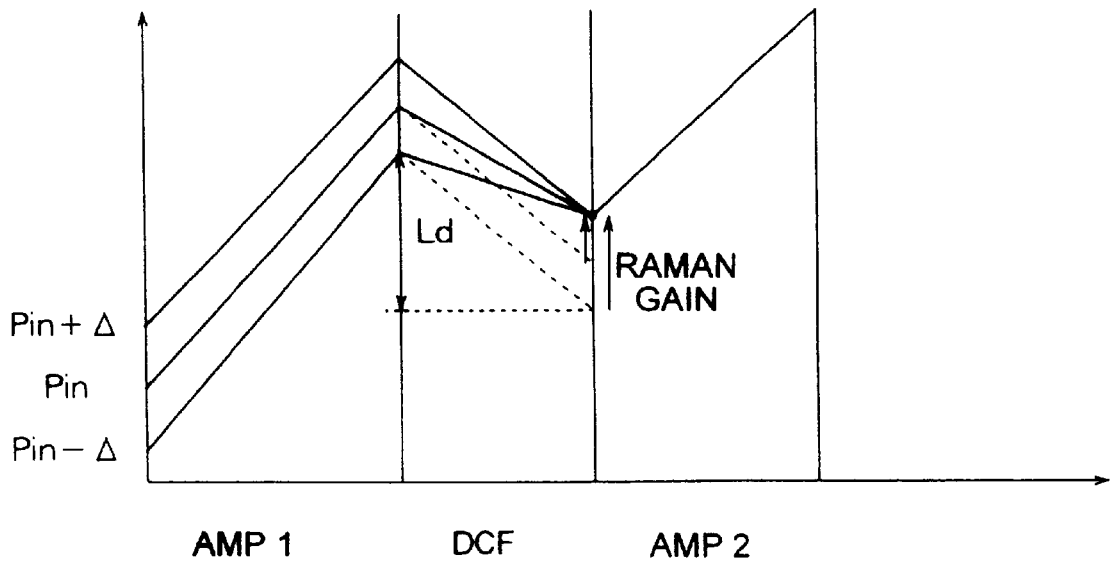
FIG. 21A is an illustration of how a condition that fluctuation in input level due to the Raman amplification is compensated.
Figure 21B:
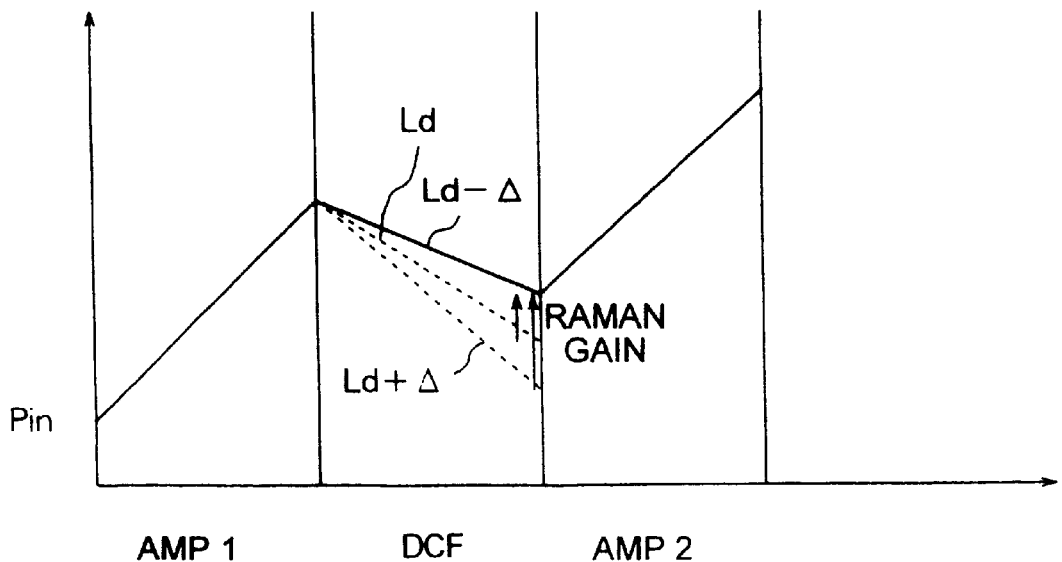
FIG. 21B is an explanatory view showing a condition that fluctuation in loss of DCF due to the Raman amplification is compensated.

FIG. 11 shows an example that, in the above-mentioned embodiment, the gain flattening monitor mechanism is shifted to the output end of the repeater and is used as a monitor for flattening the gain of the entire repeater. In this case, the first EDFA 10 and the second EDFA 10 may perform the gain constant control or the output constant control. The powers of the pumping lights are independently controlled to reduce the level deviation between the output signals at the output of the repeater.

(Sixth Embodiment of Optical Repeater)

In an optical repeater according to a sixth embodiment of the present invention, a dispersion compensating fiber is used as the amplifier fiber 2 of the Raman amplifier shown in FIG. 1, 2 or 3 to compensate dispersion of wavelength of the optical fiber transmission line 8, so that the losses in the optical fiber transmission line 8 and the amplifier fiber 2 are compensated partially or totally.

(Seventh Embodiment of Optical Repeater)

In the above-mentioned embodiment of the optical repeater, a Raman amplifier 9 using an pumping means 1 shown in FIG. 41, 42, 43 or 44 may be constituted (Eighth Embodiment of Optical Repeater)

As shown in FIGS. 29 to 32, WDM couplers 13 are inserted on the way of the amplifier fiber 2 of the Raman amplifier 9 so that residual pumping light from the pumping means 1 propagated to the amplifier fiber 2 is inputted to the optical fiber transmission line 8 through a WDM coupler 27 provided in the optical fiber transmission line 8 at the input or output side of the Raman amplifier 9, thereby also generating Raman gain in the optical fiber transmission line 8. Incidentally, in FIGS. 29 to 32, the reference numeral 26 denotes an isolator.

(Ninth Embodiment of Optical Repeater)

As shown in FIGS. 33 to 36, when the optical repeater comprises the Raman amplifier 9 and the EDFA 10, WDM couplers 13 are inserted on the way of the amplifier fiber 2 of the Raman amplifier 9 so that residual pumping light from the pumping means 1 propagated to the amplifier fiber 2 is inputted to the EDFA 10 to be used as pumping light/ auxiliary pumping light for the EDFA 10. Incidentally, in FIGS. 33 to 36, the reference numeral 26 denotes an isolator.

(First Embodiment of Raman Amplifying Method)

Figure 50:
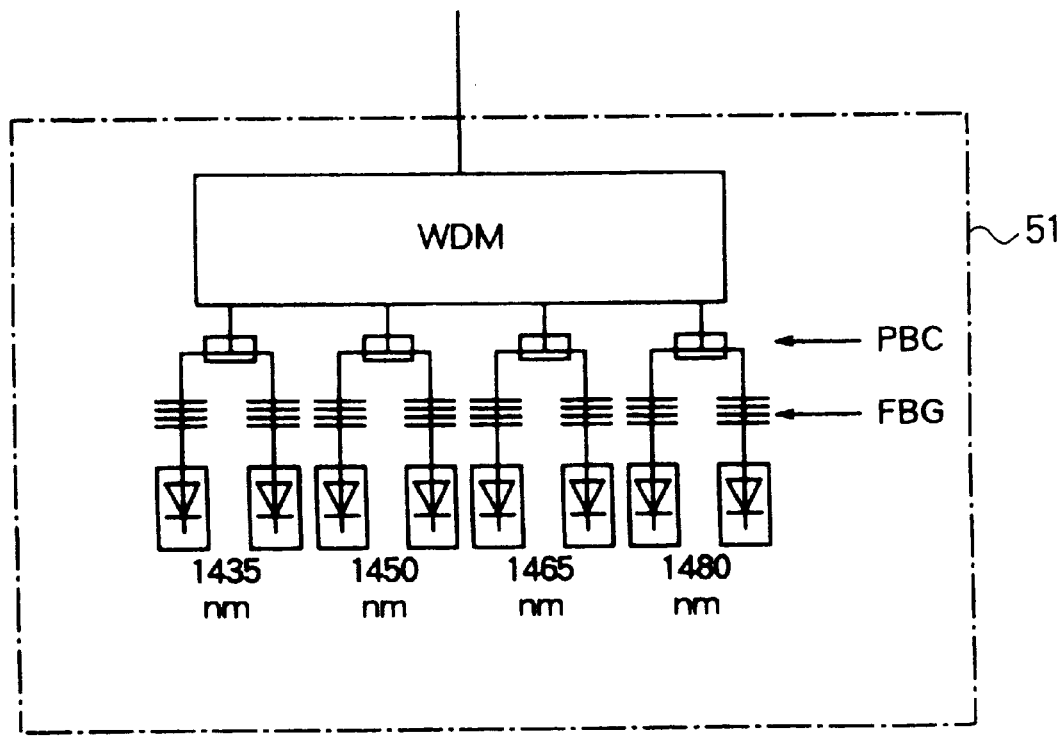
FIG. 50 is an explanatory view showing an pumping light source of FIG. 49.

An embodiment of a Raman amplifying method according to the present invention will now be fully explained with reference to FIGS. 49 to 52. In this embodiment, a dispersion compensating fiber (DCF) having high non-linearity is used in a Raman amplifying medium 50 shown in FIG. 49 and pumping light generated from an pumping light source 51 is inputted and transmitted to the Raman amplifying medium through a wave combiner 52. In this case, as shown in FIG. 50, as the pumping light source 50, a 4ch-WDMLD unit comprising four pumping light sources (semiconductor lasers), fiber Bragg gratings (FPG), polarization beam combiner (PBC) and a WDM is used. The semiconductor lasers shown in FIG. 50 generate pumping lights having different central wavelengths (more specifically, generate pumping lights having central wavelengths of 1435 nm, 1450 nm, 1465 nm and 1480 nm, respectively). These pumping lights give Raman gain to an optical signal transmitted from the DCF, thereby amplifying the optical signal. In this case, each of the pumping lights has gain peak at frequency shorter than its frequency by about 13 THz (i.e., wavelength greater by about 100 nm).

When the optical signal having wavelength of 1500 nm to 1600 nm is propagated to the DCF having a length of 6 km from one end thereof and the pumping lights having wavelengths of 1400 nm, 1420 nm, 1440 nm, 1460 nm, and 1480 nm are inputted to the DCF thereby to Raman-amplify the optical signal, the input optical signal and an output optical signal outputted from the other end of the DCF (Raman-amplified optical signal) were checked to evaluate total loss of the wavelength and DCF. The following Table 3 shows a relationship between the wavelength and DCF total loss. From this, it is apparent that there is wavelength dependency:

TABLE 3

| wavelength (nm) | unit loss (dB/km) | total loss (dB) |
| --- | --- | --- |
| 1400 | 6.76 | 40.56 |
| 1420 | 3.28 | 19.68 |
| 1440 | 1.74 | 10.44 |
| 1460 | 1.16 | 6.96 |
| 1480 | 0.85 | 5.10 |
| 1500 | 0.69 | 4.14 |
| 1520 | 0.62 | 3.72 |
| 1540 | 0.57 | 3.42 |
| 1560 | 0.55 | 3.30 |
| 1580 | 0.54 | 3.24 |
| 1600 | 0.59 | 3.54 |

Here, when it is considered that effect total loss is given by adding the loss of the semiconductor laser to the loss of the optical signal amplified by the semiconductor laser at the side of the longer wavelength greater by about 100 nm, a relationship between the wavelength and the effect total loss becomes as shown in the following Table 4:

TABLE 4

| wavelength (nm) | effect total loss (dB) | |
| --- | --- | --- |
| 1400 | 40.56 + 4.14 | 44.7 |
| 1420 | 19.68 + 3.72 | 23.4 |
| 1440 | 10.44 + 3.42 | 13.86 |
| 1460 | 6.96 + 3.30 | 10.26 |
| 1480 | 5.10 + 3.24 | 8.34 |

Since there is substantially no wavelength dependency of the Raman amplification itself, when it is regarded that amplifying efficiency for each wavelength is influenced by the effect total loss, by adding the effect total loss to the outputs of the semiconductor lasers required for desired amplifying properties, the wavelengths can be Raman-amplified substantially uniformly, and the wavelength dependency of the gain can be eliminated Thus, in this embodiment, the shorter the central wavelength of the pumping light the higher the light power.

(Second Embodiment of Raman Amplifying Method)

Figure 51:
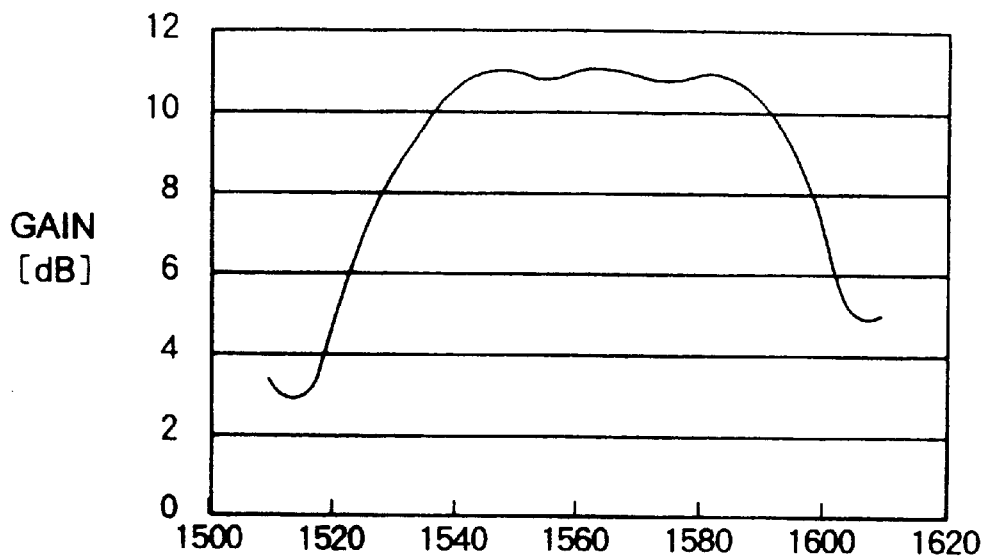
FIG. 51 is a view showing gain profile of a optical signal Raman-amplified by the Raman amplifying method according to the present invention.

In a Raman amplifying method according to a second embodiment of the present invention, in order to Raman-amplify substantially uniformly the optical signals having wavelengths of 1500 nm to 1600 nm transmitted by the DCP, among two or more pumping lights incident on the DCF, light powers of pumping lights having wavelengths smaller than center (middle) between the shortest central wavelength and the longest central wavelength are increased. More specifically, central wavelengths of the pumping lights generated by the pumping light source 51 shown in FIG. 50 and incident on the DCF are selected to 1435 nm, 1450 nm, 1465 nm and 1480 nm and the light powers thereof are selected as follows. That is to say, the light posers of the pumping lights having the wavelengths of 1435 nm and 1450 nm which are smaller than the center (1457 nm) between the shortest central wavelength (1435 nm) and the longest central wavelength (1480 nm) among four pumping lights incident On the DCF are increased, as follows:

Light power of 1435 nm: 563 mW
Light power of 1450 nm: 311 mW
Light power of 1465 nm: 122 mW
Light power of 1480 nm: 244 mW As a result, the gain profile of the optical signal having wavelength of 1500 nm to 1600 nm (after Raman-amplified) transmitted by the DCF provides gain of about 11 dB from 1540 nm to 1590 nm, with the result that the flatness becomes 1 dB, as shown in FIG. 51. That is to say, the wavelength lights transmitted by the DCF can be Raman-amplified substantially uniformly.

Figure 52:
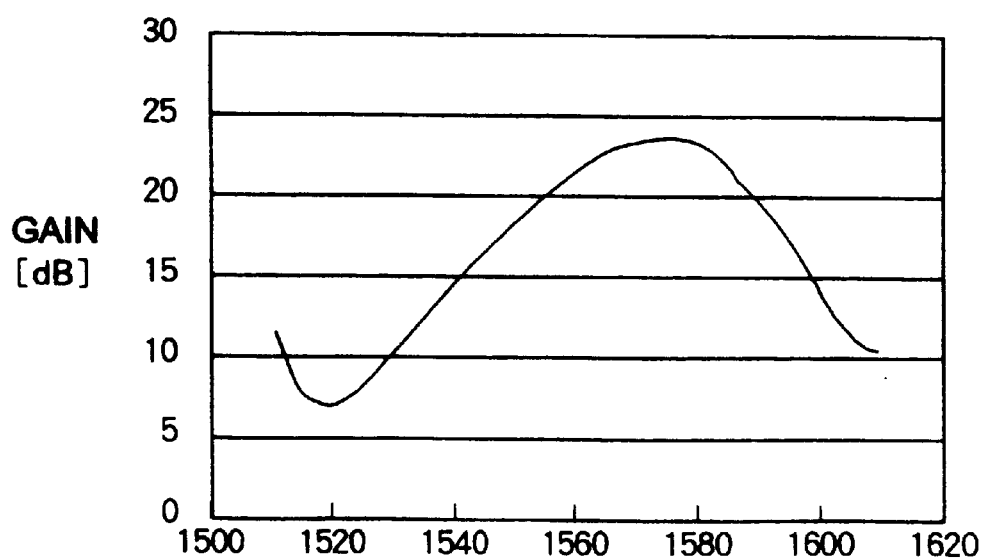
FIG. 52 is a view showing gain profile of a optical signal Raman-amplified by a conventional method.

Incidentally, when the central wavelengths of the pumping lights generated by the pumping light source 51 and incident on the DCF are selected to 1435 nm, 1450 nm, 1465 nm and 1480 nm and the light powers thereof are selected to 563 mW uniformly, the gain profile of the optical signal having wavelength of 1500 nm to 1600 nm (after Raman-amplified) transmitted by the DCF becomes as shown in FIG. 52. That is to say, although gain of about 24 dB can be obtained near the wavelength of 1580 nm, wide band gain flatness cannot be achieved (loss spectrum of the fiber is turned over).

(Third Embodiment of Raman Amplifying Method)

Figure 53:
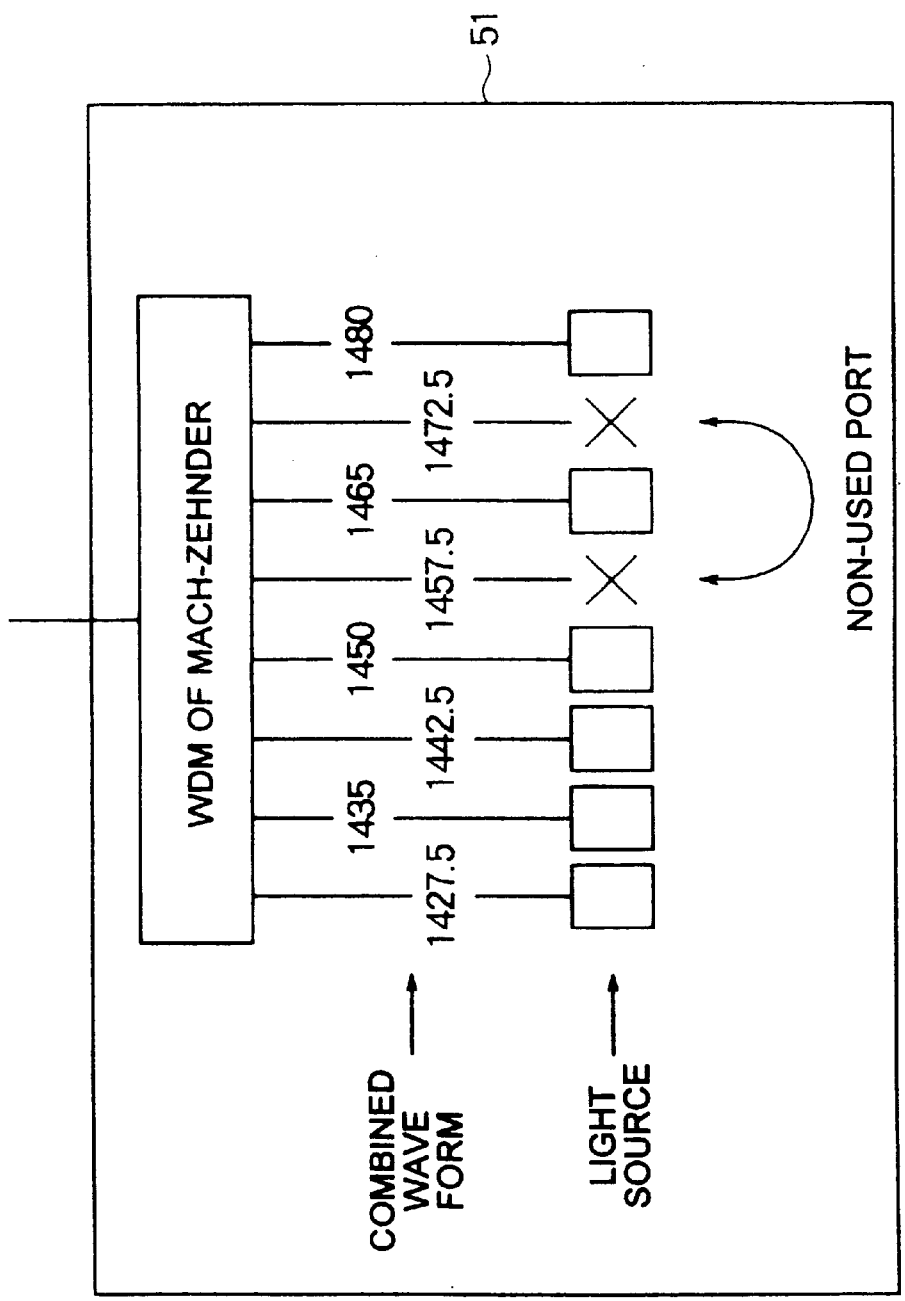
FIG. 53 is an explanatory view showing another example of an arrangement for carrying out a Raman amplification method according to the present invention.

FIG. 53 shows a third embodiment of a Raman amplifying method according to the present invention. In the Raman amplifying method shown in FIG. 53, pumping lights are combined by a wave combiner utilizing a principle of a Mach-Zehnder interferometer. The wavelengths of the pumping lights which can be combined becomes equidistant. In this embodiment, among wavelengths which can be combined, several wavelengths are not used, and the wavelength number at the short wavelength side of the pumping light band is greater than the wavelength number at the long wavelength side. In this arrangement, when the power of all of the pumping lights having various wavelengths are the same, the total power of the pumping lights at the short wavelength side becomes greater than the total power of the pumping lights at the long wavelength side. This provides substantially the same effect, similar to the second embodiment, as the effect obtained by setting the power at the short wavelength side to be greater than the power at the long wavelength side under the condition that the pumping lights are arranged equidistantly. Accordingly, by setting as shown in FIG. 53, the gain profile can be flattened without creating great difference between the powers of the pumping lights. This means that the total power of the pumping lights in which gain profile in a predetermined band can be flattened can be increased with determining the upper limit of the output power from one pumping light and therefore that the gain of the amplifier can be increased.

(Sixth Embodiment of Raman Amplifier)

In an embodiment described hereinbelow, the shortest wavelengths of the pumping lights to be used are selected to 1420.8 nm (211 THz). The ad reason is that the wavelength greater than 1530 nm (frequency below about 196 THz) which has been utilized in the present WDM systems is considered to be used as an amplification band. Accordingly, when a wavelength greater than 1580 nm (frequency below about 190 THz) which is referred to as an L-band is supposed as the amplification band, since the pumping band may be shifted by 6 THz, the shortest wavelength may be selected to 1462.4 nm (205 THz). Regarding the other amplification bands, the shortest wavelengths can be determined in the similar manner.

Figure 60:
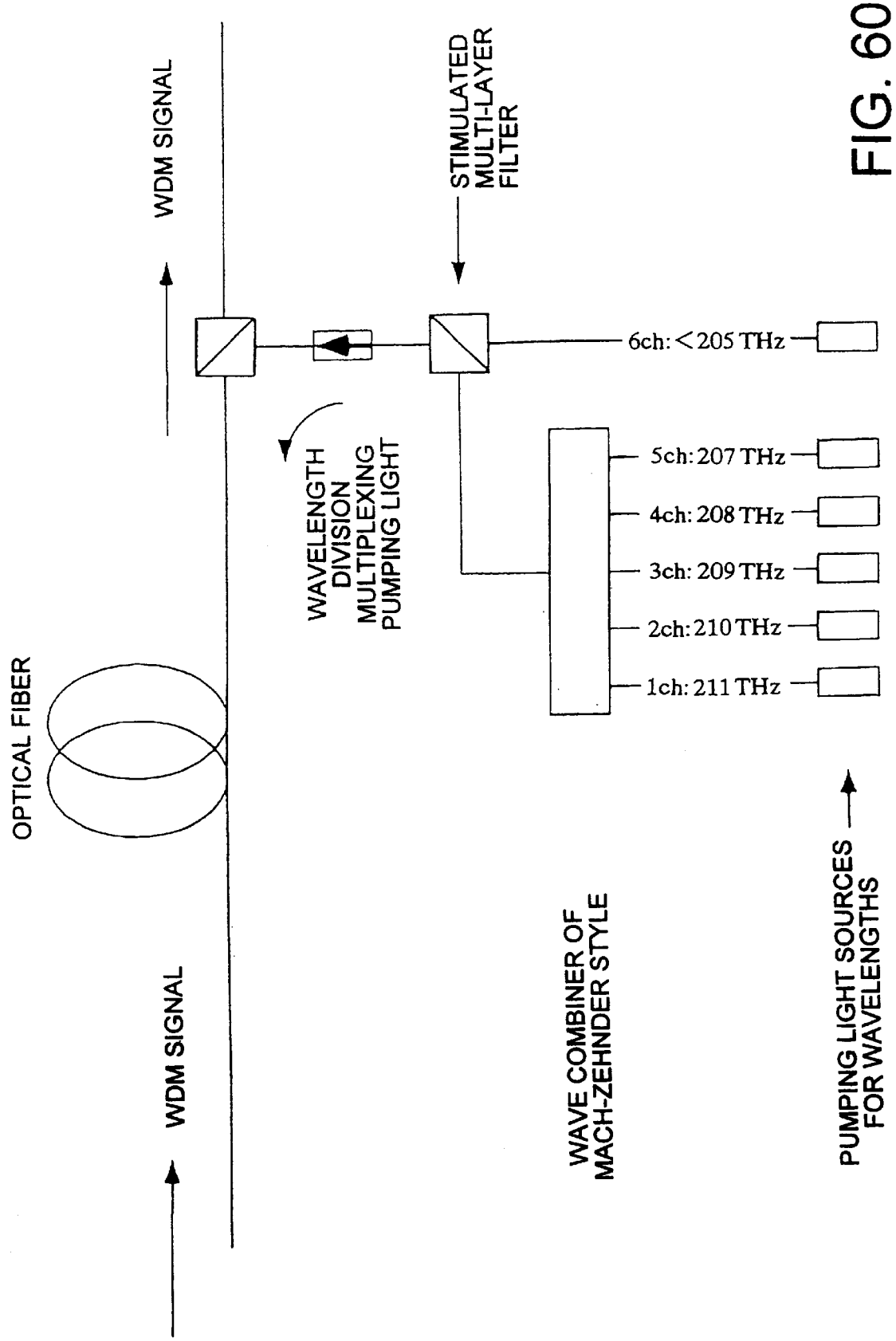
FIG. 60 is a schematic diagram of a sixth embodiment of a Raman amplifier according to the present invention.

FIG. 60 is a six embodiment of a Raman amplifier according to the present invention which corresponds to claim 32. Frequency of a first channel is 211 THz (wavelength of 1420.8 nm) and frequencies of second to fifth channels are from 210 THz (wavelength of 1427.6 nm) to 207 THz (wavelength of 1448.3 nm) and are arranged side by side with an interval of 1 THz. By combining this with an pumping light (frequency of 205 THz, wavelength of 1462. 4 nm) having a wavelength spaced apart from the fifth channel by 2 THz toward the long wavelength side, the pumping means is formed. Accordingly, a distance or interval between the adjacent pumping wavelengths is within a range from 6 nm to 35 nm, and the number of pumping light sources having center wavelengths at the short wavelength side with respect to the center between the shortest center wavelength and the longest center wavelength of each pumping light becomes greater than the number of pumping light sources having center wavelengths at the long wavelength side. The pumping light of each channel utilizes an pumping light obtained by combining lights from semiconductor lasers of Fabry-Perot type (wavelengths of which are stabilized by fiber Bragg gratings (FBG)) by means of a polarization beam combiner (PBC). Polarization wave composing is effected so as to increase the pumping power of each wavelength and to reduce the polarization dependency of the Raman gain. When the pumping power obtained by output from the single laser is adequate, the laser output may be connected to the wavelength combiner after depolarizing.

Figure 61:
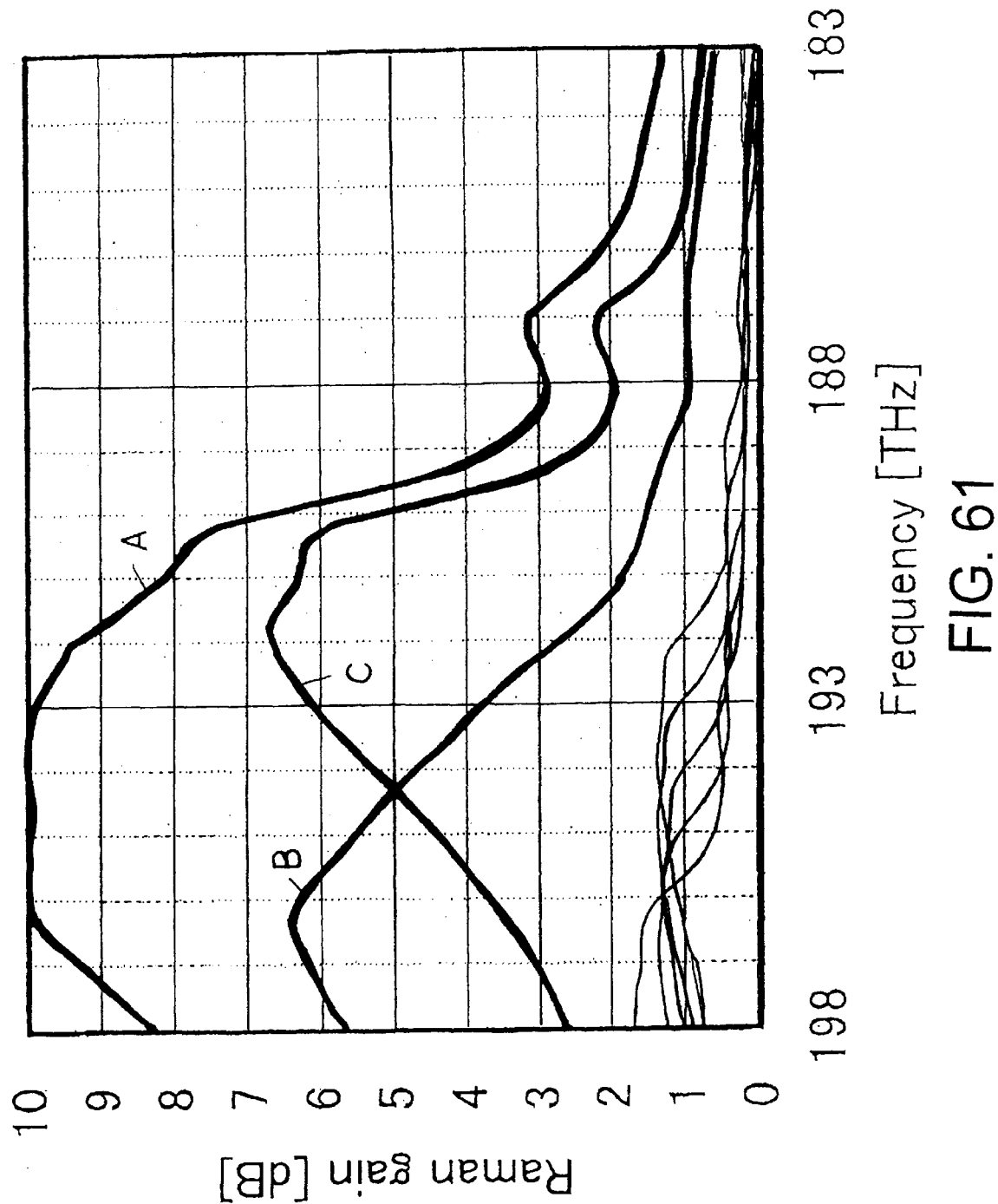
FIG. 61 is a view showing gain profile when a pumping light source of FIG. 60 is used.
Figure 62:
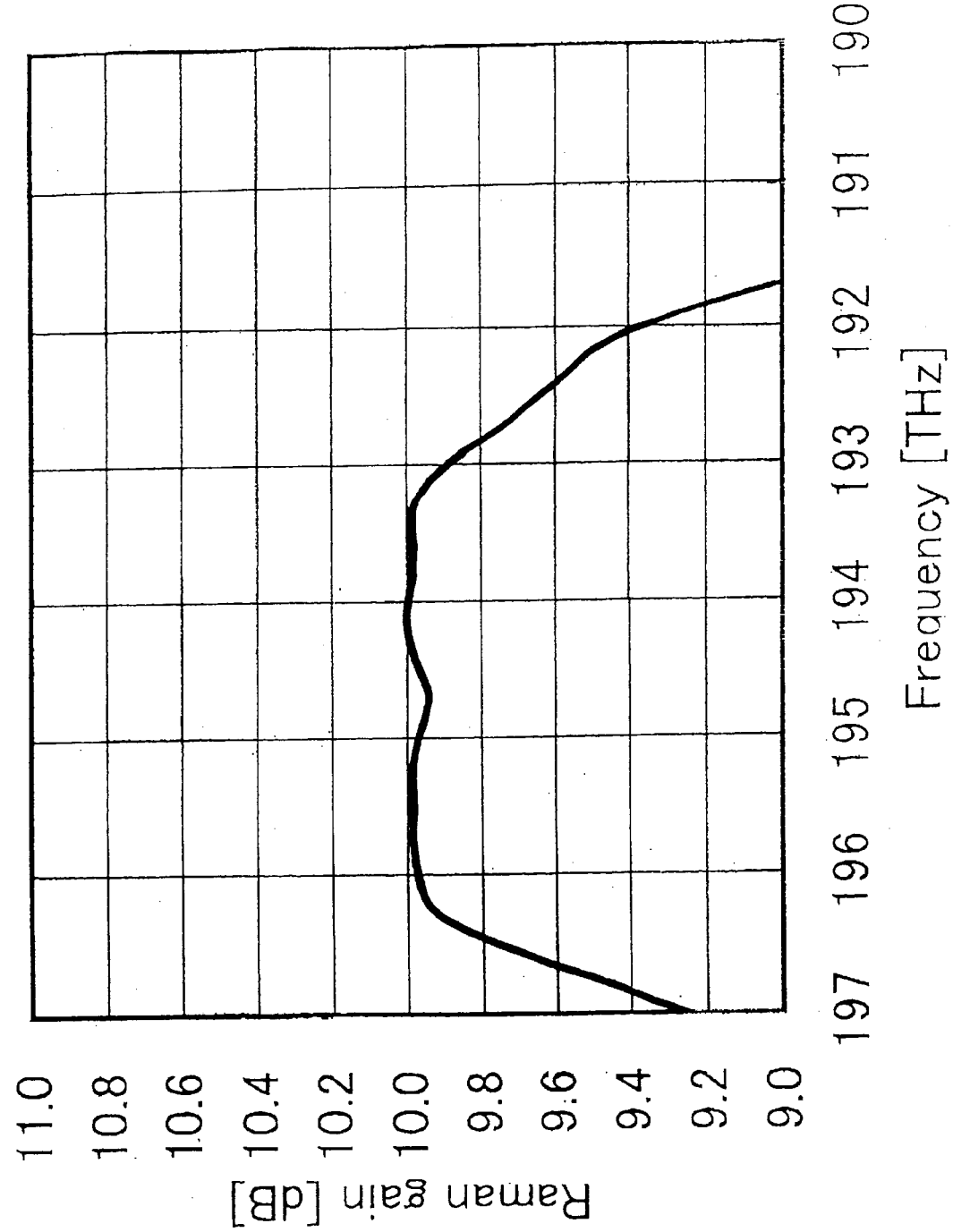
FIG. 62 is an enlarged view of total gain shown in FIG. 61.

FIG. 61 shows Raman gain profiles when the pumping light sources shown in FIG. 60 are used. A curve A represents total gain, a curve B represents the sum of gains of the pumping lights of the first to fifth channels, a curve C represents a gain of the sixth channel, and thin lines represent gains of pumping wavelengths of the first to fifth channels. By multiplexing the pumping lights at the short wavelength side with interval 1 THz, a smooth curve extending rightwardly and downwardly can be formed, and, by adding this to a gain curve extending rightwardly and upwardly due to the pumping lights at the long wavelength side, the total Raman gain is flattened. According to FIG. 61, the gain obtained from the pumping lights at the short wavelength side may be relatively small, but, since there are wavelength dependency of loss of the pumping lights and Raman effect between the pumping lights, the actual incident power at the short wavelength side must be greater than that at the long wavelength side. From FIG. 61, it can be seen that a projection of certain gain curve and a recess of another gain curve cancel mutually by using the interval of 1 THz. FIG. 62 is an enlarged view of the total gain. A property in which the peak gain is 10 dB, the gain band extends from about 196 THz (wavelength of 1529.6 nm) to about 193 THz (wavelength of 1553.3 nm) and the gain deviation is about 0.1 dB is achieved.

Figure 63:
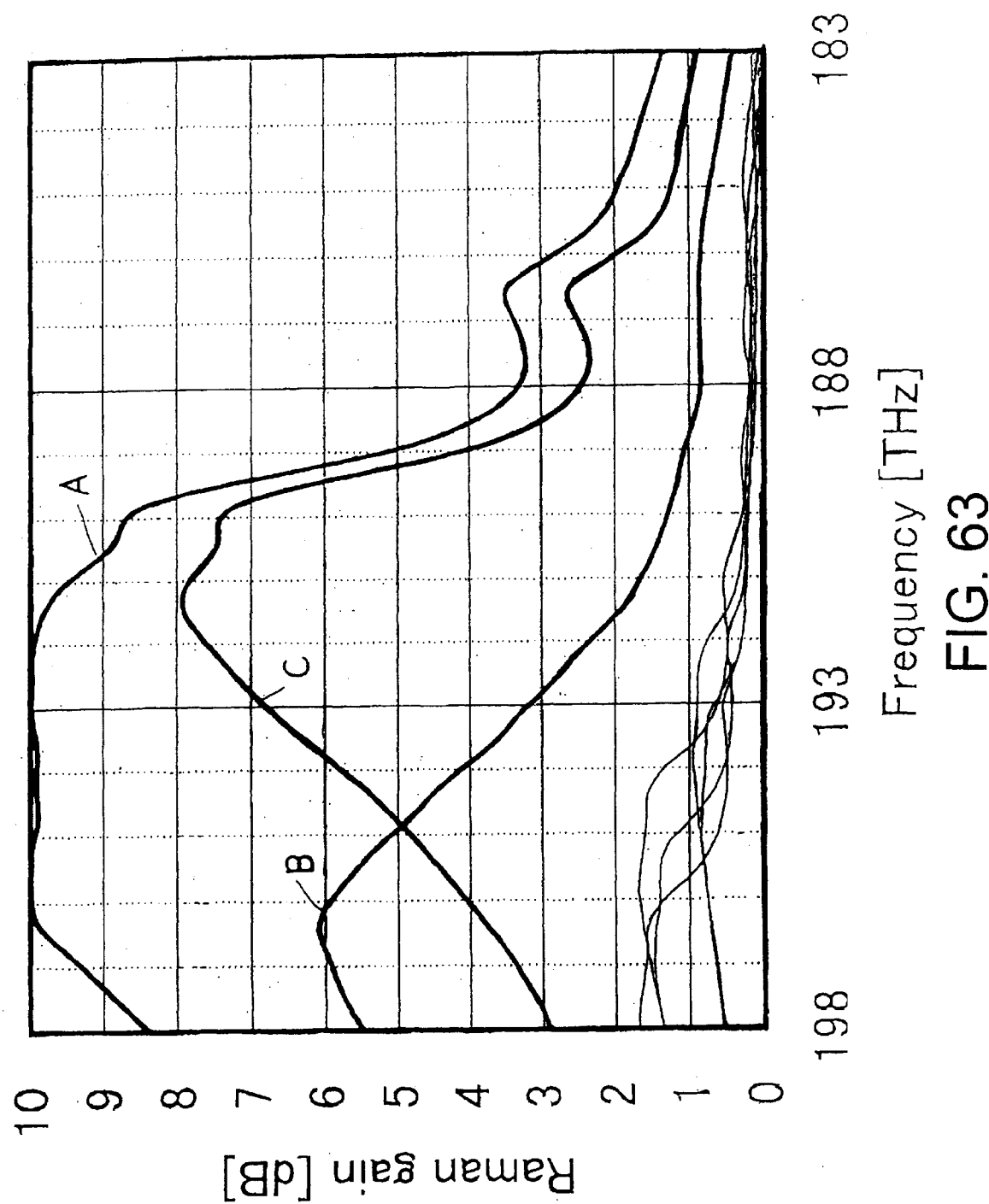
FIG. 63 is a view showing Raman gain profile when a wavelength of a sixth channel is a wavelength spaced apart from a fifth channel by 2.5 THz toward the longer wavelength in the Raman amplifier shown in FIG. 60.
Figure 64:
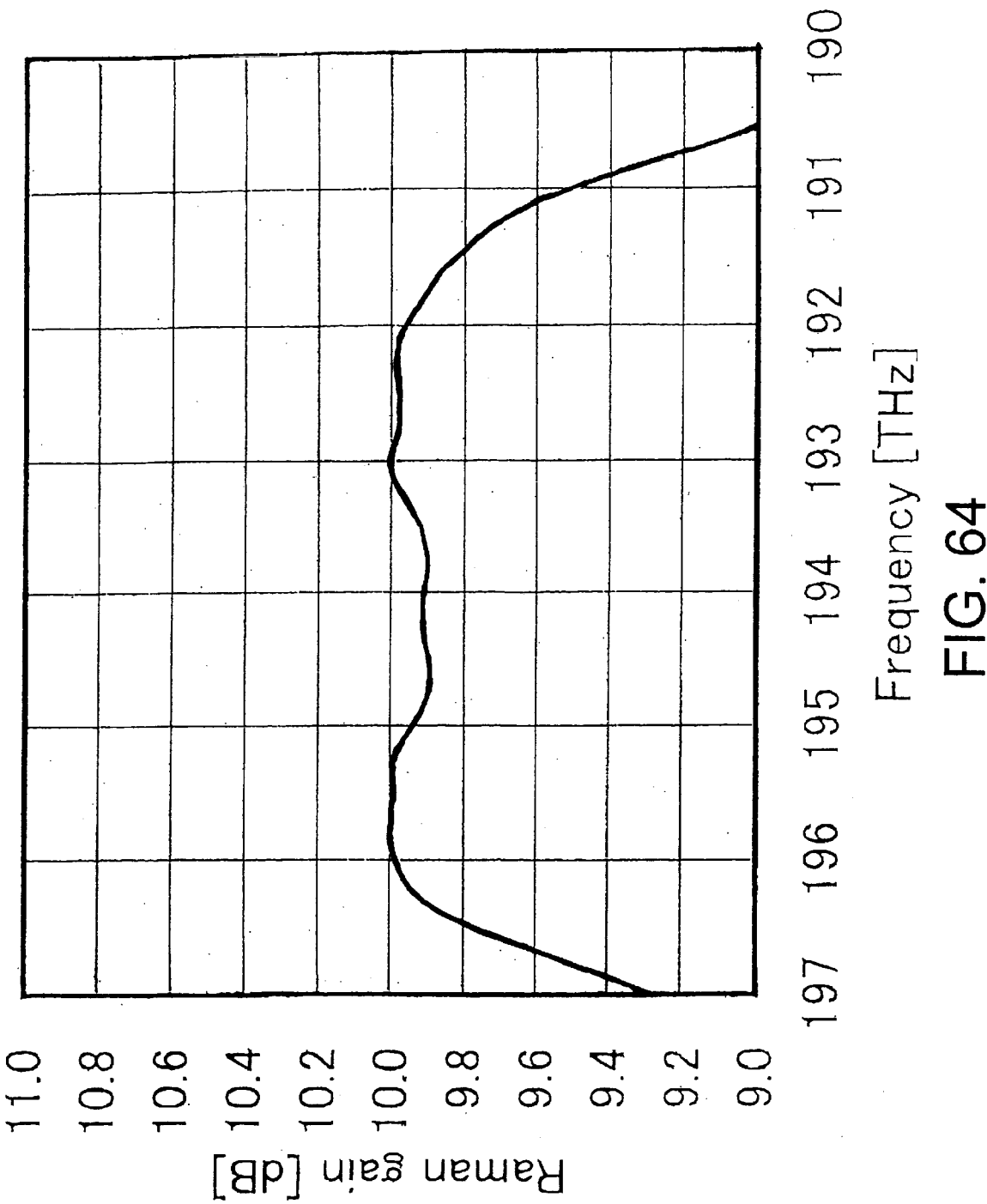
FIG. 64 is au enlarged view of total gain shown in FIG. 63.

FIG. 63 shows gain profiles when the wavelength of the sixth channel is a wavelength (frequency of 204.5 THz; wavelength of 1465.5 nm) spaced apart from the wavelength of the fifth channel by 2.5 THz toward the long wavelength side in FIG. 60. Similar to FIG. 61, a curve A represents total gain, a curve B represents the sum of gains of the pumping lights of the first to fifth channels, a curve C represents a gain of the sixth channel, and thin lines represent gains of pumping wavelengths of the first to fifth channels. Also in this case, by adding a gain curve extending rightwardly .and downwardly due to the pumping lights at the short wavelength side to a gain curve extending rightwardly and upwardly due the pumping lights at the long wavelength side, the total Raman gain is flattened. According to FIG. 63, the gain obtained from the pumping lights at the short wavelength side may be relatively small, but, since there are wavelength dependency of loss of the pumping lights and Raman effect between the pumping lights, the actual incident power at the short wavelength side must be greater than that at the long wavelength side. FIG. 64 is an enlarged view of the total gain. A property in which the peak gain is 10 dB, the gain band extends from about 196 THz (wavelength of 1529.6 nm) to about 192 THz (wavelength of 1561.4 nm) and the gain deviation is about 0.1 dB is achieved. The gain band is wider than that in FIG. 62, and recess of the gain at a middle portion of the band is slightly greater. The reason is that the interval or distance between the fifth channel and the sixth channel becomes wider.

(Seventh Embodiment of Raman Amplifier)

Figure 65:
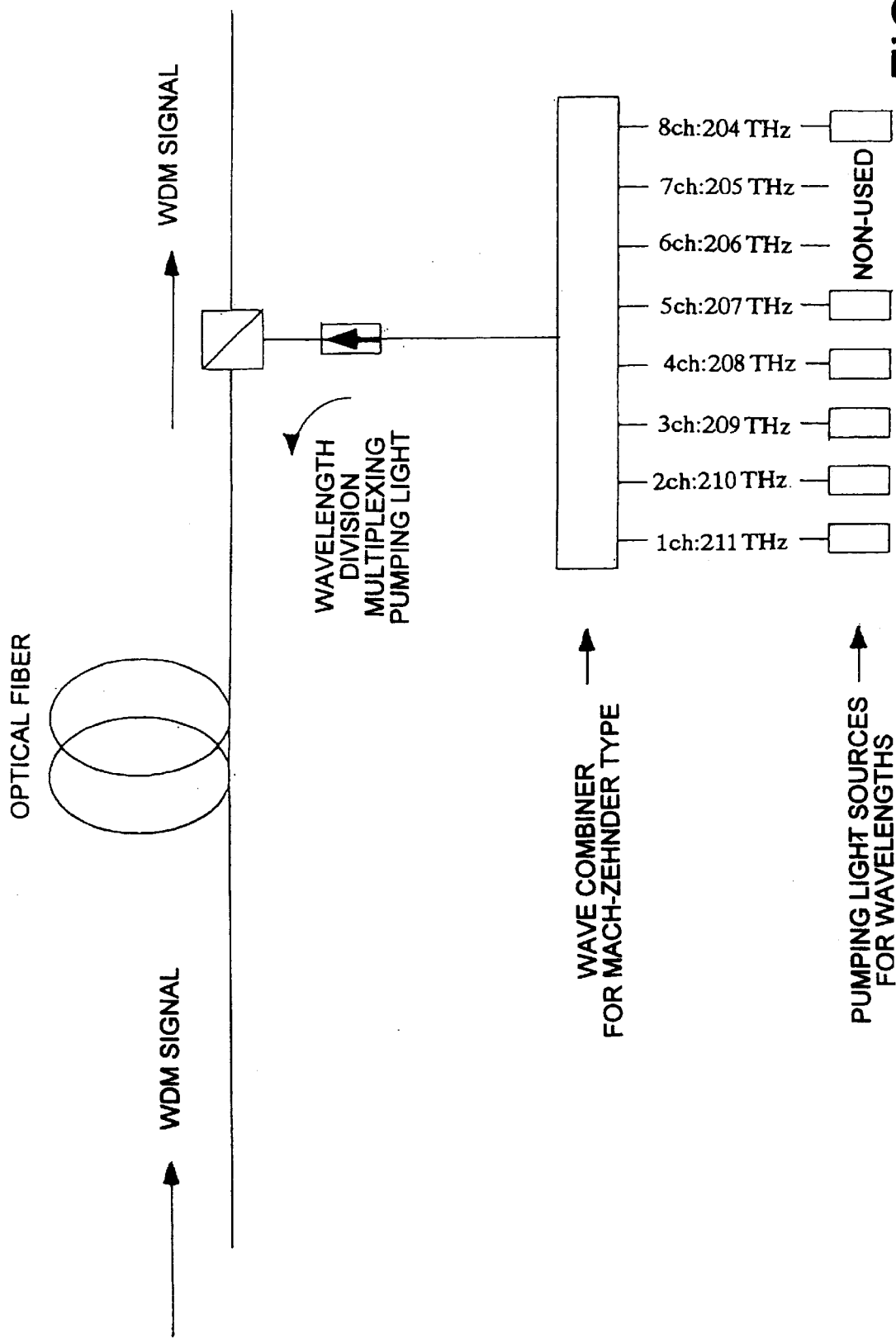
FIG. 65 is a schematic diagram of a seventh embodiment of a Raman amplifier according to the present invention.
Figure 66:
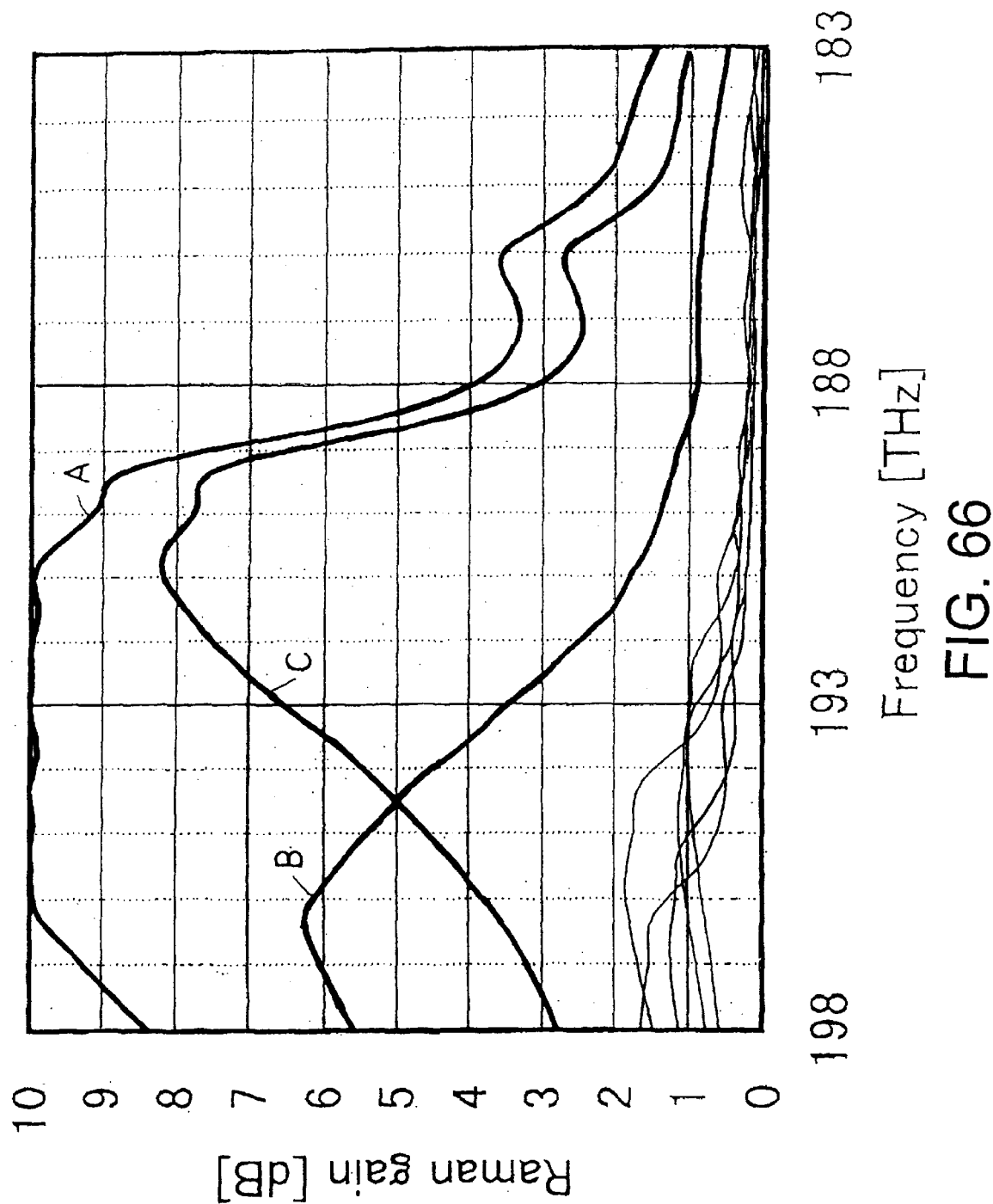
FIG. 66 is a view showing Raman gain profile when an pumping light source of FIG. 65 is used.
Figure 67:
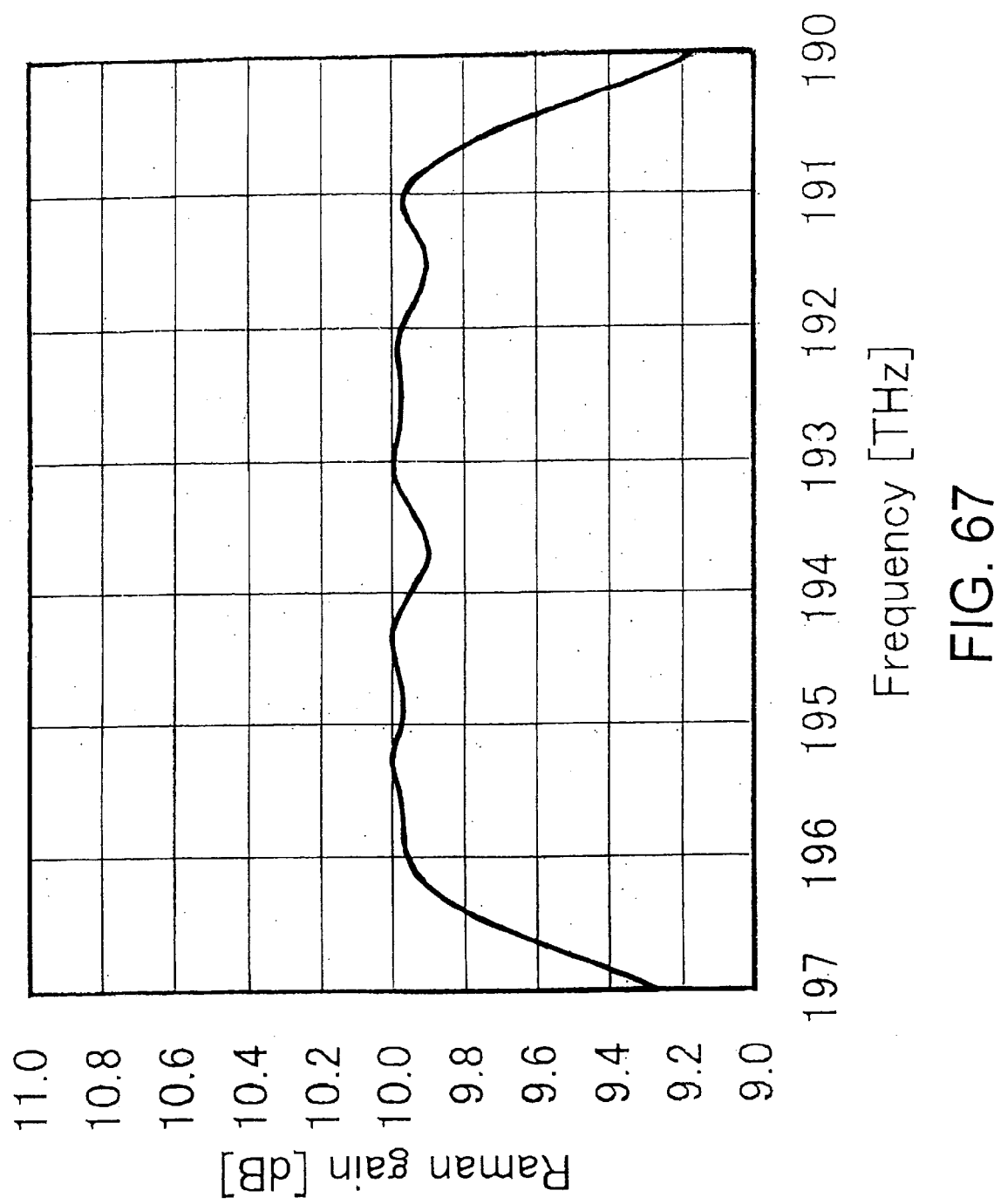
FIG. 67 is an enlarged view of total gain shown in FIG. 66.

FIG. 65 shows a seventh embodiment of a Raman amplifier according to the present invention which corresponds to claims 32 and 33. Frequency of a first channel is 211 THz (wavelength of 1420.8 nm) and frequencies of second to eighth channels are from 210 THz (wavelength of 1427.6 nm) to 204 THz (wavelength of 1469.6 nm) and are arranged side by side with an interval of 1 THz. The total number of channels is eight, and pumping light sources are constituted by using six wavelengths except for sixth and seventh channels. Accordingly, a distance or interval between the adjacent pumping wavelengths is within a range from 6 nm to 35 nm, and the number of pumping light sources having center wavelengths at the short wavelength side with respect to the centcer between the shortest center wavelength and the longest center wavelength of each pumping light becomes greater than the number of pumping light sources having center wavelengths at the long wavelength side. The pumping lights of the channels are selected on demand, as described in connection with the sixth embodiment. FIG. 66 shows Raman gain profiles when the pumping light sources shown in FIG. 65 are used. A curve A represents total gain, a curve B represents the sum of gains of the pumping lights of the first to fifth channels, a curve C represents a gain of the eighth channel, and thin lines represent gains of pumping wavelengths of the first to fifth channels. Also in this case, by adding a gain curve extending rightwardly and downwardly due to the pumping lights at the short wavelength side to a gain curve extending rightwardly and upwardly due to the pumping lights at the long wavelength side, the total Raman gain is flattened. According to FIG. 66, the gain obtained from the pumping lights at the short wavelength side may be relatively small, but, since there are wavelength dependency of loss of the pumping lights and Raman effect between the pumping lights, the actual incident power at the short wavelength side must be greater than that at the long wavelength side. FIG. 67 is an enlarged view of the total gain. A property in which the peak gain is 10 dB, the gain band extends from about 196 THz (wavelength of 1529.6 nm) to about 191 THz (wavelength of 1569.6 nm) and the gain deviation is about 0.1 dB is achieved. In comparison with FIG. 62 and FIG. 64, the gain band becomes further wider. The reason is that the longest pumping wavelength is set to further longer.

(Eighth Embodiment of Raman Amplifier)

Figure 68:
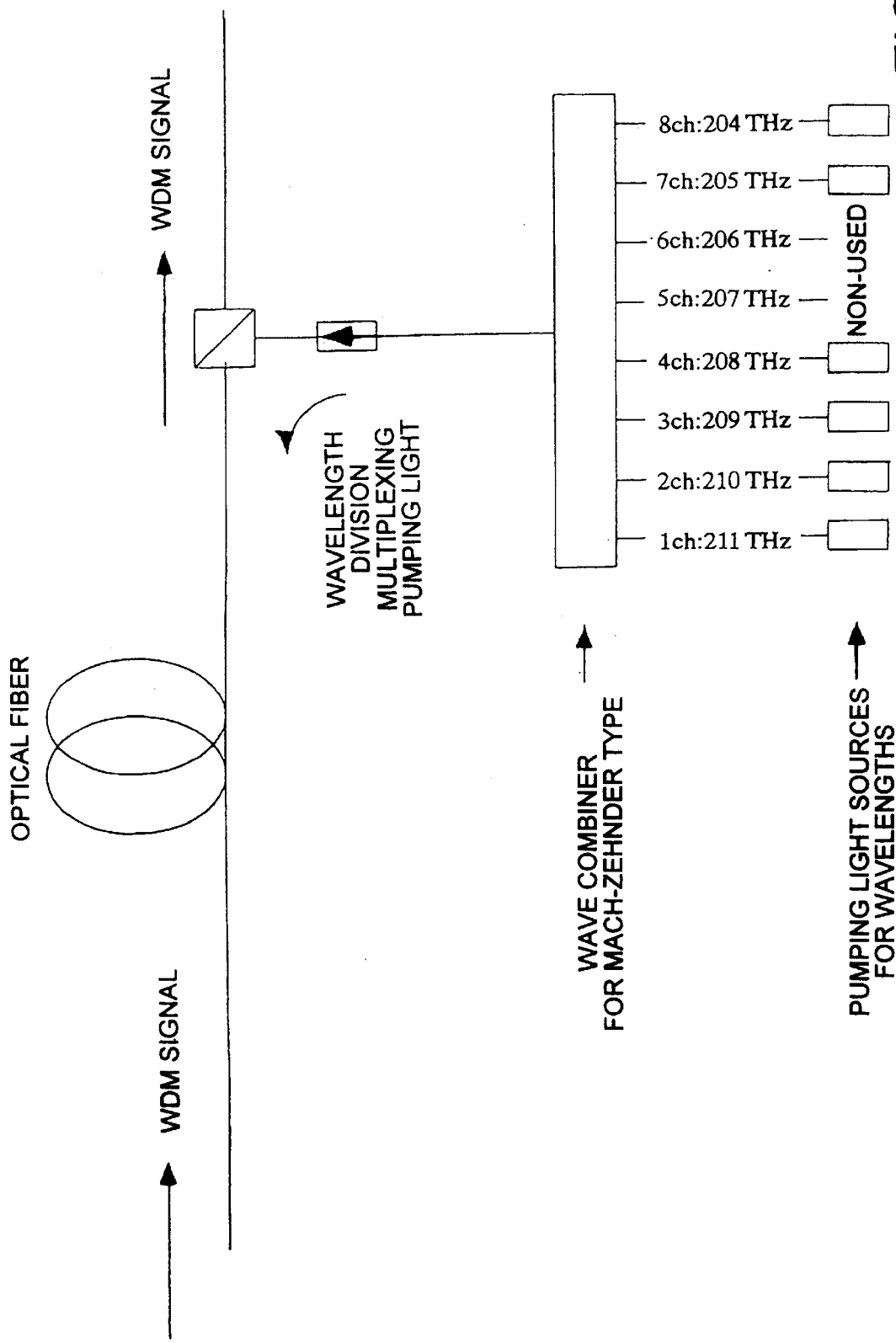
FIG. 68 is an explanatory view showing an eighth embodiment of a Raman amplifier according to the present invention.
Figure 69:
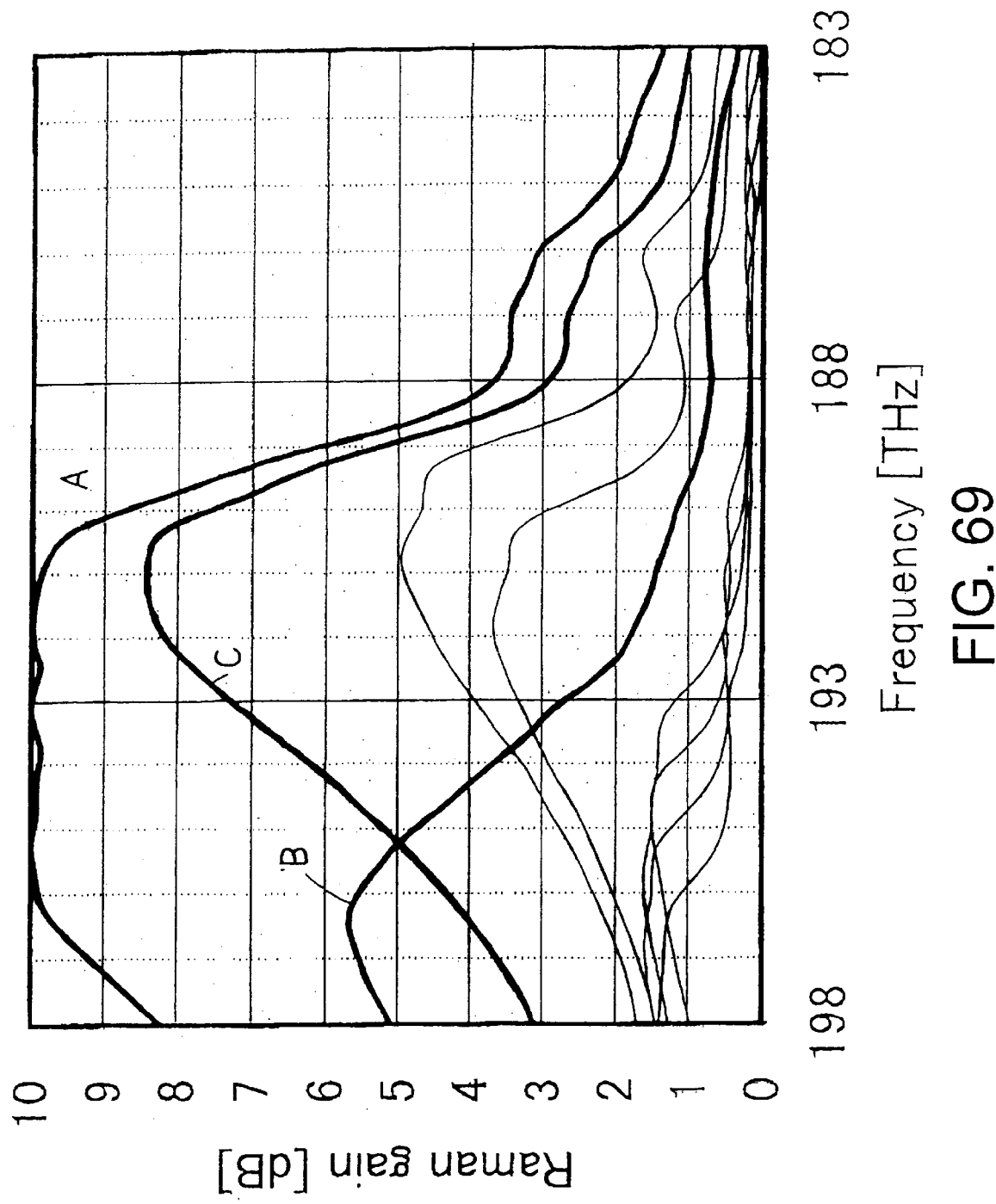
FIG. 69 is a view showing Raman gain profile when an pumping light source of FIG. 68 is used.
Figure 70:
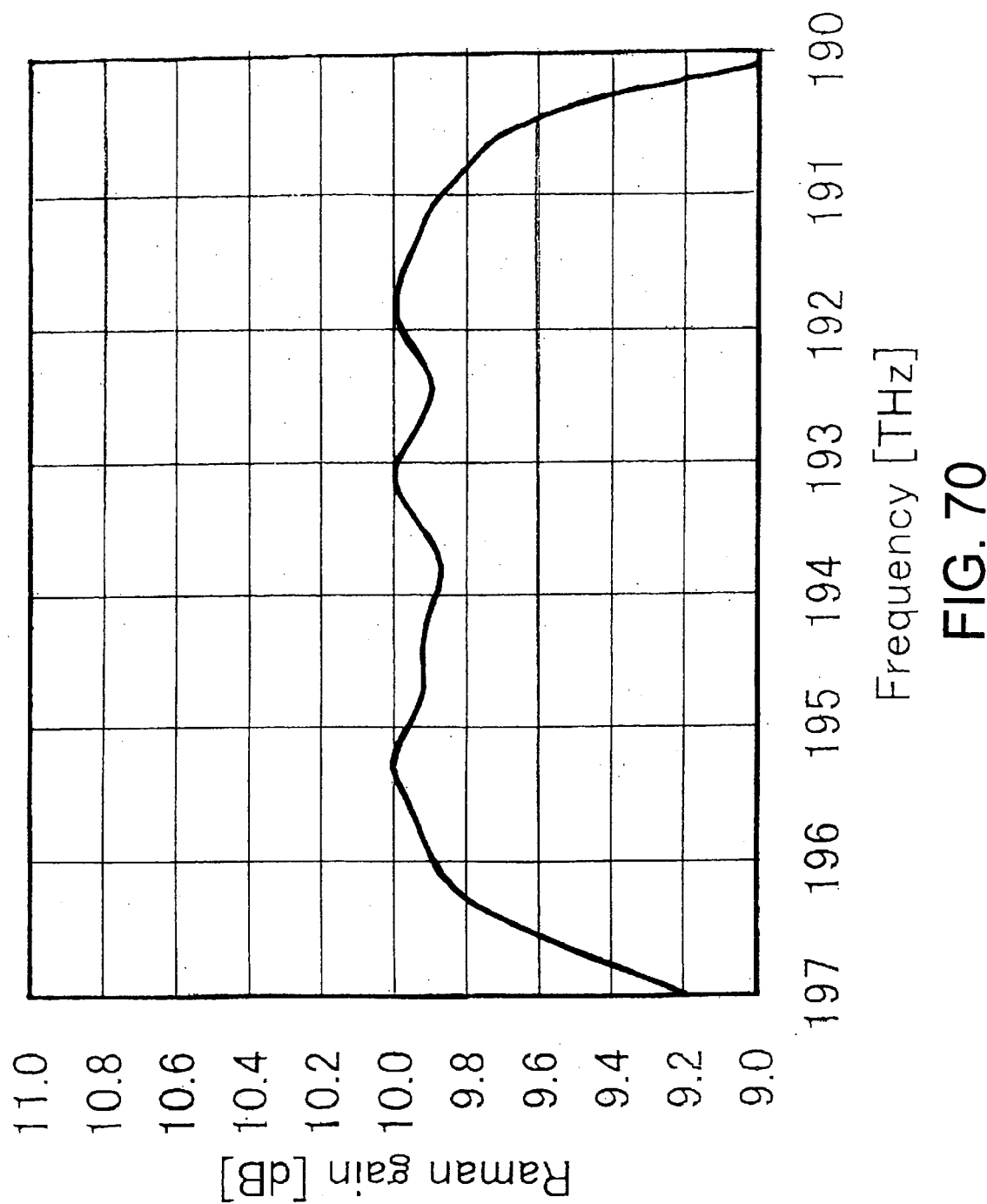
FIG. 70 is an enlarged view of total gain shown in FIG. 69.

FIG. 68 shows an eighth embodiment of a Raman amplifier according to the present invention which corresponds to claims 32 and 34. Frequency of a first channel is 211 THz (wavelength of 1420.8 nm) and frequencies of second to eighth channels are from 210 THz (wavelength of 1427.6 nm) to 204 THz (wavelength of 1469.6 nm) and are arranged side by side with an interval of 1 THz. The total number of channels is eight, and pumping light sources are constituted by using six wavelengths except for fifth and sixth channels. Accordingly, a distance or interval between the adjacent pumping wavelengths is within a range from 6 nm to 35 nm, and the number of pumping light sources having center wavelengths at the short wavelength side with respect to the center between the shortest center wavelength and the longest center wavelength of each pumping light becomes greater than the number of pumping light sources having center wavelengths at the long wavelength side. The pumping lights of the channels are selected on demand, as described in connection with the sixth embodiment. FIG. 69 shows Raman gain profiles when the pumping light sources shown in FIG. 68 are used. A curve A represents total gain, a curve B represents the sum of gains of the pumping lights of the first to fourth channels, a curve C represents the sum of gains of the seventh and eighth channels, and thin lines represent gains of pumping wavelengths. Also in this case, by adding a gain curve extending rightwardly and downwardly due to the pumping lights at the short wavelength side to a gain curve extending rightwardly and upwardly due to the pumping lights at the long wavelength side, the total Raman gain is flattened. According to FIG. 69, the gain obtained from the pumping lights at the short wavelength side may be relatively small, but, since there are wavelength dependency of loss of the pumping lights and Raman effect between the pumping lights, the actual incident power at the short wavelength side must be greater than that at the long wavelength side. FIG. 70 is an enlarged view of the total gain. A property in which the peak gain is 10 dB, the gain band extends from about 196 THz (wavelength of 1529.6 nm) to about 191 THz (wavelength of 1569.6 nm) and the gain deviation is about 0.1 dB is achieved. Here, it is noticeable that magnitude of the gains of the pumping wavelengths in the seventh embodiment differs from that in the eighth embodiment. Namely, there is a channel of about 8 dB at the maximum in FIG. 66; whereas, about 5 dB is maximum in FIG. 69. The reason is that the gain at the long wavelength side shown by the curve C is formed by the gain of one channel in the seventh embodiment, whereas, the gain at the long wavelength side is formed by the sum of the gains of two channels in the eighth embodiment. This means that a maximum value of the pumping light power required for one wave can be reduced, which is very effective in the viewpoint of practical use.

Figure 71:
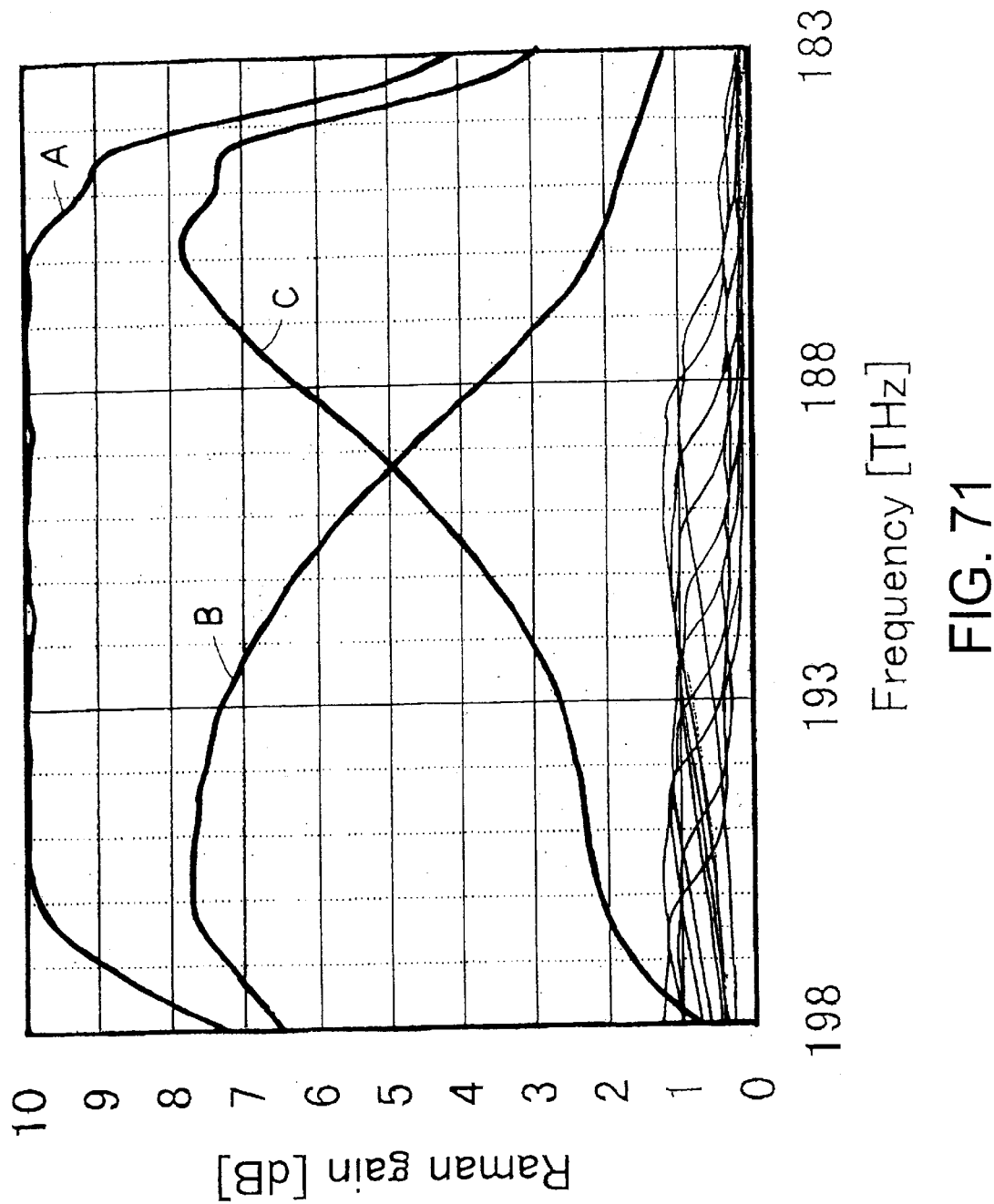
FIG. 71 is a view showing Raman gain profile when eleven channels are used among thirteen channels at interval of 1 THz from 211 THz to 199 THz and pumping lights other than 201 THz and 200 THz are used.
Figure 72:
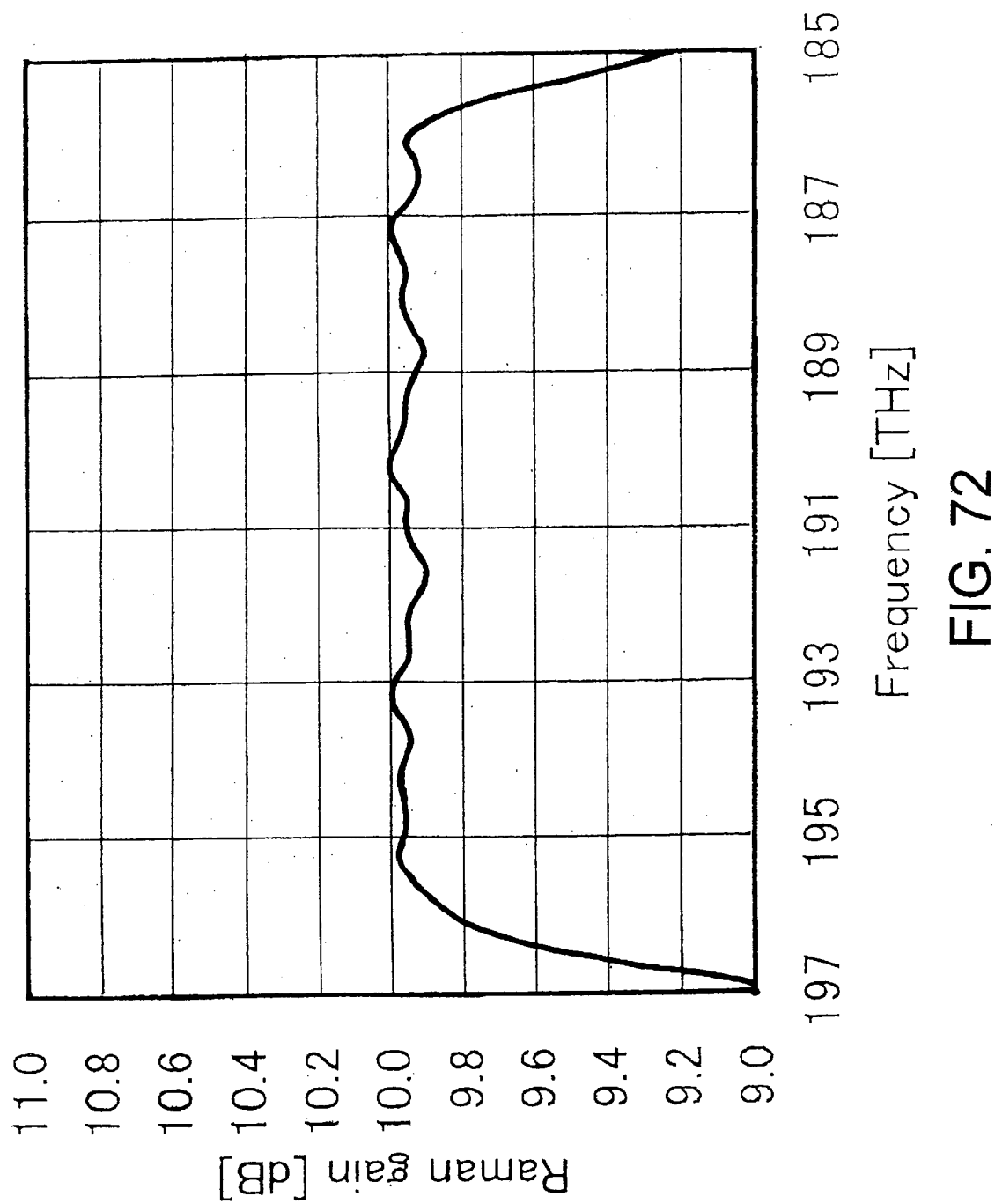
FIG. 72 is an enlarged view of total gain shown in FIG. 71.

FIGS. 71 to 74 show gain profiles when eleven channels are used among thirteen channels arranged side by side at an interval of 1 THz from 211 THz (wavelength of 1420.8 nm) to 199 THz (wavelength of 1506.5 nm). FIG. 71 shows the gain profiles obtained by an arrangement corresponding to claim 33 and by using the pumping lights other than 201 THz and 200 THz. Accordingly, a distance or interval between the adjacent pumping wavelengths is within a range from 6 nm to 35 nm, and the number of pumping light sources having center wavelengths at the short wavelength side with respect to the center between the shortest center wavelength and the longest center wavelength of each pumping light becomes greater than the number of pumping light sources having center wavelengths at the long wavelength side. A curve A represents total gain, a curve B represents the sum of gains of the pumping lights of the first to tenth channels, a curve C represents the gain of the thirteenth channel, and thin lines represent gains of pumping wavelengths of first to tenth channels. Also in this case, by adding a gain curve extending rightwardly and downwardly due to the pumping lights at the short wavelength side to a gain curve extending rightwardly and upwardly due to the pumping lights at the long wavelength side, the total Raman gain is flattened. According to FIG. 71, the gain obtained from the pumping lights at the short wavelength side may be relatively small, but, since there are wavelength dependency of loss of the pumping lights and Raman effect between the pumping lights, the actual incident power at the short wavelength side must be greater than that at the long wavelength side. FIG. 72 is an enlarged view of the total gain. A property in which the peak gain is 10 dB, the gain band extends from about 196 THz (wavelength of 1529.6 nm) to about 186 THz (wavelength of 1611.8 nm) and the gain deviation is about 0.1 dB is achieved.

Figure 73:
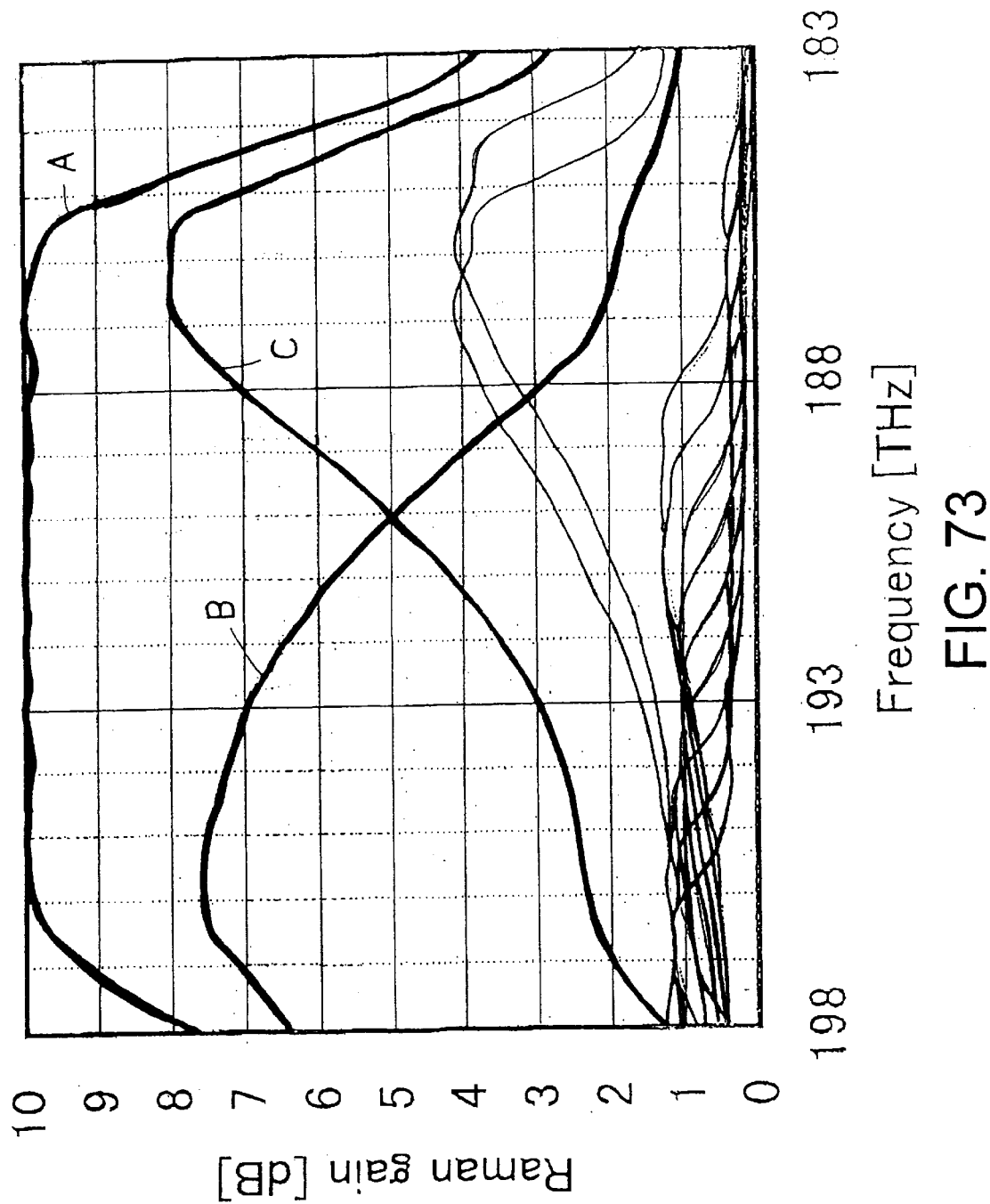
FIG. 73 is a view showing Raman gain profile when eleven channels are used among thirteen channels at interval of 1 THz from 211 THz to 199 THz and pumping lights other than 202 THz and 201 THz are used.
Figure 74:
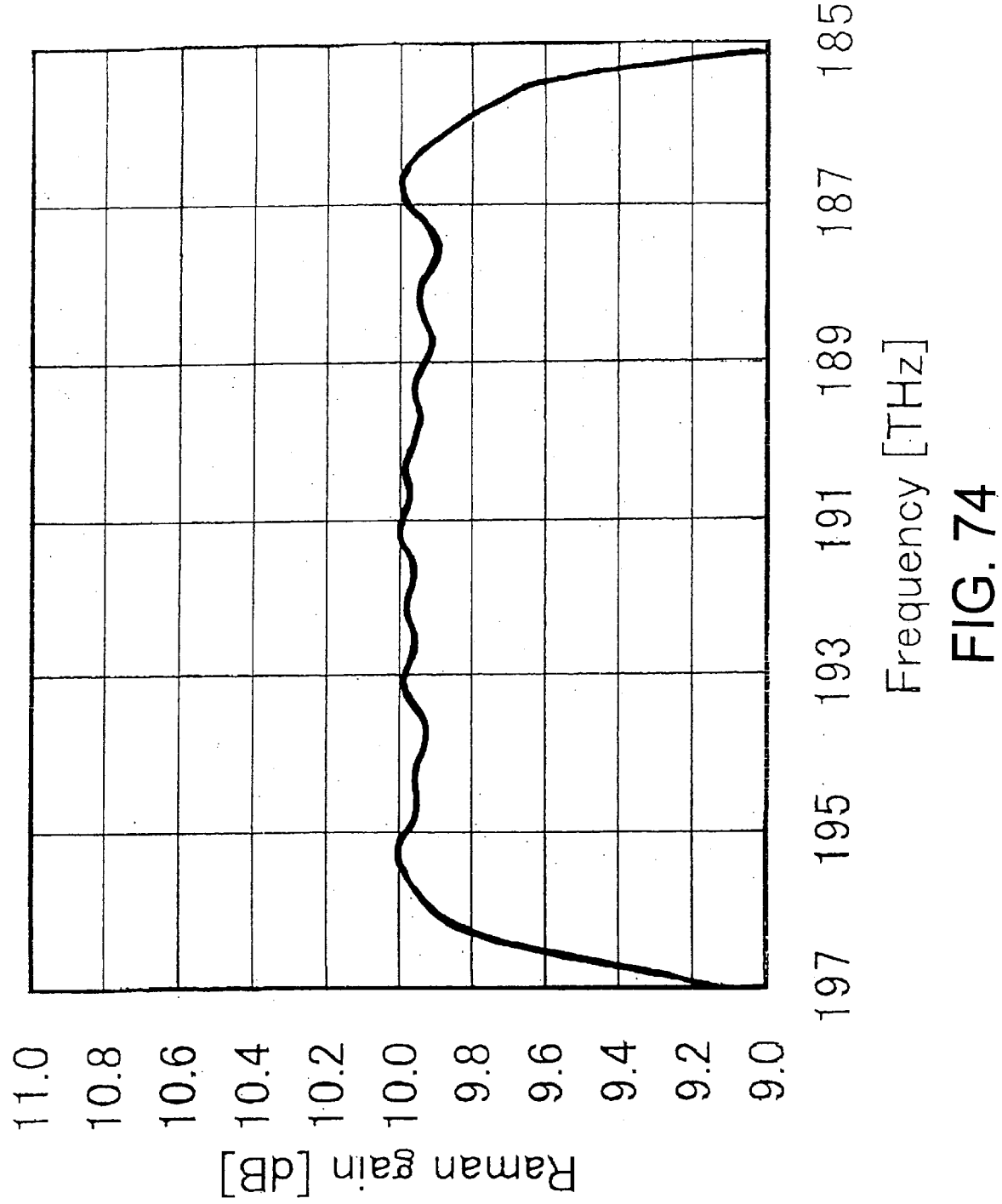
FIG. 74 is an enlarged view of total gain shown in FIG. 73.

FIG. 73 shows the gain profiles obtained by an arrangement corresponding to claim 34 and by using the pumping lights other than 202 THz and 201 THz. Accordingly, a distance or interval between the adjacent pumping wavelengths is within a range from 6 nm to 35 nm, and the number of pumping light sources having center wavelengths at the short wavelength side with respect to the center between the shortest center wavelength and the longest center wavelength of each pumping light becomes greater than the number of pumping light sources having center wavelengths at the long wavelength side. A curve A represents total gain, a curve B represents the sum of gains of the pumping lights of the first to ninth channels, a curve C represents the sum of the gains of the twelfth and thirteenth channels, and thin lines represent gains of pumping wavelengths. Also in this case, by adding a gain curve extending rightwardly and downwardly due to the pumping lights at the short wavelength side to a gain curve extending rightwardly and upwardly due to the pumping lights at the long wavelength side, the total Raman gain is flattened. According to FIG. 73, the gain obtained from the pumping lights at the short wavelength side may be relatively small, but, since there are wavelength dependency of loss of the pumping lights and Raman effect between the pumping lights, the actual incident power at the short wavelength side must be greater than that at the long wavelength side. FIG. 74 is an enlarged view of the total gain. A property in which the peak gain is 10 dB, the gain band extends from about 196 THz (wavelength of 1529.6 nm) to about 186 THz (wavelength of 1611.8 nm) and the gain deviation is about 0.1 dB is achieved. Further, as apparent from the comparison of FIG. 71 with FIG. 73, since the gain at the long wavelength side shown by the curve C is formed by the gain of one channel in the seventh embodiment, whereas, the gain at the long wavelength side is formed by the sum of the gains of two channels in the eighth embodiment, a maximum value of the gain required for one wave is smaller in FIG. 73 than in FIG. 71. This means that a maximum value of the pumping light power required for one wave can be reduced, which is very effective in the viewpoint of practical use.

(Ninth Embodiment of Raman Amplifier)

Figure 54A:
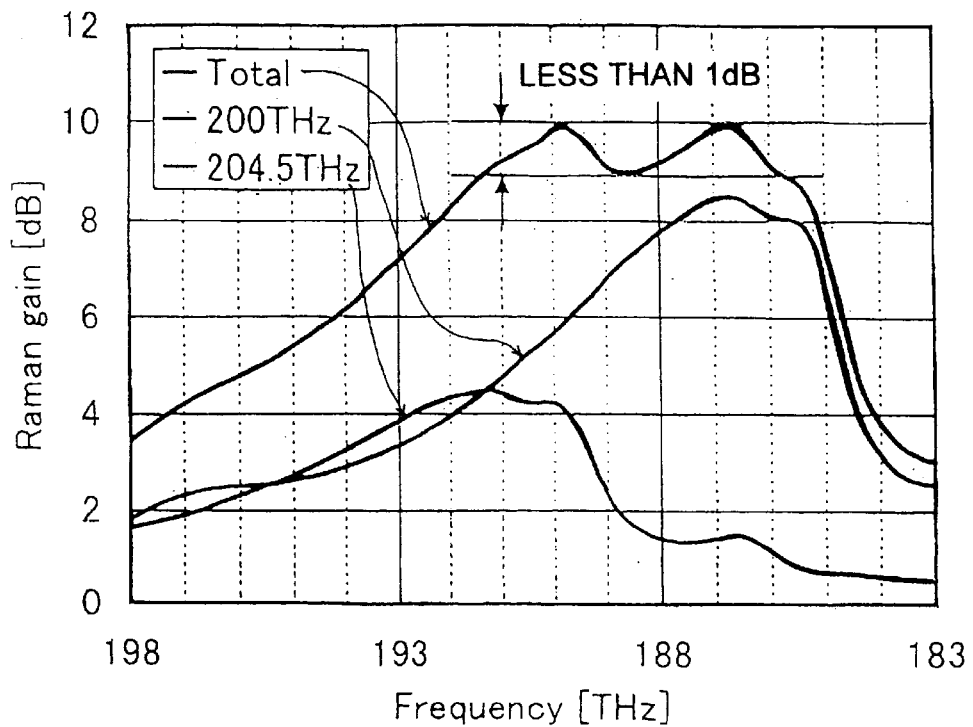
FIGS. 54A and 54B are views showing Raman gain profiles when an interval between pumping light is selected to 4.5 THz and 5 THz, respectively and DSF is used as the amplifier fiber.
Figure 54B:
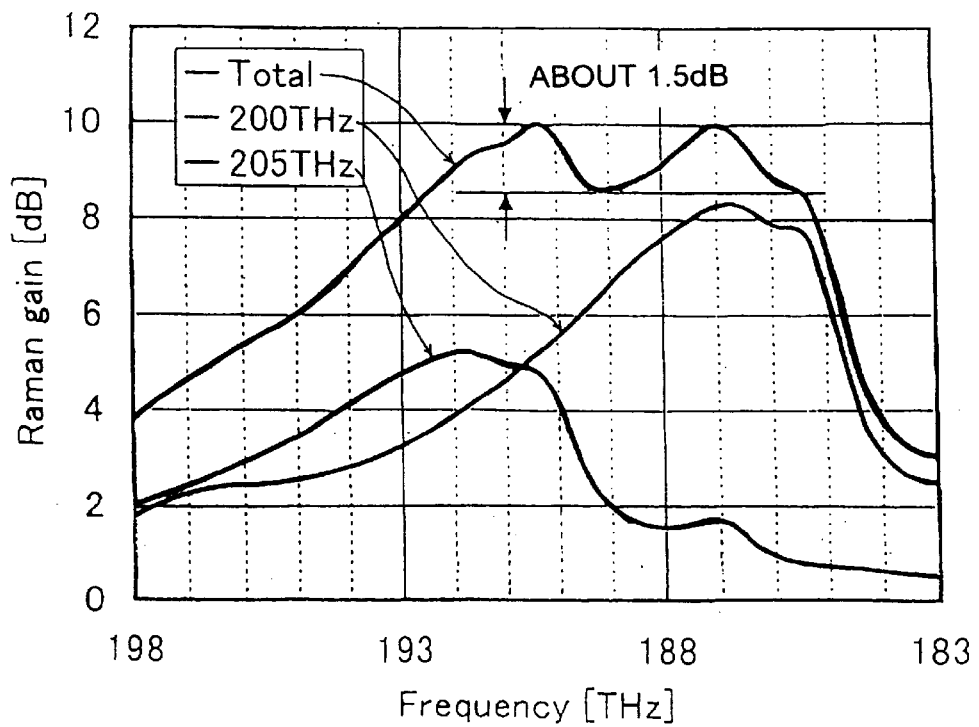

FIGS. 54A and 54B show Raman gain profiles when the intervals between the pumping lights are 4.5 THz and 5 THz, respectively and DSF is used as the amplifier fiber. As apparent from FIGS. 54A and 54B, as the interval between the pumping lights is increased, the recess or valley of the gain becomes deeper, and, thus, the gain deviation becomes greater. Incidentally, in FIG. 54A, values shown in the following Table 1 are used as frequencies (wavelengths) of the pumping lights, and, in FIG. 54B, values shown in the following Table 2 are used as frequencies (wavelengths) of the pumping lights. In such cases, the interval of 4.5 THz between the pumping lights corresponds to 33 nm, and 5 THr corresponds to 36.6 nm. That is to say, from these examples, it can be seen that, if the interval between the pumping lights is greater than 35 nm, the gain flatness is worsened.

TABLE 1

| pumping frequency THz | pumping wavelength nm | wavelength interval nm |
|---|---|---|
| 204.5 | 1466.0 | 33.0 |
| 200.0 | 1499.0 | |

TABLE 2

| pumping frequency THz | pumping wavelength nm | wavelength interval nm |
|---|---|---|
| 205.0 | 1462.4 | 36.6 |
| 200.0 | 1499.0 | |

Figure 56:
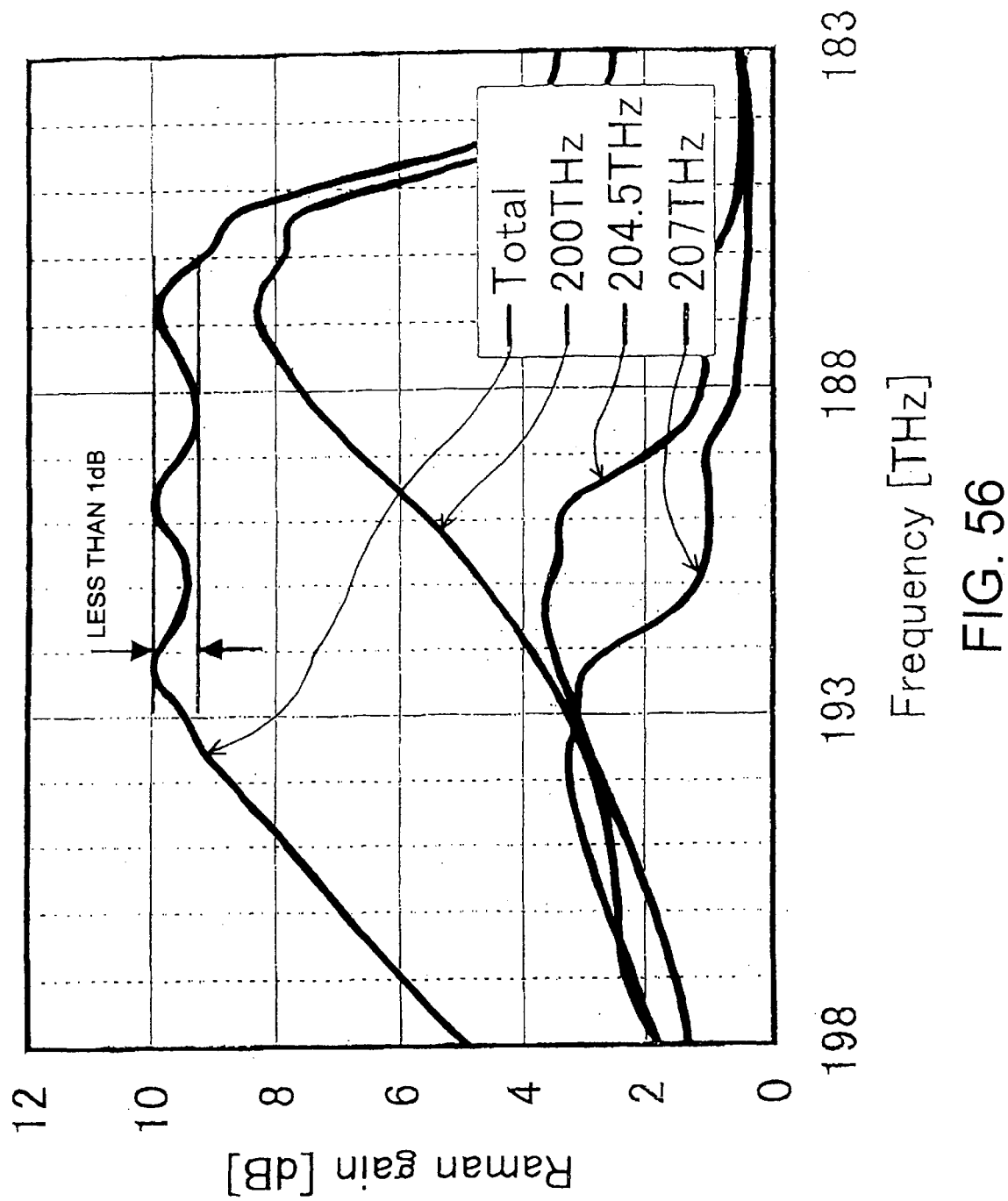
FIG. 56 is a view showing Raman gain profile when the interval between pumping light is selected to 2.5 THz and 4.5 THz and three wavelengths are used.

FIG. 55 shows gain profiles when the interval between the pumping lights is 4.5 THz, and three wavelengths are used From FIG. 55, when a third pumping wavelength is added, it can be seen that, if the interval between the pumping lights is 4.5 THz, the recess of the gain becomes deeper. FIG. 56 shows gain profiles when the intervals between the pumping lights are 2.5 THz and 4.5 THz and three wavelengths are used. In comparison with FIG. 55, the recess of the gain is shallower. Since the frequency interval of 2.5 THz used In this case corresponds to about 18 nm between the wavelengths, also in this case, it can be said that the interval between the adjacent pumping wavelengths is within a range from 6 nm to 35 nm.

Industrial Availability

In the Raman amplifier according to the present invention, by selecting the wavelengths of the pumping light Sources SO that the interval between the central wavelengths becomes greater than 6 nm and smaller than 35 nm and the difference between the maximum central wavelength and the minimum central wavelength becomes within 100 nm, there can be provided an optical amplifier in which the wavelength dependency of gain is reduced to the extent that the gain flattening filter is not required and in which, if the gain is changed, the flatness can be maintained. Further, this amplifier can be applied to an optical repeater for compensating loss of a transmission line and wavelength dispersion In a repeater constituted by the combination of the amplifier and EDFA, fluctuation of the EDFA due to fluctuation of input of the repeater and/or fluctuation in loss of DCF can be suppressed to avoid deterioration of gain flatness and the repeater can be applied to various systems.

In the Raman amplifying method according to the present invention, since the shorter center wavelength of the pumping light among two or more pumping lights incident on the DCF the greater the power, or, since the power of the pumping light at the short wavelength side with respect to the center between the shortest central wavelength and the longest central wavelength among two or more pumping lights incident on the DCF is increased, in any cases, even when an optical fiber having high non-linearity is used, wavelength multiplexing lights of about 1500 nm to about 1600 nm can be amplified with substantially the same gain. In other words, by using the optical fiber having high non-linearity, the required gain can be obtained even with a short optical fiber. Further, since the optical fiber can be shortened, a Raman amplifier which can be unitized can be provided.

Figure 57:
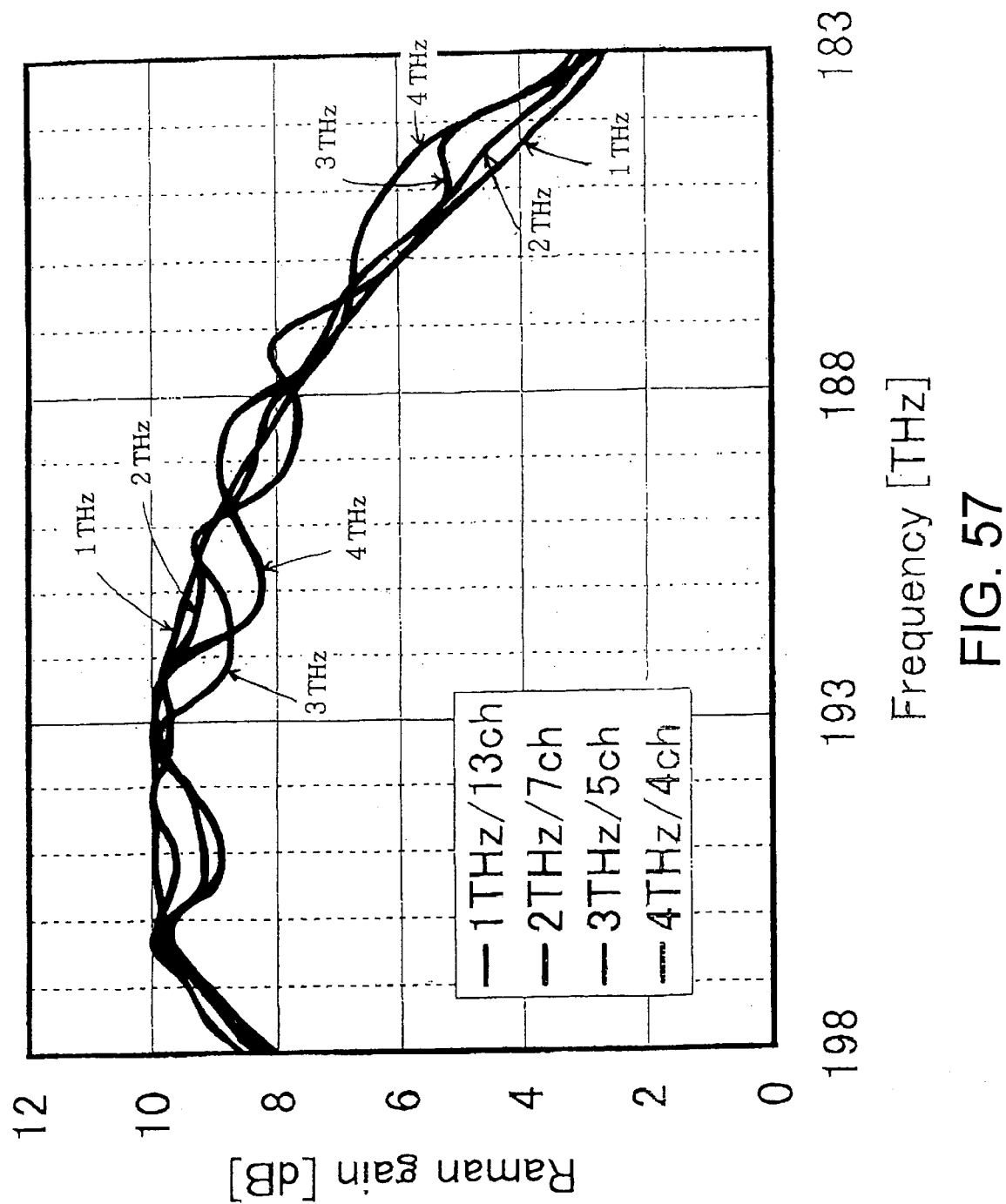
FIG. 57 is a view showing performance of Raman gain curves when the intervals of the pumping lights art equidistant and the peak gains are adjusted to 10 dB on the same.
Figure 58:
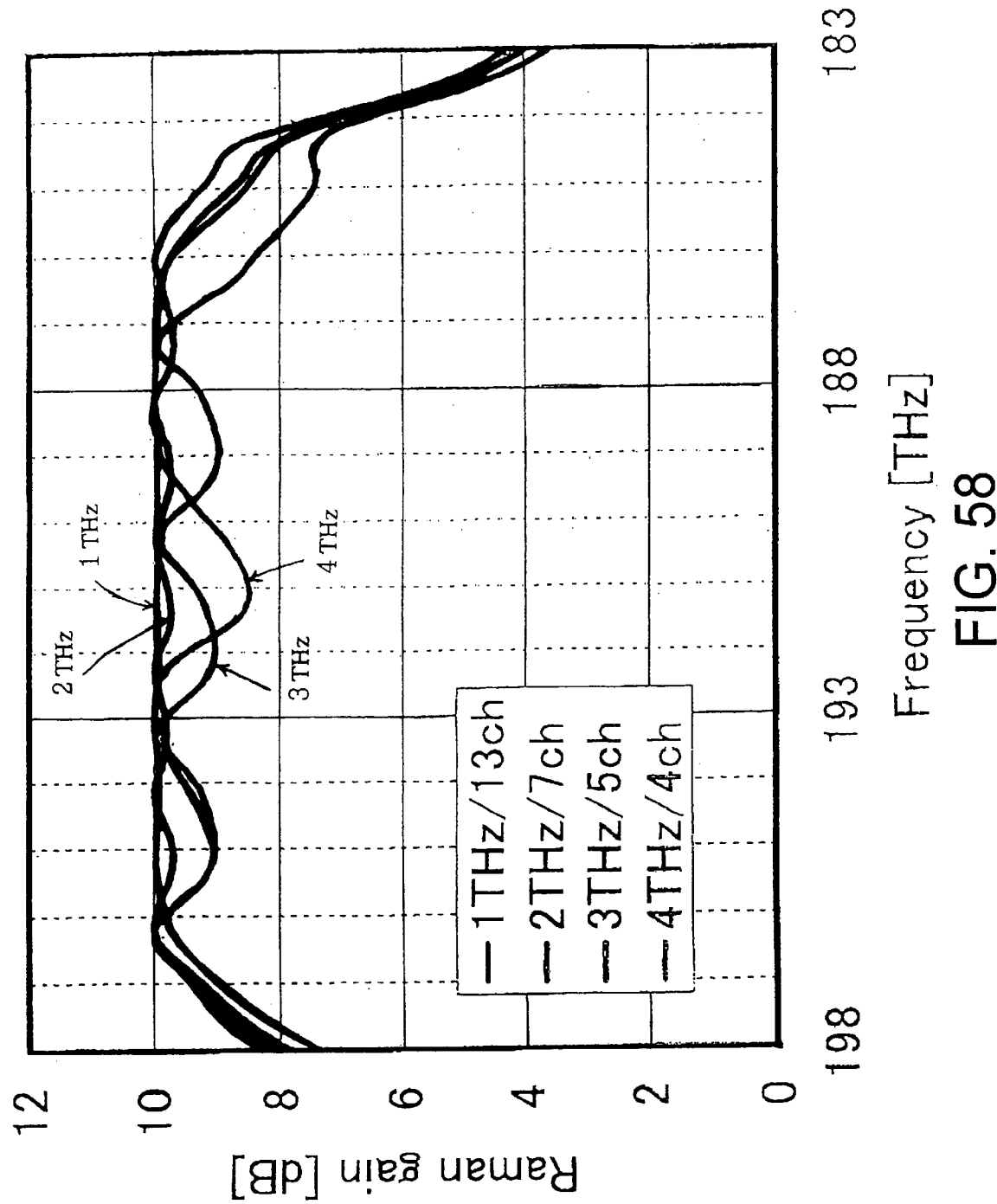
FIG. 58 is a view showing performance of Raman gain curves when the intervals of the pumping lights are equidistant and the gains generated by the respective pumping lights are adjusted so that the gain curves are flattened.
Figure 59:
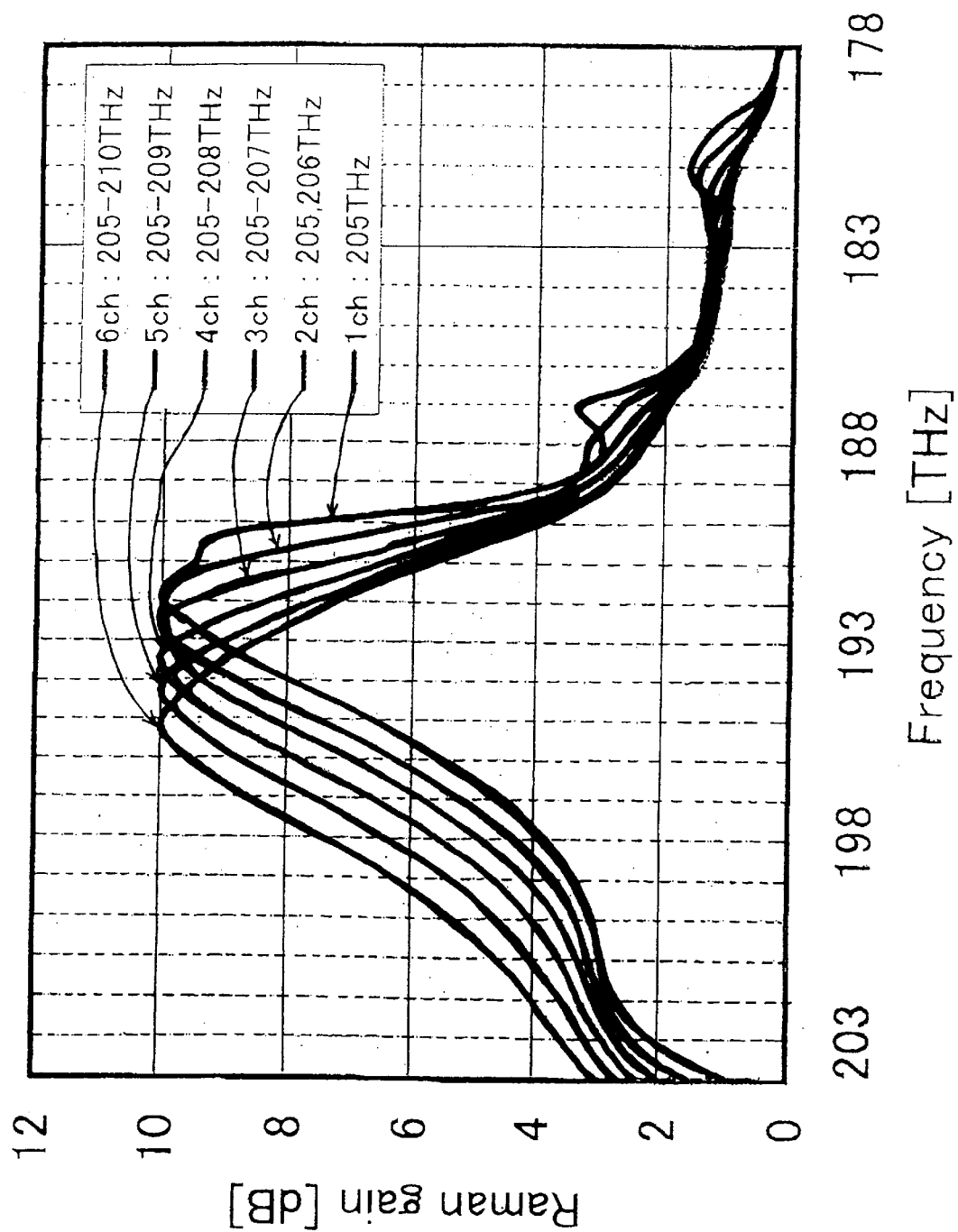
FIG. 59 is a view showing performance of Raman gain curves when the intervals of the pumping lights are equidistant of 1 THz and the number of multiplexing is changed.

As described in connection with the prior art, the wavelength combiner of Mach-Zehnder interferometer type is very useful for multiplexing the pumping lights efficiently. One of reasons why the pumping lights having the equal frequency interval are used is that such a wave combiner can be used. FIGS. 57 to 59 show performance of Raman gain curves when the interval between the pumping lights is equidistant. FIG. 57 shows a condition that adjustment is effected to bring the peak gain to 10 dB under a condition that the gains of the pumping lights are the same. From FIG. 57, it can be seen that the smaller the interval between the pumping lights the smaller the unevenness of the gains. FIG. 58 shows an example that the gains of the pumping lights are adjusted to flatten the gains. Also in this case, similar to FIG. 57, the interval between the pumping lights the smaller the unevenness of the gains. Further, it can be seen that undulation of the gain curves in FIG. 57 determines the maximum gain deviation in FIG. 58. Thus, in order to keep the gain deviation to about 0.1 dB, it is said that, although the interval of 2 THz between the pumping lights is too great, 1 THz is adequate.

FIG. 59 shows performance when the interval between the pumping lights is 1 THz and the multiplexing number is changed. As can be seen from a 1 ch pumping gain curve, when a silica-based fiber is used, although a smooth curve without unevenness is presented at the short wavelength side with respect to the gain peak, there are three noticeable local peaks at the long wavelength side, and such unevenness becomes a factor for determining limit of flattening. Such unevenness is reduced as the number of multiplexing is increased. For example, observing the 1 ch pumping gain curve, although there is protrusion of about 1 dB near 187 THz, as the number of multiplexing is increased, the protrusion is reduced. The reason is that, since the peak gains are set to be the same, the gain per one pumping wavelength or the local peak itself is reduced as the number of pumping wavelength is increased, and that the slightly and equidistantly shifted unevenness having the same configuration are added. That is to say, by adding the protrusion of the gain curve of a certain pumping wavelength to the recess of the gain curve of another pumping wavelength, the unevenness is reduced totally. A value of "about 1 THz" defined in claims 32 to 34 is based on this principle and is based on the fact that, in the 1 ch pumping gain curve shown in FIG. 59, frequency difference between the protrusion near 187 THz and the adjacent recess near 188 THz is about 1 THz. Accordingly, depending upon a fiber used, the 1 ch pumping gain curve may be slightly differentiated, and, thus, the value of "about 1 THz" described in claims 32 to 34 may be changed. In any cases, in order to reduce the gain deviation, it is required that the unevenness (projections and recesses) of the gain curves to be added or combined to be cancelled.

Since the limit of the gain deviation is determined by undulation and/or unevenness of the gain curves to be overlapped, it is considered that the gain profile having good flatness and small gain deviation can be obtained by combining gain curves having less unevenness. Accordingly, this can be achieved by combining the gain curve obtained by multiplexing the pumping lights at interval of 1 THz with the gain curve of the pumping light at the long wavelength side with respect to said pumping wavelength. In this case, it is desirable that the peaks of two gain curves are moderately spaced apart from each other in the viewpoint of the widening of the band.

What is claimed is:

1. A Raman amplifier system comprising:

an optical fiber configured to have a wavelength division multiplex, WDM, optical signal, with a signal bandwidth of at least 20 nm, propagate therethough;

a pump configured to pump light into said optical fiber and Raman-amplify with said pump light said WDM optical signal; and an optical coupler that optically interconnects said optical fiber with said pump and is configured to couple said pump light into said optical fiber wherein said pump includes a plurality of semiconductor lasers, each producing light having a different central wavelength, and respective wavelength intervals between said different central wavelengths being in an inclusive range of 6 nm through 35 nm, wherein an interval between adjacent central wavelengths of a first and a second of said semiconductor lasers being different than an interval between adjacent central wavelengths of said second and a third of said semiconductor lasers.

2. The Raman amplifier system of claim 1 wherein:

said plurality of semiconductor lasers comprise Fabry-Perot semiconductor lasers and said pump further comprising, a plurality of external resonators respectively coupled to said Fabry-Perot semiconductor lasers, said external resonators having a narrow reflection band so that each of said Fabry-Perot semiconductor lasers emit light having a stabilized central wavelength.

3. The Raman amplifier system of claim 2 wherein:

at least one of said external resonators comprises a fiber Bragg grating.

4. The Raman amplifier system of claim 1 wherein:

said plurality of semiconductor lasers is selected from the group consisting of Fabry-Perot, DFB, DBR, MOPA, and a combination thereof.

5. The Raman amplifier system of claim 2 wherein:

said plurality of Fabry-Perot semiconductor lasers includes a first laser, a second laser, a third laser, and a fourth laser, said pump further includes a first external resonator, a second external resonator, a third external resonator, and a fourth external resonator respectively coupled to said plurality of Fabry-Perot semiconductor lasers, and each of the external resonators having a narrow reflection band so that respective of said Fabry-Perot semiconductor lasers emits light having a stabilized central wavelength, said first external resonator and said second external resonator having a same reflection band to stabilize output of said first laser and said second laser to a first central wavelength $\lambda_1$, said third external resonator and said fourth external resonator having a same reflection band to stabilize output of said third laser and fourth laser to a second central wavelength $\lambda_2$, said first laser and said second laser being configured to emit light having a predetermined polarization state, said third laser and said fourth laser being configured to emit light having a predetermined polarization state, said second central wavelength $\lambda_2$ being spaced from said first central wavelength $\lambda_1$ by a predetermined distance that is in an inclusive range of 6 nm through 35 nm, said pump further including a first polarization beam combiner configured to couple light from said first external resonator and said second external resonator together, a second polarization beam combiner configured to couple light from said third external resonator and said fourth external resonator together, said optical coupler comprising a WDM coupler configured to couple light from respective outputs of said first polarization beam combiner and said second polarization beam combiner to form a single pump source that produces randomly polarized light of said first central wavelength XI and said second central wavelength $\lambda_2$.

6. The Raman amplifier system of claim 5 wherein:

said external resonators comprise fiber Bragg gratings.

7. The Raman amplifier system of claim 5 wherein:

a plurality of optical fibers connecting said plurality of semiconductor lasers and said external resonators, and said polarization beam combiners comprise polarization maintaining fibers.

8. The Raman amplifier system of claim 6 wherein:

a plurality of optical fibers connecting said plurality of semiconductor lasers and said fiber Bragg gratings, and said polarization beam combiners comprise polarization maintaining fibers.

9. The Raman amplifier system of claim 1 further comprising:

a rare earth doped fiber amplifier unit coupled to said optical fiber.

10. The Raman amplifier system of claim 9 wherein:

said rare earth doped fiber amplifier is coupled to said optical fiber at an amplification stage that precedes said Raman amplifier.

11. The Raman amplifier system of claim 9 wherein:

said rare earth doped fiber amplifier is coupled to said optical fiber at an amplification stage that follows said Raman amplifier.

12. The Raman amplifier system of claim 10 further comprising:

a second rare earth doped fiber amplifier, wherein said second rare earth doped fiber amplifier is coupled to said optical fiber at an amplification stage that follows said Raman amplifier.

13. The Raman amplifier system of claim 2, further comprising:

a rare earth doped fiber amplifier unit coupled to said optical fiber.

14. The Raman amplifier system of claim 13 wherein:

said rare earth doped fiber amplifier is coupled to said optical fiber at an amplification stage that precedes said Raman amplifier.

15. The Raman amplifier system of claim 13 wherein:

said rare earth doped fiber amplifier is coupled to said optical fiber at an amplification stage that follows said Raman amplifier.

16. The Raman amplifier system of claim 14 further comprising:

a second rare earth doped fiber amplifier wherein said second rare earth doped fiber amplifier is coupled to said optical fiber at an amplification stage that follows said Raman amplifier.

17. The Raman amplifier system of claim 5, further comprising:

a rare earth doped fiber amplifier unit coupled to said optical fiber.

18. The Raman amplifier system of claim 17 wherein:

said rare earth doped fiber amplifier is coupled to said optical fiber at an amplification stage that precedes said Raman amplifier.

19. The Raman amplifier system of claim 17 wherein:

said rare earth doped fiber amplifier is coupled to said optical fiber at an amplification stage that follows said Raman amplifier.

20. The Raman amplifier system of claim 18, further comprising:

a second rare earth doped fiber amplifier wherein said second rare earth doped fiber amplifier is coupled to said optical fiber at an amplification stage that follows said Raman amplifier.

21. A Raman amplifier system comprising:
an optical fiber configured to have a wavelength division multiplex, WDM, optical signal, with a signal bandwidth of at least 20 nm, propagated therethrough;
means for introducing pump light into said optical fiber and for Raman-amplifying said WDM optical signal in said optical fiber,
said means for introducing pump light includes means for producing said pump light with different central wavelengths that are separated by predetermined distances in an inclusive range of 6 nm through 35 nm, wherein
an interval between adjacent central wavelengths of a first and a second of said pump lights being different than an interval between adjacent central wavelengths of said second and a third of said pump lights.

22. The Raman amplifier system of claim 21, further comprising:
means for stabilizing the respective different central wavelengths of said pump light.

23. The Raman amplifier system of claim 21, further comprising:
means for creating a controlled amplification characteristic over at least a 30 nm band.

24. The Raman amplifier system of claim 23, wherein:
said means for creating includes means for adjusting an optical output power level of said pump light at said at least two separate wavelengths.

25. The Raman amplifier system of claim 21 wherein:
said means for introducing pump light include means for maintaining a polarization of the pump light in a predetermined polarization state.

26. The Raman amplifier system of claim 21 further comprising:
means for amplifying said WDM optical signal with a non-Raman amplifier stage.

27. A Raman amplifier pumping device comprising:
a plurality of semiconductor laser pump sources each configured to produce light at a different central wavelength, wherein respective wavelength intervals between said different central wavelengths being in an inclusive range of 6 nm through 35 nm so as to create a Raman amplification gain profile of suitable bandwidth to amplify a wavelength division multiplex, WDM, signal, with a signal bandwidth of at least 20 nm, when applied to a fiber carrying said WDM signal, wherein
an interval between adjacent central wavelengths of a first and a second of said laser pump sources being different than an interval between adjacent central wavelengths of said second and a third of said laser pump sources.

28. The Raman amplifier pumping device of claim 27 wherein:
said plurality of semiconductor lasers comprise Fabry-Perot semiconductor lasers; and
said pumping device further comprising a plurality of external resonators respectively coupled to said Fabry-Perot lasers, said external resonators each configured to exhibit a narrow reflection band so as to stabilize a central wavelength of light emitted from each of said Fabry-Perot lasers.

29. The Raman amplifier pumping device of claim 28, wherein:
said external resonator comprises a fiber Bragg grating.

30. The Raman amplifier pumping device of claim 27 wherein:
said plurality of semiconductor lasers is selected from the group consisting of Fabry-Perot, DFB, DBR, MOPA, and a combination thereof.

31. The Raman amplifier pumping device of claim 28 wherein:
said plurality of Fabry-Perot semiconductor lasers comprises a first laser, a second laser, a third laser and a fourth laser;
said pumping device further comprising a first external resonator, a second external resonator, a third external resonator and a fourth external resonator respectively coupled to said Fabry-Perot lasers, each of said external resonators configured to have a narrow reflection band so as to stabilize a central wavelength of light emitted from respective of said Fabry-Perot lasers,
said first external resonator and said second external resonator having a same reflection band so as to stabilize output light from said first Fabry-Perot laser and second Fabry-Perot laser to a first central wavelength $\lambda_1$,
said third external resonator and said fourth external resonator having a same reflection band so as to stabilize output light from said third Fabry-Perot laser and said fourth Fabry-Perot laser to a second central wavelength $\lambda_2$,
said first Fabry-Perot laser and said second Fabry-Perot laser being configured to emit light having a predetermined polarization state,
said third Fabry-Perot laser and said fourth Fabry-Perot laser being configured to emit light having a predetermined polarization state,
said second central wavelength $\lambda_2$ being spaced from said first central wavelength $\lambda_1$ by a predetermined distance in an inclusive range of 6 nm through 35 nm,
said pumping device further comprising a first polarization beam combiner configured to couple light from said first external resonator and said second external resonator together, and a second polarization beam combiner being configured to couple light from said third external resonator and said fourth external resonator together, and
said pumping device further comprising a WDM coupler being configured to couple light from respective outputs of said first polarization beam combiner and said second polarization beam combiner to form a single pump source that produces randomly polarized light of said first central wavelength $\lambda_1$ and said second central wavelength $\lambda_2$.

32. The Raman amplifier pumping device of claims 31 wherein:
respective of said external resonators comprise fiber Bragg gratings.

33. The Raman amplifier pumping device of claim 31, wherein:
a plurality of optical fibers connecting said semiconductor lasers and said external resonators; and
said polarization beams combiners comprise polarization maintaining fibers.

34. The Raman amplifier pumping device of claim 32, further comprising:
a plurality of optical fibers connecting said semiconductor lasers, and said fiber Bragg gratings; and
said polarization beams combiners comprise polarization maintaining fibers.

35. A Raman amplifier system comprising:

an optical fiber; and pump means for introducing pump light into said optical fiber wherein a wavelength division multiplex, WDM, optical signal, with a signal bandwidth of at least 20 nm, propagated through said optical fiber is Raman-amplified by said pump light, said pump means including a first means for generating pump light having a first central wavelength $\lambda_1$, and applying said pump light at $\lambda_1$ to said optical fiber, a second means for generating pump light having a second central wavelength $\lambda_2$, and applying said pump light at $\lambda_2$ to said optical fiber, and means for keeping a gain ripple within 1 dB, inclusive, over said signal bandwidth, wherein a wavelength interval between $\lambda_1$ and $\lambda_2$ is greater than 20 nm but not greater than 35 nm.

36. The Raman amplifier system of claim 35 wherein:

said first means for generating pump light includes means for generating pump light having a wide oscillating bandwidth, and means for narrowing the oscillating bandwidth so that said first means for generating pump light emits pump light having a stabilized central wavelength $\lambda_1$, and said second means for generating pump light includes means for generating pump light having a wide oscillating bandwidth, and means for narrowing the oscillating bandwidth so that said second means for generating pump light emits pump light having a stabilized central wavelength $\lambda_2$.

37. The Raman amplifier system of claim 35 wherein:

said first means for generating pump light and said second means for generating pump light each further comprise means for generating randomly polarized pump light.

38. The Raman amplifier system of claim 36 wherein:

said first means for generating pump light and second means for generating pump light each further comprise means for generating randomly polarized pump light.

39. The Raman amplifier system of claim 25 wherein:

said first means for generating pump light comprises means for emitting light of predetermined polarization states, and said second means for generating pump light comprises means for emitting light of predetermined polarization states, said means for generating pump light further comprising a first means for combining said light of predetermined polarization states from said first means for generating pump light, and a second means for combining said light of predetermined polarization states from said second means for generating pump light, said means for generating pump light still further comprising means for wavelength division multiplex combining the pumping light emitted from said first means for combining and the second means for combining.

40. A Raman amplifier system configured for use in a 1520–1620 nm communication window comprising:

an optical fiber configured to have a wavelength division multiplex, WDM, optical signal, with a predetermined signal bandwidth of at least 20 nm, propagate therethrough;

a pump source coupled to said optical fiber and configured to introduce pump light into said fiber and Raman-amplify said WDM optical signal by said pump light, said pump source including a first Fabry-Perot semiconductor laser and a second Fabry-Perot semiconductor laser each operating at a wavelength between 1405–1510 nm and each having a bandwidth that contains multiple longitudinal modes, a first fiber grating and a second fiber grating having a narrow reflection wavelength, with respect to said bandwidth, respectively coupled to said first Fabry-Perot semiconductor laser and said second Fabry-Perot semiconductor laser so as to narrow said bandwidths to respective stabilized central wavelengths $\lambda_1$ and $\lambda_2$, where $\lambda_1$ and $\lambda_2$ are located in an inclusive range of 1405 through 510 nm and a wavelength interval between $\lambda_1$ and $\lambda_2$ is selected to be greater than 6 nm and less than 35 nm; and a wavelength division multiplexer configured to couple combining light emitted from said first and second fiber gratings so as to form said pump source that imparts different levels of light at $\lambda_1$ and $\lambda_2$ into said optical fiber.

41. A Raman amplifier system configured for use in a 1520–1620 nm communication window comprising:

an optical fiber configured to have a wavelength division multiplex, WDM, optical signal, with a signal bandwidth of at least 20 nm, propagate therethrough;

a pump source coupled to said optical fiber and configured to introduce pump light into said optical fiber and Raman-amplify said WDM optical signal by said pump light, said pump source including a first Fabry-Perot semiconductor laser, a second Fabry-Perot semiconductor laser, a third Fabry-Perot semiconductor laser and a fourth Fabry-Perot semiconductor laser, each operating in a 1405–1510 nm pump window and having a bandwidth that contains multiple longitudinal modes, said first Fabry-Perot semiconductor laser and said second Fabry-Perot semiconductor laser configured to emit light having predetermined polarization states, said third Fabry-Perot semiconductor laser and said fourth Fabry-Perot semiconductor laser configured to emit light having predetermined polarization states, a first fiber grating, a second fiber grating, a third fiber grating and a fourth fiber grating each having a narrow reflection wavelength, with respect to said bandwidth, and being respectively coupled to said first Fabry-Perot semiconductor laser, said second Fabry-Perot semiconductor laser, said third Fabry-Perot semiconductor laser, and said fourth Fabry-Perot semiconductor laser so as to narrow said oscillating wavelengths to respective central wavelengths $\lambda_1$ and $\lambda_2$, wherein $\lambda_1$ and $\lambda_2$ are located in an inclusive range of 1405 through 1510 nm, and a wavelength interval between $\lambda_1$ and $\lambda_2$ is selected to be in an inclusive range of 6 nm through 35 nm, said first fiber grating and said second fiber grating having a same reflection wavelength so as to stabilize light output of said first Fabry-Perot semiconductor laser and said second Fabry-Perot semiconductor laser to said first central wavelength $\lambda_1$, said third fiber grating and said fourth fiber grating having a same reflection wavelength so as to stabilize light output of said third Fabry-Perot semiconductor laser and said fourth Fabry-Perot semiconductor laser to said second central wavelength $\lambda_2$, said pumping source further comprising a first polarization beam combiner configured to couple light from said first fiber grating and said second fiber grating together, and a second polarization beam combiner configured to couple light from said third fiber grating and said fourth fiber grating together, and said pumping device further comprising a wavelength division multiplexer coupler configured to couple light from respective outputs of said first polarization beam combiner and said second polarization beam combiner to form a single pump source emitting randomly polarized light of said first central wavelength $\lambda_1$ and said second central wavelengths $\lambda_2$, wherein different levels of light at said first central wavelength $\lambda_1$ and said second central wavelength $\lambda_2$ being applied to said optical fiber.

42. A method of generating a Raman gain in an optical fiber comprising the steps of:

propagating a wavelength division multiplex, WDM, optical signal, with a signal bandwidth of at least 20 nm, through an optical fiber;

generating pump light spaced in wavelength from said WDM optical signal by an amount effective for Raman amplification of said WDM optical signal; and introducing said pump light into said optical fiber so as to Raman amplify said WDM optical signal over said signal bandwidth with a gain ripple that does not exceed 1 dB, wherein said step of generating pump light comprises the steps of generating light having a first central wavelength $\lambda_1$, and generating light having a second central wavelength $\lambda_2$, wherein a wavelength interval between $\lambda_1$ and $\lambda_2$ is greater than 20 nm and less than 35 nm, and said introducing step includes introducing different levels of light at said first central wavelength $\lambda_1$ and said second central wavelength $\lambda_2$ so as to achieve said gain ripple that does not exceed 1 dB.

43. The method of claim 42 wherein:

said step of generating light having a first central wavelength $\lambda_1$ includes generating light having a wide oscillating bandwidth, and narrowing said oscillating bandwidth to said first central wavelength $\lambda_1$, and said second step of generating light having a second central wavelength $\lambda_2$ includes generating light having a wide oscillating bandwidth, and narrowing said oscillating bandwidth to said second central wavelength $\lambda_2$.

44. The method of claim 42 wherein:

said step of generating light comprises generating randomly polarized light.

45. The method of claim 43 wherein:

said step of generating light further comprises generating randomly polarized light.

46. The method of claim 45 wherein:

said step of generating light of wavelength $\lambda_1$ includes generating light of predetermined polarization states from a first pump light source and a second pump light source, and said step of generating light of wavelength $\lambda_2$ includes generating light of predetermined polarization states from a third pump light source and a fourth pump light source, said step of generating light further comprising the step of combining said polarized light from said first pump light source and said second pump light source so as to form a randomly polarized light of wavelength $\lambda_1$, and combining said polarized light from said third pump light source and said fourth pump light source to form a randomly polarized light of wavelength $\lambda_2$, said step of generating light still further comprising a step of combining said randomly polarized light of wavelengths $\lambda_1$ and $\lambda_2$ to form a randomly polarized light of wavelengths Bland $\lambda_2$.

47. The method of claim 46 further comprising the step of:

maintaining the polarization of said light during the steps of generating and combining said light.

48. A Raman amplifier system comprising:

an optical fiber configured to have a wavelength division multiplex, WDM, optical signal, with a signal bandwidth of at least 20 nm, propagate therethrough; a pump configured to introduce pump light into said optical fiber and Raman-amplify said WDM optical signal by said pump light, said pump including a plurality of semiconductor laser pump sources each producing light at a different central wavelength wherein respective wavelength intervals between adjacent pairs of said central wavelengths being in an inclusive range of 6 nm through 35 nm;

a monitoring device configured to monitor a level of said WDM optical signal. after being Raman-amplified; and a controller configured to control an optical output level of said pump, said controller being configured to adjust said optical output level based on an indication from said monitoring device of the level of said WDM optical signal after being Raman-amplified so as to generate a Raman gain having a deviation of less than 1 dB over at least a 40 nm bandwidth, wherein an interval between adjacent central wavelengths of a first and a second of said semiconductor laser pump sources being different than an interval between adjacent central wavelengths of said second and a third of said semiconductor laser pump sources.

49. A Raman amplifier system comprising:

an optical fiber configured to have a wavelength division multiplex, WDM, optical signal, with a signal bandwidth of at least 20 nm, propagate therethrough, a pump configured to introduce pump light into said optical fiber and Raman-amplify said WDM optical signal by said pump light, said pump comprising a plurality of semiconductor laser pump sources each configured to produce light at a different central wavelength wherein respective wavelength intervals between adjacent pairs of said central wavelengths being in an inclusive range of 6 nm through 35 nm, said pump including means for generating randomly polarized light, wherein an interval between adjacent central wavelengths of a first and a second of said semiconductor laser pump sources being different than an interval between adjacent central wavelengths of said second and a third of said semiconductor laser pump sources.

50. A Raman amplifier system comprising:

an optical fiber configured to have a wavelength division multiples, WDM, optical signal, with a signal bandwidth of at least 20 nm, propagate therethrough;

a pump configured to input pump light into said optical fiber and Raman-amplify said WDM optical signal by said pump light, said pump including two semiconductor lasers each having different central wavelengths wherein a wavelength interval between the different central wavelengths being greater than 20 nm but not greater than 35 nm, said plurality of semiconductor lasers being configured to produce multiple longitudinal modes, and said pump further comprising means for suppressing a shift in central wavelength due to changes in a drive current of said semiconductor lasers and means for controlling light levels applied to the optical fiber so as to keep a gain ripple within 1 dB, inclusive, over said signal bandwidth.

51. A Raman amplifier system comprising:

an optical fiber configured to have a wavelength division multiplex, WDM, optical signal, with a signal bandwidth of at least 20 nm, propagate therethrough;

a pump configured to input pump light into said optical fiber and Raman-amplify said WDM optical signal by said pump light, said pump including two semiconductor lasers each having different central wavelengths wherein a wavelength interval between the different central wavelengths being greater than 20 nm but not greater than 35 nm, said plurality of semiconductor lasers being configured to produce multiple longitudinal modes, said pump further comprising a suppressor mechanism configured to suppress a shift in central wavelength due to changes in a drive current of said semiconductor lasers, and means for controlling light levels applied to the optical fiber so as to keep a gain ripple within 1 dB, inclusive, over said signal bandwidth.

52. A Raman amplifier system comprising:

an optical fiber configured to have a wavelength division multiplex, WDM, optical signal, with a signal bandwidth of at least 20nm, propagate therethrough;

a pump configured to introduce pump light into said optical fiber and Raman-amplify said WDM optical signal by said pump light, said pump comprising a pair of semiconductor lasers having different central wavelengths wherein a wavelength interval between said central wavelengths being greater than 20 nm but not greater than 35 nm, said plurality of semiconductor lasers being configured to produce multiple longitudinal modes, and said pump further comprising means for suppressing noise due to fluctuation caused by mode hopping of said semiconductor lasers, and means for controlling light levels applied to the optical fiber so as to keep a gain ripple within 1dB, inclusive, over said signal bandwidth.

53. A Raman amplifier system comprising:

an optical fiber configured to have a wavelength division multiplex, WDM, optical signal, with a signal bandwidth of at least 20 nm, propagate therethrough;

a pump configured to introduce pump light into said optical fiber and Raman-amplify said WDM optical signal by said pump light, said pump comprising a pair of semiconductor lasers having different central wavelengths wherein a wavelength interval between said central wavelengths being greater than 20 nm but not greater than 35 nm, said plurality of semiconductor lasers being configured to produce multiple longitudinal modes of light, and said pump further comprising a suppressor mechanism configured to suppress noise due to fluctuation caused by mode hopping of said semiconductor lasers, and means for controlling light levels applied to the optical fiber so as to keep a gain ripple within 1 dB, inclusive, over said signal bandwidth.

54. A Raman amplifier system comprising:

an optical fiber configured to have a wavelength division multiplex, WDM, optical signal, with a signal bandwidth of at least 20nm, propagate therethrough;

a pump configured to pump light into said optical fiber and Raman-amplify with said pump light said WDM optical signal; and an optical coupler that optically interconnects said optical fiber with said pump and is configured to couple said pump light into said optical fiber wherein said pump includes a pair of semiconductor lasers that produce light at different central wavelengths that are separated from one another by at least 20 nm but not more than 35 nm, and an optical output level of the light produced by respective of said semiconductor lasers being controlled to provide different levels of light in said optical fiber so as to create a Raman amplification gain profile of a predetermined shape that limits an amount of gain ripple to 1 dB or less.

\* \* \* \* \*

UNITED STATES PATENT AND TRADEMARK OFFICE
CERTIFICATE OF CORRECTION

PATENT NO. : 6,292,288 B1
DATED : September 18, 2001
INVENTOR(S) : Akasaka et al.

Page 1 of 1

It is certified that error appears in the above-identified patent and that said Letters Patent is hereby corrected as shown below:

<u>Title page,</u>
Item [75], should read:
-- [75] Inventors: Youichi Akasaka; Yoshihiro Emori; Shu Namiki, all of Chiyoda-ku (JP) --
Item [30], should read:
-- [30] Foreign Application Priority Data
Jul. 23, 1998 (JP) ......................... 10-208450
Jul. 27, 1998 (JP) ......................... 10-210822
Feb. 12, 1999 (JP) ......................... 11-034769
Feb. 12, 1998 (JP) ......................... 11-034833
Jan. 14, 2000 (JP) ......................... 2000-006567 --

Signed and Sealed this

Twentieth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,292,288 B1
DATED : September 18, 2001
INVENTOR(S) : Youichi Akasaka et al.

It is certified that error appears in the above-identified patent and that said Letters Patent is hereby corrected as shown below:

Column 32,
Line 16, "510" should read -- 1510 --.

Signed and Sealed this

Twenty-seventh Day of July, 2004

JON W. DUDAS
*Acting Director of the United States Patent and Trademark Office*